(12) United States Patent
Dettloff et al.

(10) Patent No.: US 6,388,628 B1
(45) Date of Patent: May 14, 2002

(54) SYSTEMS AND METHODS FOR WIRELESSLY PROJECTING POWER USING IN-PHASE CURRENT LOOPS

(75) Inventors: Wayne D. Dettloff, Cary; William E. Batchelor, Raleigh; Robert A. Heaton, Durham; Michael B. Steer, Raleigh, all of NC (US)

(73) Assignee: db Tag, Inc., Cary, NC (US)

( * ) Notice: Subject to any disclaimer, the term of this patent is extended or adjusted under 35 U.S.C. 154(b) by 0 days.

(21) Appl. No.: 09/312,577

(22) Filed: May 14, 1999

Related U.S. Application Data
(60) Provisional application No. 60/085,788, filed on May 18, 1998.

(51) Int. Cl.[7] .............................................. H01Q 11/12
(52) U.S. Cl. ........................ 343/742; 342/867; 342/895
(58) Field of Search ................................ 343/742, 741, 343/866, 867, 895; H01Q 11/12

(56) References Cited

U.S. PATENT DOCUMENTS

| | | | |
|---|---|---|---|
| 2,618,746 A | * 11/1952 | Pauch | 343/867 |
| 3,925,784 A | 12/1975 | Phelan | 343/754 |
| 4,012,742 A | * 3/1977 | Dempsey | 343/742 |
| 4,243,980 A | 1/1981 | Lichtblau | 340/572 |
| 4,373,163 A | 2/1983 | Vandebult | 343/842 |
| 4,872,018 A | 10/1989 | Feltz et al. | 343/742 |
| 5,223,849 A | * 6/1993 | Kasevich et al. | 343/895 |
| 5,339,073 A | 8/1994 | Dodd et al. | 340/825.31 |
| 5,402,134 A | * 3/1995 | Miller et al. | 343/742 |
| 5,550,547 A | 8/1996 | Chan et al. | 342/42 |
| 5,583,850 A | 12/1996 | Snodgrass et al. | 370/342 |
| 5,627,544 A | 5/1997 | Snodgrass et al. | 342/42 |
| 5,793,324 A | 8/1998 | Aslanidis et al. | 342/51 |
| 5,877,728 A | 3/1999 | Wu et al. | 343/742 |
| 5,856,788 A | 6/1999 | Walter et al. | 340/825.54 |
| 5,963,173 A | * 10/1999 | Lian et al. | 343/742 |
| 6,016,131 A | * 1/2000 | Sato et al. | 343/895 |
| 6,018,327 A | * 1/2000 | Nakano et al. | 343/895 |
| 6,081,238 A | * 6/2000 | Alicot | 343/742 |

FOREIGN PATENT DOCUMENTS

| | | |
|---|---|---|
| EP | 0 645 840 A1 | 3/1995 |
| EP | 0 693 733 A1 | 1/1996 |
| WO | WO 97/38404 | 10/1997 |

OTHER PUBLICATIONS

"Evaluating Compliance with FCC Guidelines for Human Exposure to Radiofrequency Electromagnetic Fields," Federal Communications Commission Office of Engineering & Technology, OET Bulletin 65, Edition 97–01, Aug. 1997, 79 pgs.

Peter Hawkes, "AIM RFID Tag Systems, Singing in Concert," http://www.aimglobal.org/techinfo/rfid/rfidtags.html, 7 pgs.

* cited by examiner

*Primary Examiner*—Hoanganh Le
(74) *Attorney, Agent, or Firm*—Myers Bigel Sibley & Sajovec

(57) ABSTRACT

An array of in-phase current loops are disposed adjacent to one another to define a surface and to define a virtual current loop at a periphery of the surface that produces a same direction virtual current while current in adjacent portions of adjacent current loops flows in opposite directions, to thereby wirelessly project power from the surface. It has been found according to the invention that the array of in-phase current loops that are disposed adjacent to one another to define a surface and to define a virtual current loop at a periphery of the surface that produces a same direction virtual current while current in adjacent portions of adjacent current loops flows in opposite directions, can provide acceptable power to RFID tags, while reducing the risk of violating regulatory constraints. A plurality of arrays of in-phase current loops also may be provided. The multiple arrays of in-phase current loops are disposed adjacent to one another to define a surface. Each array of in-phase current loops may be configured as was described above. N-ary tree traversals, push and pop commands and/or warp commands also may be used to efficiently identify tags.

18 Claims, 34 Drawing Sheets

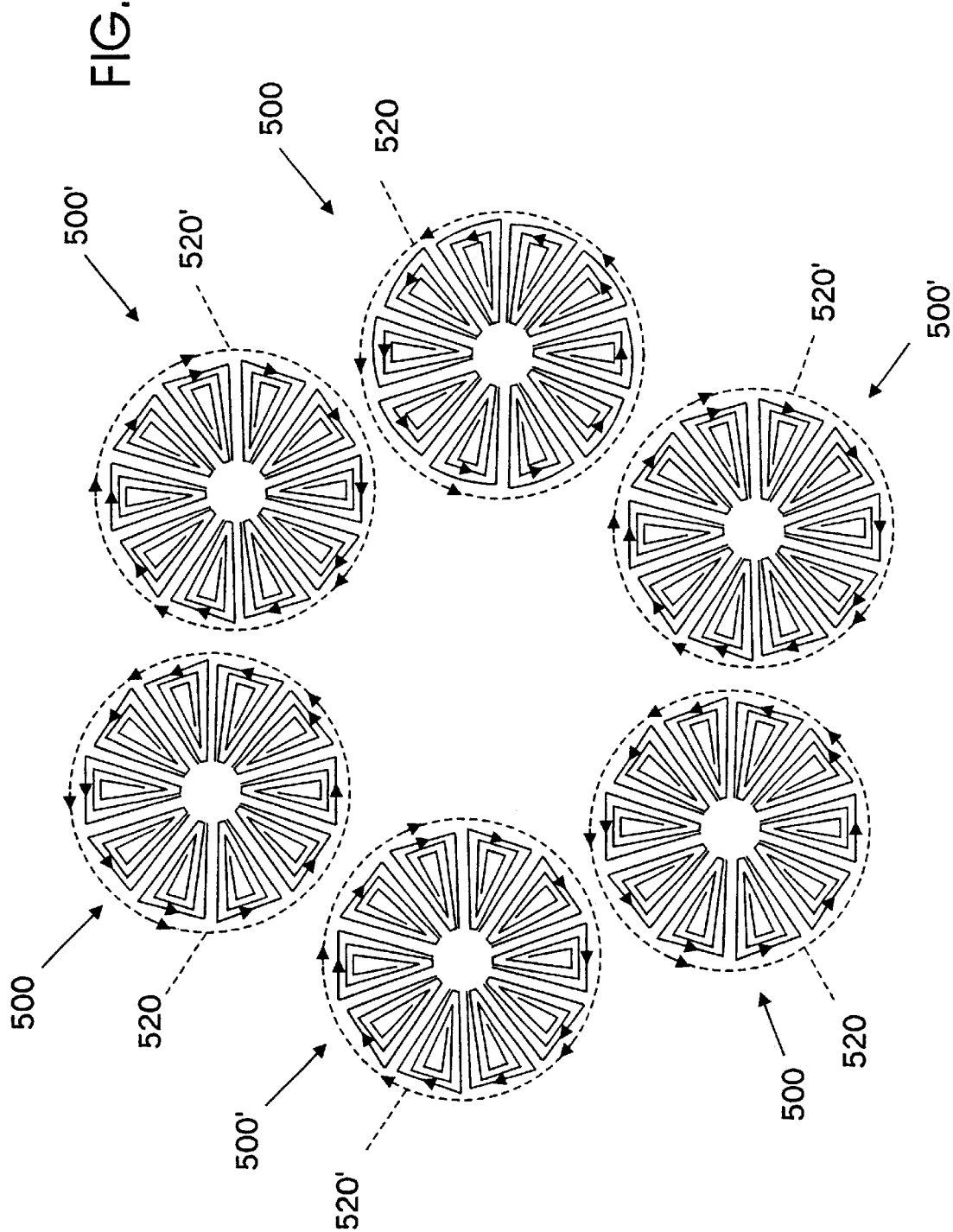

Off    On

Array 1

Volume to be covered

Array 2

Array 3

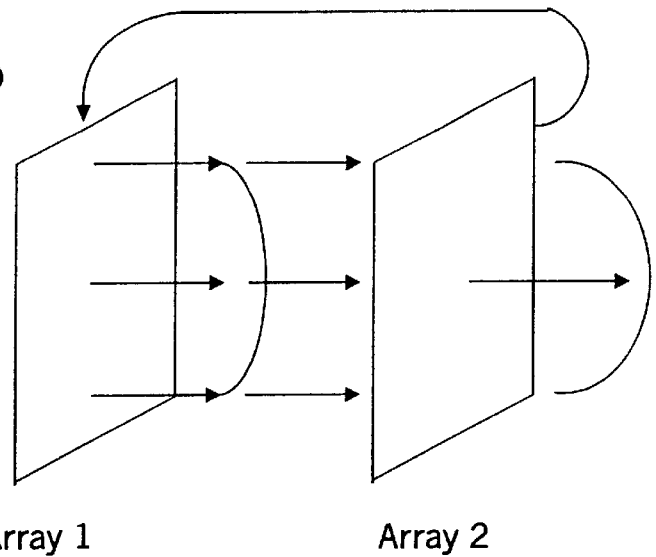
FIG. 16
Array 1    Array 2
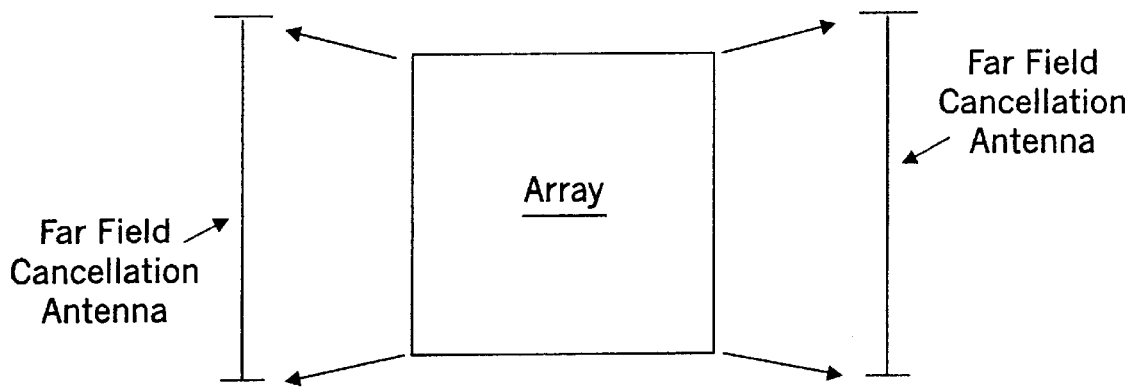
FIG. 17
Far Field Cancellation Antenna
Array
Far Field Cancellation Antenna
FIG. 18
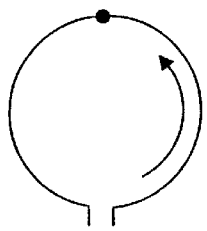
FIG. 22
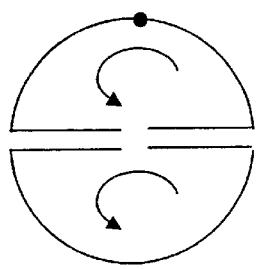
FIG. 24
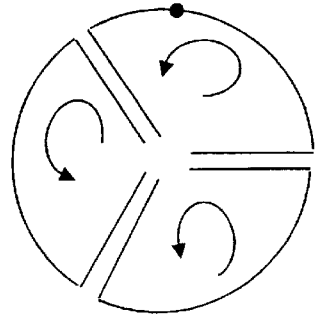

SYSTEMS AND METHODS FOR WIRELESSLY PROJECTING POWER USING IN-PHASE CURRENT LOOPS

CROSS REFERENCE TO RELATED APPLICATION

This application claims the benefit of provisional Application Ser. No. 60/085,788, filed May 18, 1998, entitled "Radio Frequency Identification System" to the present inventors.

FIELD OF THE INVENTION

This invention relates to systems and methods for wirelessly projecting power and more particularly to systems and methods for wirelessly projecting power to microelectronic devices.

BACKGROUND OF THE INVENTION

Wireless powering of microelectronic devices is used, for example, for wireless Radio Frequency (RF) powering of Radio Frequency Identification (RFID) tags. RFID tags are used in the Automatic Data Collection (ADC) industry. In particular, printed bar codes are now widely used in the ADC industry. Unfortunately, bar codes may require line of sight reading, may hold limited amounts of information, may need to be read one at a time, may be subject to defacing and/or counterfeiting and may only provide fixed information. In contrast, RFID tags need not require line of sight reading, can hold large quantities of information, can have high transfer data rates, can be read in groups, can be more reliable and more difficult to destroy and/or counterfeit and can update stored information.

RFID tags generally may be classified into battery powered (active) RFID tags and RF powered (passive) tags. Compared to passive tags, active tags may be more expensive, may have a defined shelf life, may deplete with operation, may have potential disposability problems, may be physically larger and may be environmentally constrained due to the presence of a battery thereon. In sharp contrast, passive tags can be less expensive, can have an unlimited shelf life without depletion, can be relatively safe to dispose, can be relatively compact and can withstand harsher operating environments.

Notwithstanding these potential advantages, a major factor that may limit the availability of passive RFID tags is the ability to wirelessly project sufficient power to power the RFID tag.

In particular, RF communication among electronic devices currently is used across the RF spectrum. For example, cellular radiotelephones are widely used. In the United States, the Federal Communications Commission (FCC) regulates usage of electromagnetic radiation.

Unfortunately, the amount of power that is used to operate electronics may be orders of magnitude more than is used to exchange information. Accordingly, notwithstanding the advent of low power microelectronic devices, the ability to transmit enough power to be extracted by a remote microelectronic device may be difficult. In wirelessly projecting power to wirelessly power microelectronic devices, the biggest constraint may be the government regulations concerning permissible RF field strength.

Electromagnetic field emanation from an antenna classically is categorized as "near field" and "far field." Generally, electronic components that carry RF currents or voltages produce both types of fields. However, the relative amount of each field may vary greatly.

From an RF energy standpoint, near field generally refers to RF energy that is stored in the immediate vicinity of the component and that is recovered at a later time in the alternating RF current cycle. An ideal inductor is a perfect near field only device. Far field generally refers to the energy that radiates or propagates from a component as an electromagnetic wave. Thus, a real world inductor may produce some far field radiation. Conversely, an ideal dipole antenna produces no near field components but produces significant far field radiation. Real world dipole antennas may produce some near field components but generate large amounts of far field radiation.

Thus, the far field is the component of energy that permanently leaves an antenna or any other component, radiating or propagating into the environment as an electromagnetic wave. Conversely, in each cycle, a near field is created and the energy associated with the near field is stored in the space around the antenna. As the near field collapses, the energy is transferred back onto the antenna and drive circuitry.

It will be understood that the terms "near field" and "far field" classically also may be defined relative to the wavelength of the energy under consideration. As used herein, far field denotes energy at distances greater than about one wavelength, for example, greater than about 22 meters at 13.56 MHz and greater than about 31.6 cm at 950 MHz. Conversely, near field refers to energy that is less than about one wavelength in distance. For practical purposes, near field generally may be considered to be a fraction of a wavelength, while far field may generally be considered to be multiple wavelengths so that there may be an order-of-magnitude difference therebetween.

Near field and far field also may be distinguished by the drop-off of power from the antenna. Power in the far field generally drops off from a source antenna without gain as a function of $1/(\text{distance})^2$. In contrast, power in the near field generally may exhibit a more complex relationship. At distances that are far less than one wavelength, the individual current carrying elements of the antenna may produce a near field that decreases, remains constant or may even increase with distance. Moreover, at distances that approach one wavelength, power generally drops off much quicker with distance compared to the far field, with some components dropping off as fast as $1/(\text{distance})^8$, others closer to $1/(\text{distance})^4$.

Antennas generally are designed to communicate over great distances. Accordingly, antennas generally are designed to optimize the far field for a particular application. Accordingly, FCC regulations also generally are written for far field radiation. For example, radiation typically is measured based on FCC standards at a distance greater than one wavelength because it is assumed that near field energy is greatly reduced at that distance. However, there also are FCC guidelines that relate to maximum exposures to electromagnetic radiation that can impact near field intensity limits.

For purposes of wirelessly projecting power to wirelessly power microelectronic devices, it would be desirable to increase the near field component of energy without increasing the far field component of energy sufficiently to violate FCC regulations. Preferably, the near field component also is not increased to the point where maximum exposure as stated by the FCC guidelines occurs too quickly. By increasing the near field component of energy, the microelectronic devices may be powered by the field that is stored in the space around the radiator. By not increasing the far field, the energy that propagates outward and that is not reclaimed may be reduced, and violation of government regulations that govern far field energy may be prevented. Unfortunately, when the near field is increased in order to extend the range at which power may be projected to wirelessly power microelectronic devices, the far field also may increase, thereby increasing the likelihood of regulatory violations.

SUMMARY OF THE INVENTION

It is therefore an object of the present invention to provide systems and methods for wirelessly projecting power to wirelessly power microelectronic devices.

It is another object of the present invention to provide systems and methods that can project power to wirelessly power microelectronic devices over longer distances, and can reduce the likelihood of violating regulatory constraints.

These and other objects can be provided according to the present invention by an array of in-phase current loops that are disposed adjacent to one another to define a surface and to define a virtual current loop at a periphery of the surface that produces a same direction virtual current while current in adjacent portions of adjacent current loops flows in opposite directions, to thereby wirelessly project power from the surface. It has been found according to the invention that the array of in-phase current loops that are disposed adjacent to one another to define a surface and to define a virtual current loop at a periphery of the surface that produces a same direction virtual current while current in adjacent portions of adjacent current loops flows in opposite directions, can provide acceptable power to RFID tags, while reducing the risk of violating regulatory constraints.

It will be understood that, as used herein, the terms "in-phase", "same direction", "opposite direction" and "out-of-phase" refer to relationships at a given point in time. In particular, since alternating currents are used, that vary over time, the terms "in-phase", "same direction", "opposite direction" and "out-of-phase" refer to instantaneous current relationships. Moreover, it also will be understood that the terms "in-phase", "same direction", "opposite direction" and "out-of-phase" refer to current loops that are substantially in phase and virtual currents that are substantially in the same direction or substantially in opposite directions or out-of-phase. For example, current loops that are within ±20° of one another, more preferably ±10° of one another and most preferably of identical phase may be considered "in-phase." Virtual currents that are within ±20° of the same direction, more preferably within ±10° of the same direction and most preferably identically in the same direction may be considered to be in the "same direction." Finally, current loops or currents that are within 180°±20° of one another, more preferably 180°±10° of one another and most preferably 180° out-of-phase with one another may be regarded as being in the "opposite direction" or "out-of-phase."

Without being bound by any theory of operation, the present invention may be explained by dividing the classical near field as described above, into a "close-in near field" and a "mid field". The close-in near field refers to RF energy that is stored in the immediate vicinity an antenna, up to a distance of about the dimension of the antenna, such as the length of a dipole or the diameter of a loop. The mid field refers to RF energy that extends beyond the distance of about the dimension of the antenna to a distance of about one wavelength. Thus, for example, for a ten-inch diameter loop antenna that is radiating at 13.56 MHz, the close-in near field may extend from the plane of the loop to a distance of about ten inches, the mid field may extend from a distance of between about ten inches to about 22 meters and the far field may extend to distances that are greater than about 22 meters. It will be understood, however that since both the close-in near field and the mid field are components of the near field, they both comprise RF energy that is stored and recovered in the alternating RF current cycle.

It has been found, according to the invention, that an array of in-phase current loops that are disposed adjacent to one another to define a surface and to define a virtual current loop at a periphery of the surface that produces a same direction virtual current while current in adjacent portions of adjacent current loops flows in opposite directions, can reduce far field radiation so that the likelihood of violations of government regulations can be reduced. Moreover, by reducing far field radiation, the current in the array of in-phase current loops that are disposed adjacent to one another to define a surface and to define a virtual current loop at a periphery of the surface that produces a same direction virtual current with current in adjacent portions of adjacent current loops flowing in opposite directions, can be increased to thereby allow an increase in mid field components. Sufficient mid field components to power RFID tags thereby may be provided, without violating government regulations concerning far field radiation.

In one preferred embodiment of the present invention, the array of in-phase current loops comprises an array of at least three wedge-shaped current loops each having an outer portion and a pair of sides. The at least three wedge-shaped current loops are disposed adjacent to one another to define a surface such that the virtual current loop defined by the outer portions flow in same directions and current in adjacent sides of adjacent current loops flow in opposite directions. The wedge-shaped current loops may be identical or mirror imaged. Two wedge-shaped current loops also may be provided, wherein each wedge is semicircle-shaped.

In another embodiment, the array of in-phase current loops comprises an array of at least two polygonal current loops, such as hexagonal current loops, each having a plurality of sides. The at least two polygonal current loops are disposed adjacent to one another to define a surface and a virtual current loop at the periphery of the surface that produces a same direction virtual current, with current in adjacent portions of adjacent current loops flowing in opposite directions. Stated differently currents in the sides of the at least two polygonal current loops that comprise the outer boundary are in-phase and currents in adjacent sides of adjacent current loops are out-of-phase. In yet another embodiment, the current loops may be circular or elliptical in shape.

In all of the above-described embodiments, the surface preferably is a planar surface. However, non-planar surfaces such as spheroidal surfaces also may be used. The surface may be a physical surface in which the array of in-phase current loops are mounted or may be a virtual surface defined by the array of in-phase current loops. Each of the current loops may be a spiral current loop, a concentric current loop and/or a stacked current loop. The length of each current loop preferably is less than a quarter wavelength.

In a preferred embodiment, a driver drives the array of current loops at 13.56 MHz to thereby wirelessly project power. The frequency of 13.56 MHz preferably is used because the FCC allows relatively large amounts of field strength at this frequency. In particular, in the range of 13.56 MHz±7 KHz, FCC regulations allow 10,000 $\mu$V/m, whereas immediately outside that range only 30 μV/m may be allowed. However, other frequencies also may be used in the United States and in other countries.

In order to allow further reduction of the far field electromagnetic waves and further increases in current to provide additional mid field electromagnetic field strength, a plurality of arrays of in-phase current loops may be provided. The multiple arrays of in-phase current loops are disposed adjacent to one another to define a surface. Each array of in-phase current loops may be configured as was described above.

In a preferred embodiment that uses multiple arrays of in-phase current loops, the virtual current loops of adjacent arrays of in-phase current loops produce different phase virtual currents from one another. Specifically, four arrays of in-phase current loops may be provided that are arranged in two rows and two columns, such that the virtual current loops in the arrays in each row and each column are of opposite phase. In another embodiment, the virtual currents in the arrays in each row and each column are approximately 90° out-of-phase from one another. The two rows and columns may be orthogonal or non-orthogonal. Preferably, the two rows and two columns are obliquely arranged relative to the horizontal so that a tag passing across the plurality of arrays in the horizontal direction will encounter varying fields to thereby increase the likelihood of receiving sufficient power.

In another embodiment, six arrays of in-phase current loops may be provided that are arranged in four rows and two columns. In the first row, the phases of the virtual currents of the two arrays differ by approximately 60°. In the second row, the virtual currents of the two arrays flow in same directions, and in the third row, the phases of the virtual currents of the two arrays differ by approximately 60°. Viewed along the first column, the phases of the virtual currents are approximately 0°, 120° and 60° and along the second column the phases of the virtual currents are approximately 60°, 120° and 0°.

In another embodiment, a plurality of arrays of in-phase current loops are arranged in a circle, such that the virtual currents in adjacent arrays in the circle are of opposite phase. Alternatively, the phases may differ by approximately 360°/n, where n is the number of arrays of in-phase current loops that are arranged in a circle. The plurality of in-phase current loops also may be arranged in an elliptical shape or a polygonal shape. They may be overlapping or spaced apart.

Accordingly, reduced far field radiation may be produced by systems and methods according to the present invention. By producing reduced far field radiation, the current in the current loops may be increased to thereby increase the mid field strength without violating government regulations for far field radiation. In order to reduce the close-in near field without significantly changing the mid field or far field, the outer portions of the wedge-shaped current loops also can be implemented as multiple loops that are spatially separated, while the sides of the wedges can remain the same. Thus, the close-in near field may be reduced so that exposure time under FCC guidelines can be increased.

Having provided systems and methods for wirelessly projecting power to wirelessly power microelectronic devices, other problems in RFID tags also may be solved according to the present invention. These solutions can provide improved systems and methods for identifying a plurality of RFID tags that are simultaneously interrogated on a single communication channel. As is well known to those having skill in the art, RFID tags may conflict with one another when responding to a single RFID reader since the tags transmit on the same frequency and within the same time slot. Thus, multiple responses may be generated in response to a single request to read multiple tags.

It is known to use a binary tree in order to bitwise interrogate the activated tags. Unfortunately, the use of a binary tree may be too slow and may be dependent on maintaining a high level of synchronization for extended periods. Moreover, tags entering or leaving the volume during traversal of the tree may not be addressed.

According to one aspect of the present invention, each identification tag comprises at least four identification bits. At least two identification bits in each of the identification tags are simultaneously interrogated to obtain a predetermined response from each of the identification tags having a predetermined bit value for each of the at least two identification bits. Thus, an N-ary tree is used rather than a binary tree where N is three or more. Higher identification speeds thereby may be obtained.

Speed also may be further increased, by not traversing the tree down to all of its nodes. Rather, once the tree is traversed at least part way so that the number of possible tags to be identified is reduced, each of the tags having a predetermined bit value for at least two identification bits may be serially interrogated to obtain at least two additional identification bits from each of the identification tags having a predetermined bit value for the at least two identification bits. The combination of multiple bit simultaneous interrogation and multiple bit serial interrogation can produce efficient methods and systems for identifying a plurality of RFID tags that are simultaneously interrogated on a single communication channel.

Finally, the present invention can provide efficient methods for traversing the tree of identification bits. In particular, a tree of identification bits is defined, the tree comprising a plurality of nodes at a plurality of levels that define differing values for subsets of the plurality of identification bits. A first subset of a plurality of identification bits in each of the identification tags that correspond to a first node at a first level of the tree are simultaneously interrogated to obtain a predetermined response from each of the identification tags that correspond to the first node at the first level of the tree. If at least one tag in the first subset responds, a "push" command may be used to descend the tree one level, to simultaneously interrogate a second subset of a plurality of identification bits in each of the identification tags that correspond to a second node at a second level of the tree, to thereby obtain a predetermined response from each of the identification tags that correspond to the second node at the second level of the tree. For N-ary trees, N distinct push commands may be used to identify a unique path in the N-ary tree.

A "pop" command may then be used to ascend one level in the tree. Another "push" command may then be used to descend an alternate branch of the tree by simultaneously interrogating a third subset of the plurality of identification bits in each of the identification tags that correspond to a third node at the second level of the tree to obtain a predetermined response from each of the identification tags that correspond to the third node at the second level of the tree. Thus, by using "push" and "pop" commands, the tree may be navigated efficiently and need not be repeatedly navigated from top to bottom. Accordingly, the data in the tags that are powered can be ascertained quickly and accurately. It will be understood that, as used herein, the terms "first," "second" and "third" refer to any three relative levels of a tree, and do not refer to absolute levels.

BRIEF DESCRIPTION OF THE DRAWINGS

FIG. 7C illustrates a plurality of arrays of in-phase current loops arranged in a circle according to the present invention;

FIG. 16 illustrates a pair of spaced apart arrays according to the invention;

FIG. 17 illustrates a pair of far field cancellation antennas about an array according to the present invention;

FIG. 18 illustrates a single current loop.

FIGS. 22, 24, 26, 28, 30, 32, 34, 35 and 37 illustrate various configurations of arrays of current loops according to the present invention;

DETAILED DESCRIPTION OF PREFERRED EMBODIMENTS

Figure 1A:
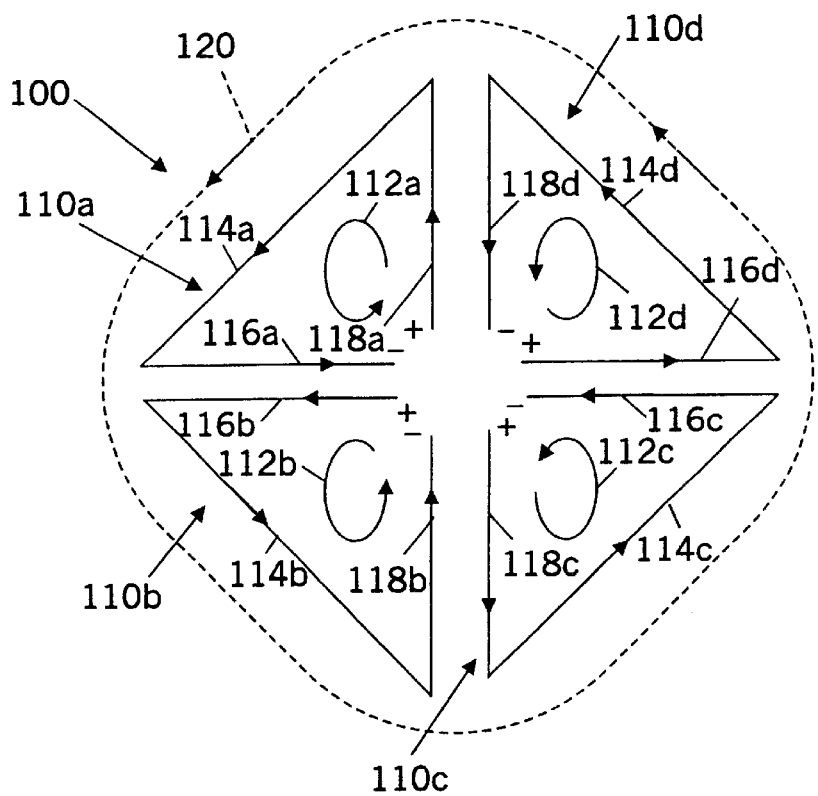
FIG. 1A is a schematic diagram of systems and methods for wirelessly projecting power according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the dimensions may be exaggerated for clarity. Like numbers refer to like elements throughout.

The present invention provides antenna configurations that can emphasize the mid field without producing undue amounts of close-in near field or far field. Thus, greater powering distances may be achieved that may not violate governmental regulations and/or guidelines. Accordingly, the present invention provides antenna configurations that can effectively project the mid field while simultaneously reducing at least some of the far field and distributing the close-in near field to reduce the peaks thereof. The mid field therefore can be extended without generating undue amounts of close-in near field or far field.

Existing RFID systems may use the far field to power the RFID tags. These systems may use high frequency ranges because the wavelength is short and the close-in near field and even the mid field is attenuated after a few centimeters. By using a higher frequency, physically smaller antennas may be used and faster operation and collimation of energy beams may be provided. However, by using the mid field, according to the present invention, at least two advantages may be provided. First, the FCC and other regulatory agency regulations generally are measured in the far field and are not violated by mid field radiation. Moreover, since the energy of the mid field may be recovered, except for those portions which are lost due to parasitic resistive loading and very low levels of radiated field each cycle, the overall power that is used to extend or project the field into the mid field may be reduced. This contrasts with the power of the far field which generally is lost to propagation. Thus, mid field use can provide portable or battery-powered applications.

Moreover, the use of the magnetic field rather than the electric field may have advantages. For example, the magnetic field lines form a loop, starting on one surface of the antenna and looping around to the other. Any loop or series of loops through which the flux lines penetrate can be used to extract power. Electric fields also may have more of an effect on the human body than magnetic fields. Accordingly, many of the newest standards may allow for higher exposure limits for magnetic fields. Finally, electric fields generally do not penetrate conductors whereas magnetic fields can penetrate non-ferrous materials such as aluminum and copper.

Unfortunately, there are problems that classically may be associated with using the near field. In particular, drop-off with distance generally is extremely fast. Moreover, generation of a strong near field component generally also produces a proportional far field component. Finally, the three-dimensional shape of the near field tends to have nulls as the field wraps around the current carrying wires.

The present invention can overcome these and other problems by providing an array of in-phase current loops that are disposed adjacent to one another to define a surface and to define a virtual current loop at a periphery of the surface. The virtual current loop produces a same direction virtual current along the periphery while the current in adjacent portions of adjacent loops flows in opposite directions.

FIG. 1A is a schematic diagram of systems and methods for wirelessly projecting power according to the present invention. It will be understood that more complicated embodiments and more simple embodiments also may be provided as will be described in detail below.

Referring now to FIG. 1A, an array 100 of four wedge-shaped in-phase current loops 110a–110d are disposed adjacent to one another to define a surface in the plane of the antenna (corresponding to the plane of the paper of FIG. 1A) and to define a virtual current loop 120 at a periphery of the surface that produces a same direction virtual current. The in-phase nature of the current loops 110a–110d is indicated in three different ways in FIG. 1A. First, "+" and "−" signs are included for each current loop 110a–110d to indicate how the loops may be driven from a common voltage and/or current source. Second, arrows in each leg of each current loop indicate direction of current flow at a given point in time. Finally, an arrow 112a–112d inside each current loop indicates counter-clockwise in-phase current flow in each current loop 110a–110d at a given point in time.

Accordingly, the current that flows in the same direction at the outer legs 114a–114d of current loops 110a–110d produce the same direction virtual current 120. The outer legs need not be straight. They may be arced, rippled and or may comprise multiple straight segments. In contrast, current in adjacent portions 116a–116b, 118b–118c, 116c–116d and 118d–118a of adjacent current loops 110a–110d flows in opposite directions. It has been found, according to the present invention, that an array 100 of in-phase current loops 110 can reduce far field for approximately the same value of near field compared to a single current loop. Acceptable power to RFID tags thereby may be provided while reducing the risk of violating regulatory constraints.

Figure 1B:
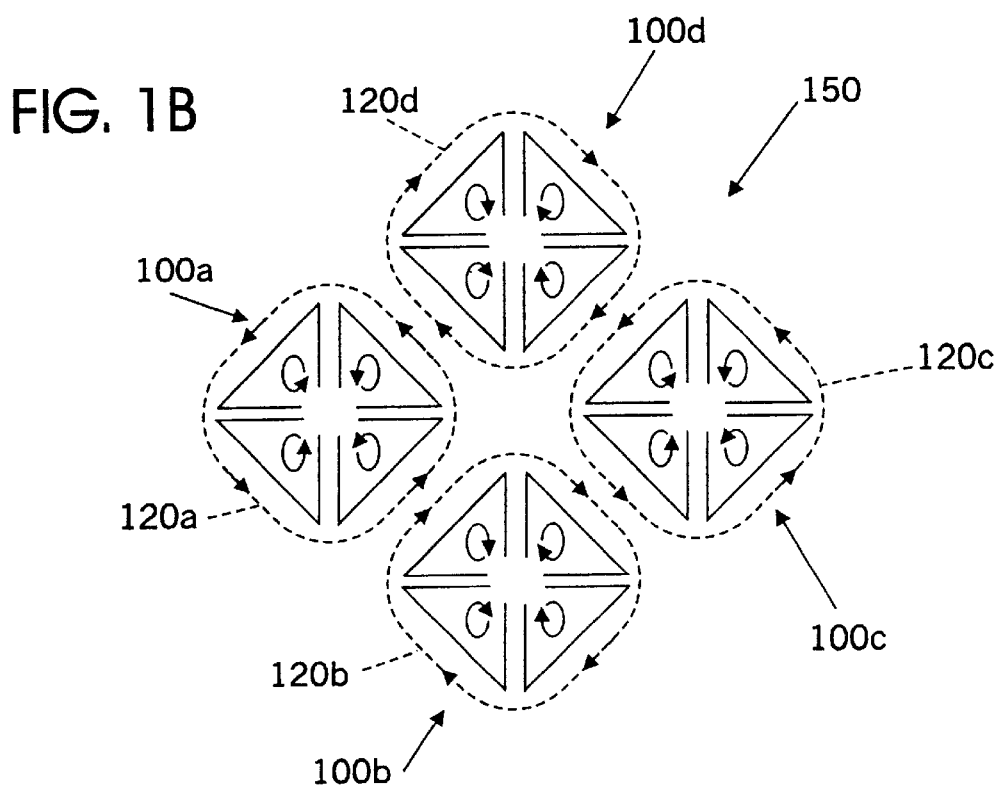
FIG. 1B illustrates another embodiment of systems and methods for wirelessly projecting power according to the present invention.

FIG. 1B illustrates another embodiment of systems and methods of the present invention that can provide additional reduction of far field and further increase of the mid field. As shown in FIG. 1B, the systems and methods 150 include a plurality of arrays 100a–100d of in-phase current loops. The arrays 100a–100d of in-phase current loops are disposed adjacent to one another to define a surface. As also shown in FIG. 1B, each array of in-phase current loops defines virtual currents 120a–120d such that virtual currents of at least some adjacent arrays of in-phase current loops are out-of-phase with one another. Thus, the virtual currents 120a and 120b are out-of-phase with one another, and the virtual currents 120a and 120c are in-phase. Each array of in-phase current loops 100a–100d can contain a structure such as was described in FIG. 1A and will not be described again.

The present invention preferably uses an electrically small spiral or loop antenna for a current loop 110, which may be an inefficient radiator or producer of a strong far field. This may be achieved by using loops or spirals that are electrically very short. Preferably, the loop or spiral is much less than one-quarter of a wavelength. FIGS. 2A–2E conceptually illustrate current loops 110 comprising a single loop, multiple loops, a two-turn spiral, a multi-turn spiral and concurrent loops, respectively. The length of each of the conductors is preferably much less than one-quarter of a wavelength to thereby provide an inefficient far field radiator.

Figure 2A:
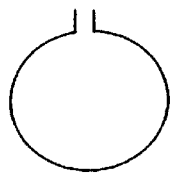
FIGS. 2A–2E conceptually illustrate various embodiments of current loops according to the present invention.
Figure 2B:
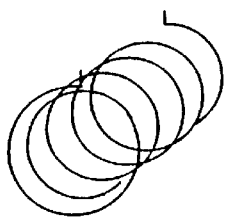
Figure 2C:
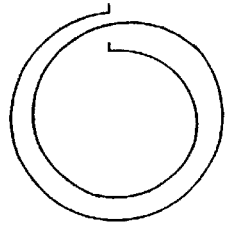
Figure 2D:
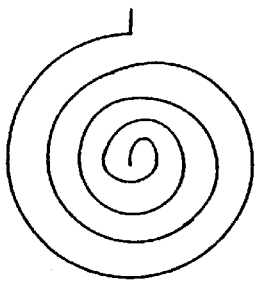
Figure 2E:
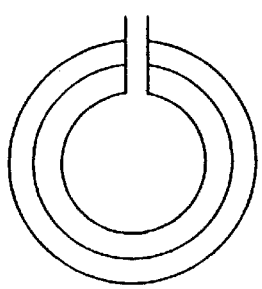

Spirals may be used to maximize the number of ampere turns in a planar environment and hence develop a strong mid field. FIGS. 2C, 2D and 2E illustrate that the strength of a magnetic field created by current flowing in a wire may be increased by increasing the current or the length of the wire in the loops or spirals. In a plane, as on a printed circuit board, the length also may be increased with more turns in the spiral.

Figure 3A:
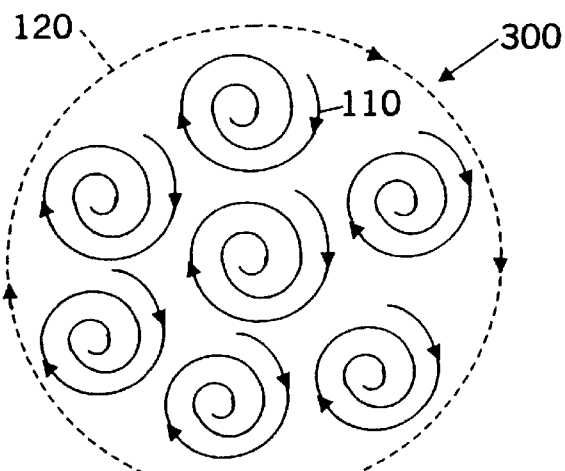
FIG. 3A illustrates an array of in-phase spiral current loops according to the present invention.

FIG. 3A illustrates another embodiment of systems and methods of the present invention. Instead of wedges to provide a virtual current, loops, spirals or polygons can be arranged such that adjacent current segments are out-of-phase and the periphery produces the in-phase virtual current loop. As shown in FIG. 3A at a point in time, all of the loop currents flow clockwise to produce a clockwise virtual current 120. As shown, where the loops are physically close, the currents of adjacent loops flow in opposite directions. The outer portions of the current loops are spatially separated to reduce the close-in near field without significantly effecting the mid field. Both the close-in near field and the mid field may be related to the size of the current loops and the number of ampere turns. Unfortunately, the far field may not be completely independent of these parameters either. However, as will be described below, by using multiple arrays of arrays of in-phase current loops, far field emissions can be reduced more than the reduction in the mid field projection.

Figure 3B:
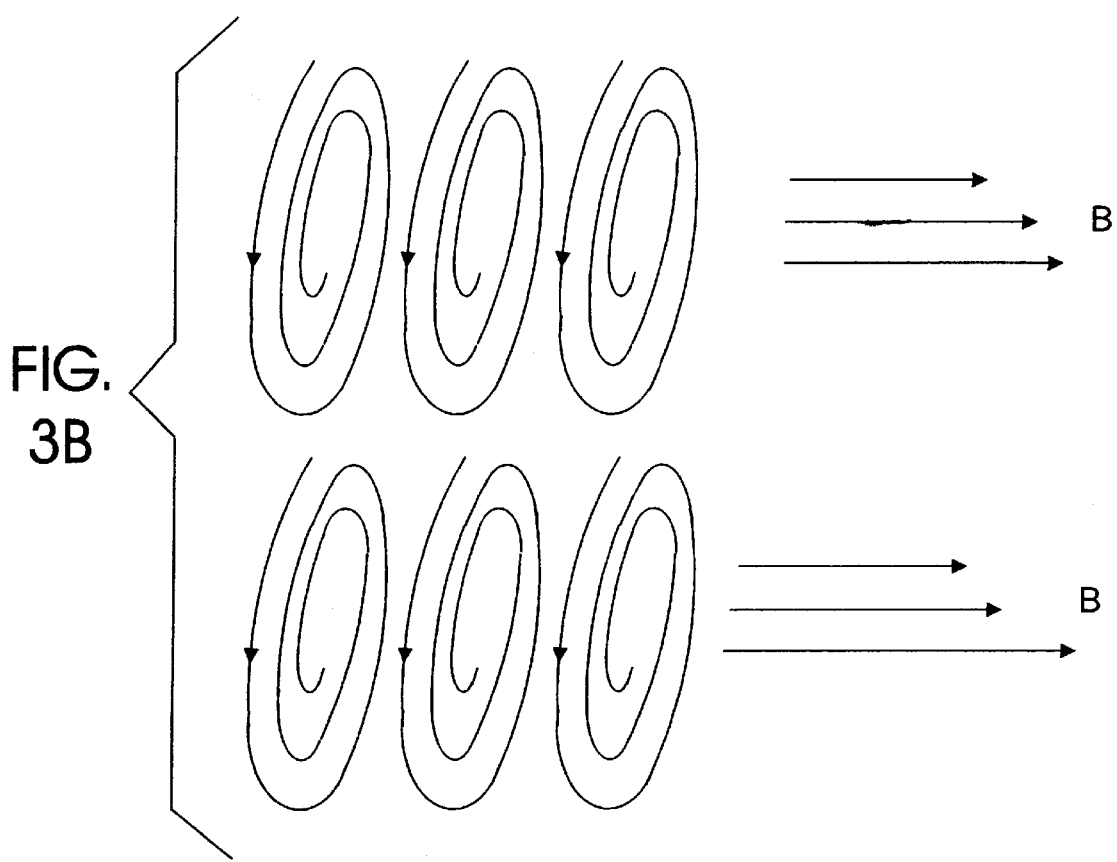
FIG. 3B illustrates an array of in-phase elongated spiral current loops according to the present invention.
Figure 3C:
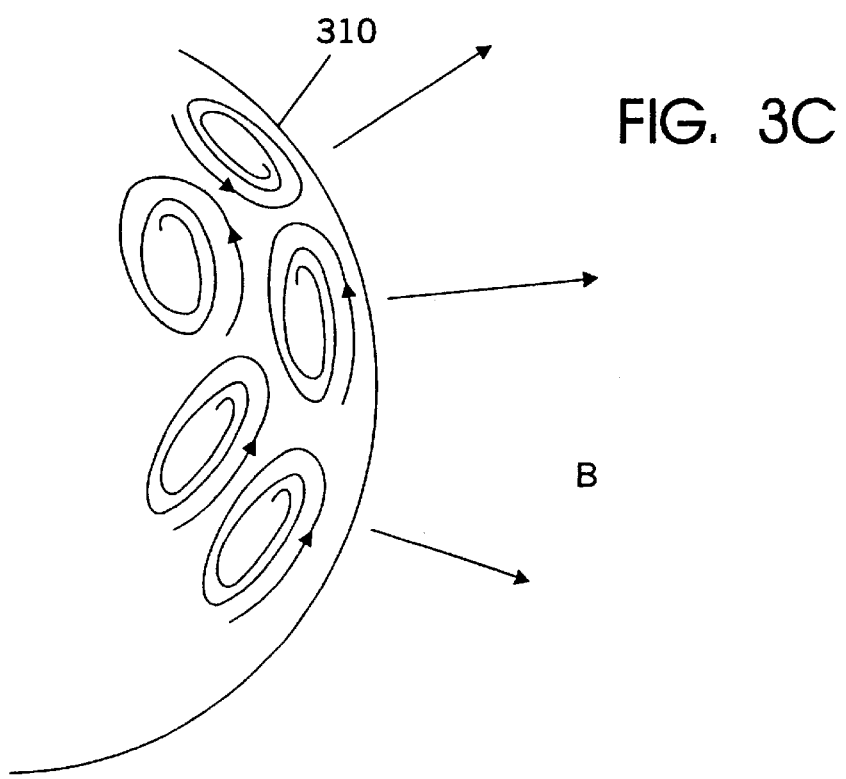
FIG. 3C illustrates an array of in-phase spiral current loops that are disposed adjacent to one another to define a non-planar surface according to the present invention.

FIG. 3B illustrates an array of in-phase elongated spiral current loops. FIG. 3C illustrates an array of in-phase spiral current loops that are disposed adjacent to one another to define a non-planar surface 310. In particular, in FIG. 3C, the spirals are mapped onto the surface of the sphere.

Figure 4:
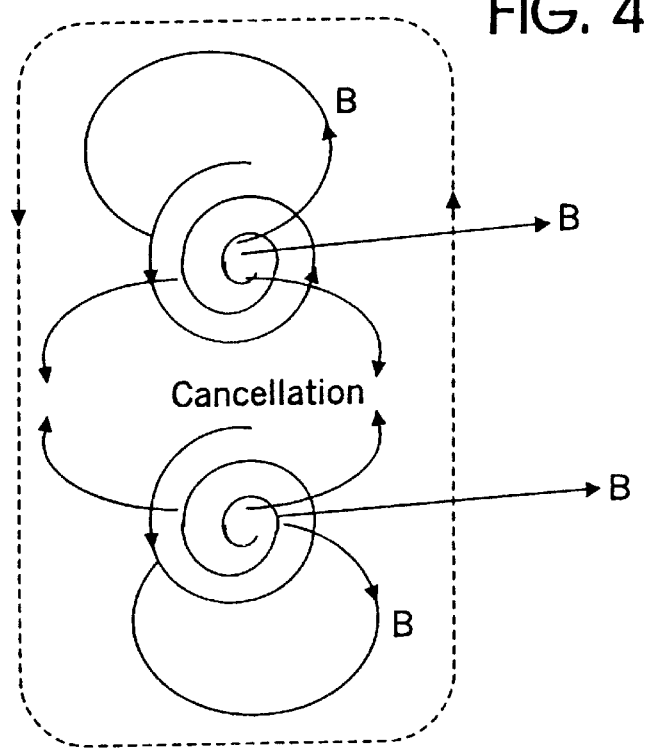
FIG. 4 illustrates field cancellation in a local cancellation area according to the present invention.

Without wishing to be bound by any theory of operation, the virtual current creates a magnetic field (B) which loops around the virtual current loop. The virtual current loop with the virtual current flowing through it creates a dipole of magnetic field which appears like an oval of revolution. At the center of the loop, the magnetic field is normal to the plane of the loop. The bigger the loop, the farther the mid field projects. Closer to the wire segment, the field loops around the wire. Two wire segments carrying equal currents in the opposite direction placed physically close to each other generally produce very little fields because they cancel near field and far field alike. Therefore, current segments on the periphery of the array may be the only significant source of field generation. Since at least some of the far field is due to the phase difference of the current around the loop, keeping the outer loop segments closer to in-phase can reduce the far field generation. Accordingly, an array of in-phase current loops as shown in FIGS. 1A and 3A–3D produce a desired effect for the reasons shown in FIG. 4. FIG. 4 illustrates field cancellation due to adjacent, opposite current carrying segments and a virtual current loop due to the more "in-phase" periphery currents.

It may be difficult to obtain further projection of the mid field by simply increasing the size of the current carrying loop indefinitely due to wavelength considerations. As a loop approaches a significant percentage of the wavelength, it generally becomes a better far field radiator. At a quarter wavelength, a loop that carries even a small current, may transmit enough far field radiation to violate FCC regulations. This appears to be due, at least in part, to current phasing around the loop. Accordingly, in order to reduce far field radiation while producing acceptable levels of mid field, it appears to be desirable to maintain the virtual current loop in-phase so that the same direction virtual current is produced throughout the virtual current loop. Thus, if the virtual current is maintained in-phase around the periphery of the array of current loops, increased mid field may be produced while producing reduced far field.

Figure 5A:
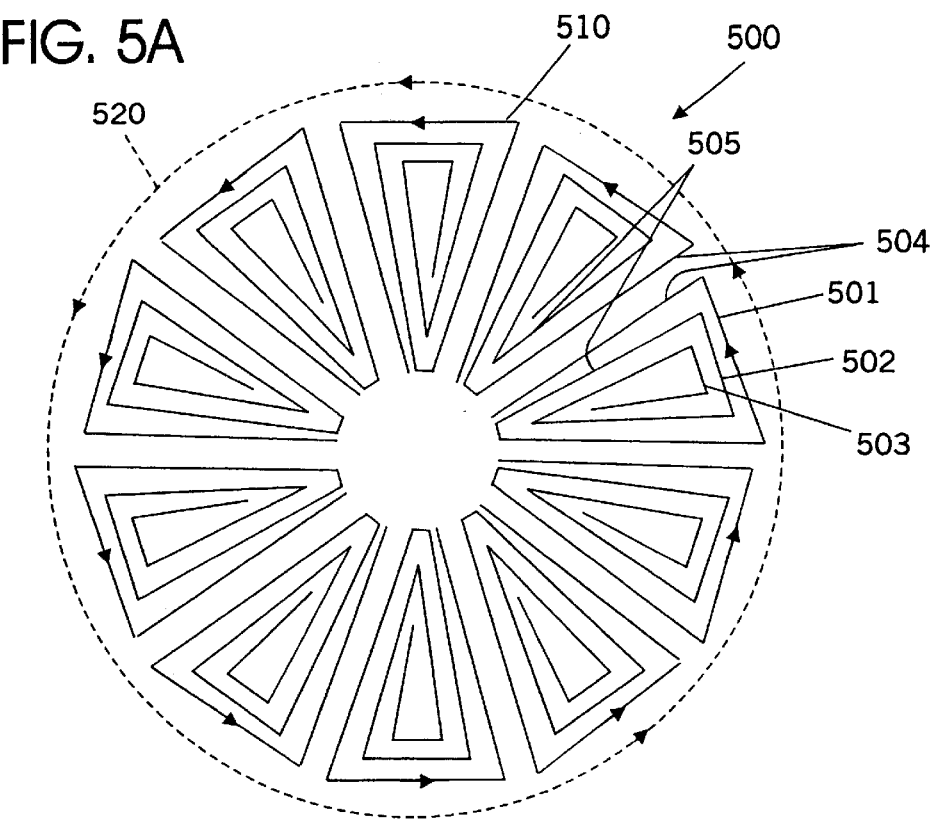
FIGS. 5A–5D illustrate alternate configurations of ten wedge-shaped spiral in-phase current loops according to the present invention.
Figure 5B:
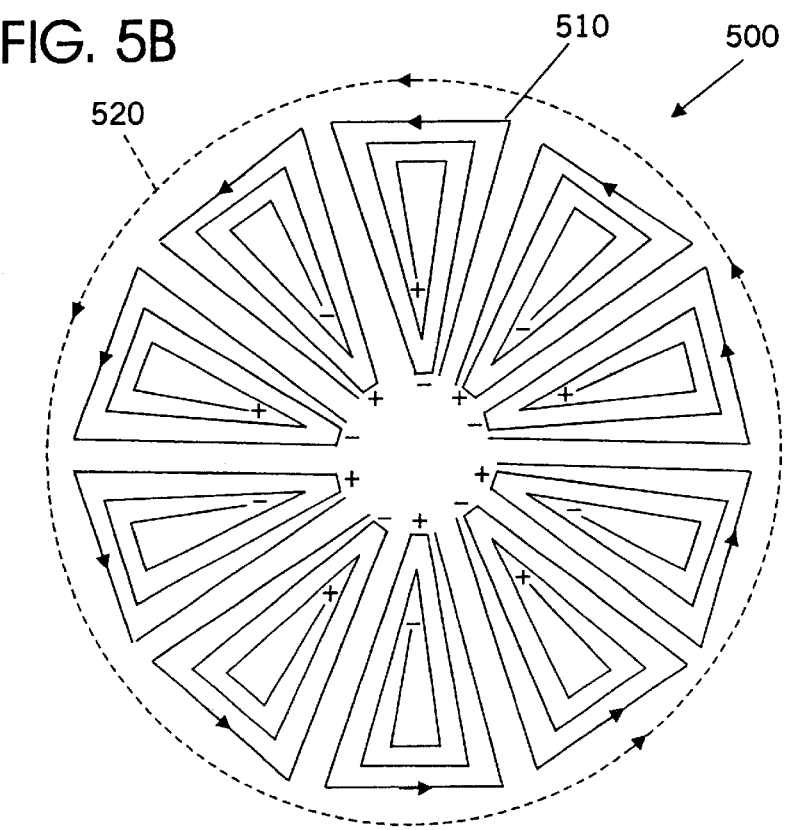
Figure 5C:
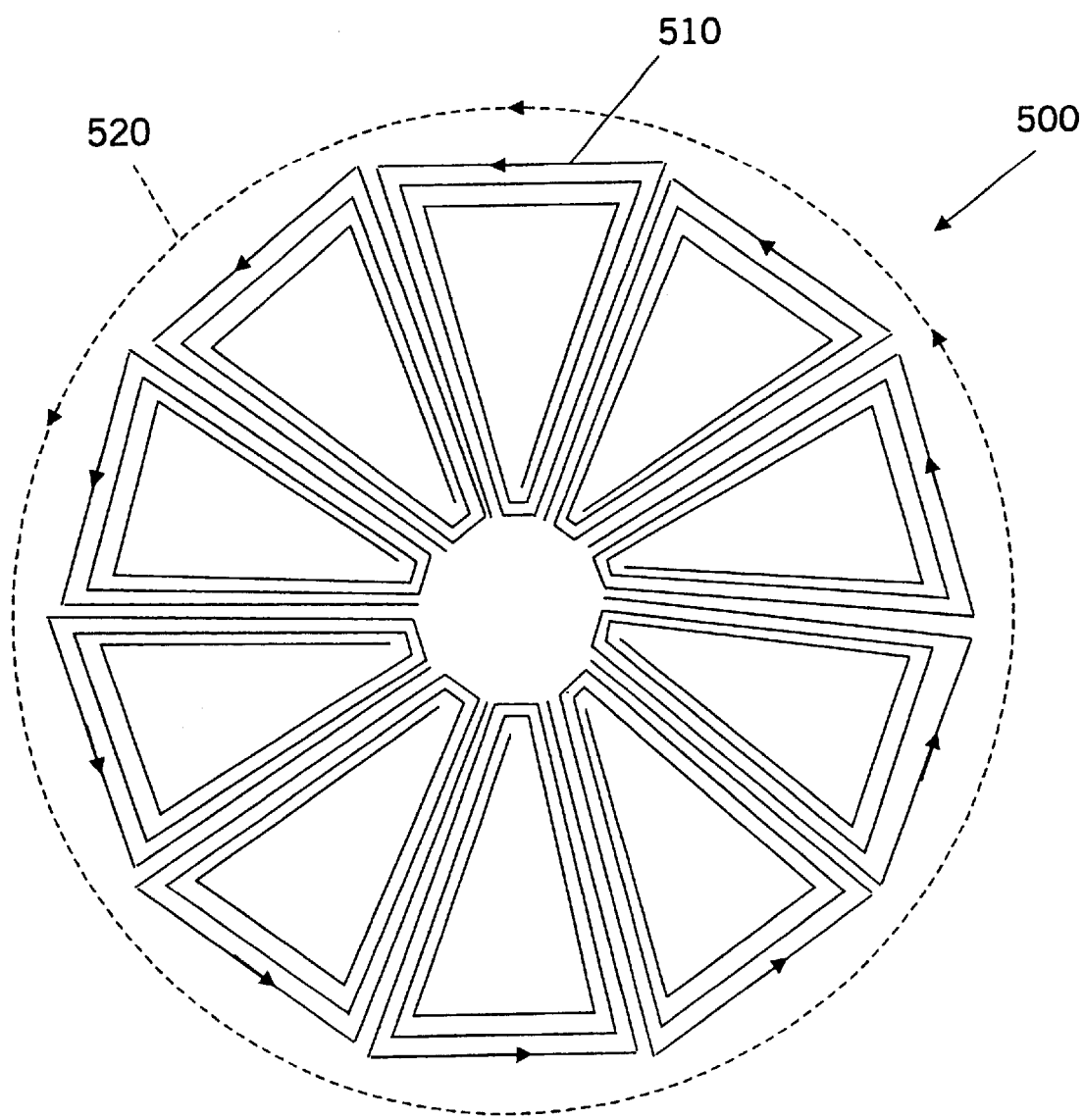

FIGS. 5A–5C illustrate configurations of ten wedge-shaped spiral in-phase current loops 510 that produce a virtual current loop 520. As shown, cancellation of current in adjacent legs of the wedges may take place so that the mid field projection may be produced by the outside legs of the wedges that define the virtual current loop 520. Since the currents on the outside legs are the same distance from the driving point of the array, they are in-phase. Accordingly, the configurations of FIGS. 5A–5C can use a reduced amount of canceling wire, thereby using less power, while generating less far field.

In particular, FIG. 5A illustrates ten identical wedge-shaped three-loop spiral in-phase current loops. It will be understood that any number of wedges may be provided and any number of loops may be provided in the spirals. The virtual current loop 520 is created by the in-phase current contributions of the three outer portions 501–503 of the wedges. The fields created by the legs of adjacent wedges such as legs 504 and 505, preferably substantially cancel.

FIG. 5B illustrates a similar configuration to FIG. 5A, except that alternating wedges are mirror images of one another. In this configuration, an even number of wedges preferably are provided. As in FIG. 5A, the virtual current loop 520 is created by the in-phase current contributions of the three outer portions 501–503 of the wedges. The fields created by the legs of adjacent wedges, such as legs 504 and 505 substantially cancel. Improved cancellation may be obtained compared to FIG. 5A because pairs of canceling legs may be the same length and the same distance from the "+" driving point. The + and − signs indicate how the array may be driven, with all + points electrically connected together and all − points electrically connected together.

FIG. 5C illustrates a similar configuration to FIG. 5A, except the legs of the wedges are moved physically closer. They may even be stacked on different layers of a frame or multilayer printed circuit board so that they overlap one another. The closely spaced or overlapping legs can provide improved cancellation so that virtually all the field contribution comes from the virtual current produced by the three outer portions of each wedge. For the same driving current, this configuration can provide less far field and about the same mid field and the same close-in near field as the configuration of FIG. 5A. Thus, the current can be increased dramatically to produce far more mid field, without violating far field regulatory constraints.

It will be understood that the outer portions of the wedges also may be moved closer together or stacked, as well as the legs of the wedges. This can produce a far field that is the same as if three times the current was flowing in one outer portion. However, the close-in near field also may be approximately three times that of the close-in near field compared to having three legs with ⅓ of the current in each. Accordingly, in contrast with the legs, the outer portions preferably are not moved close together or stacked.

Conversely, if the outer portions are unduly separated, the mid field projection may be reduced since the mid field distance projection is related to the effective size of the outer portions. Thus, the outer portion 502 may not project as far as the outer portion 501. Moreover, the loops preferably are not made too large because the length of the legs may become a larger proportion of the overall length, the inductance may increase and the loop length may become appreciable with respect to the wavelength. The loops also may become too large physically for efficient manufacture and/or use.

Similar phenomenon may occur if too many loops are used in each spiral wedge. The overall loop length may make it difficult to reliably resonate the inductance. In other words, the inductance may become so large that an unreasonably small capacitance may be needed to resonate at 13.56 MHz.

Figure 5D:
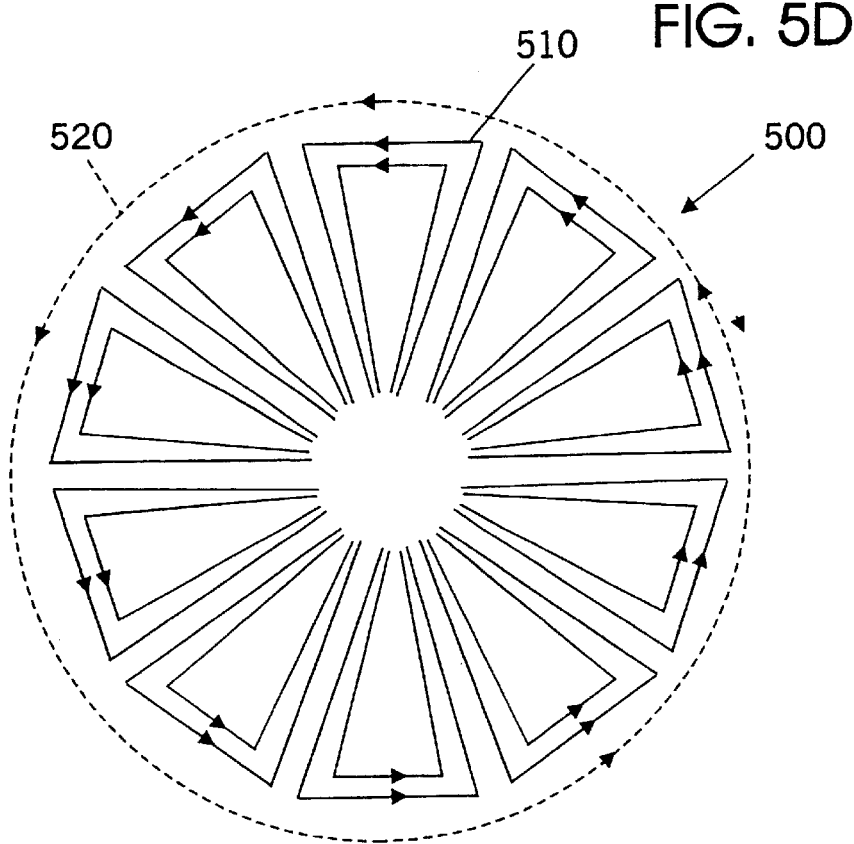

In order to reduce the resonance problem, each wedge may include two or more concentric loops that are wired in parallel, as shown in FIG. 5D. Each loop may be driven independently, with its own resonant capacitor or driver circuit. It also will be understood that the configurations of FIGS. 5A–5D may be combined, for example to provide a combined spiral and parallel loop approach.

Figure 6:
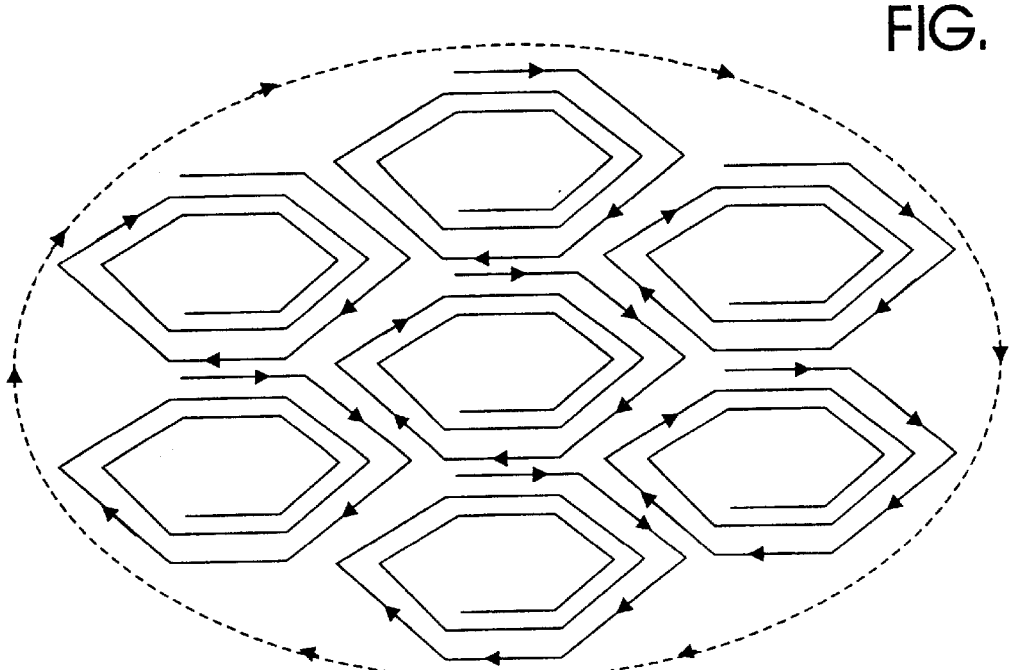
FIG. 6 illustrates an array of identical hexagonal-shaped in-phase current loops according to the present invention.

FIG. 6 illustrates an array of identical hexagonal-shaped in-phase current loops. As shown in FIG. 6, the six-edge pairs of wires can have identical current flowing in opposite directions. Magnetic fields of each of the spirals still project outward and add. The virtual current loop 520 projects mid field while allowing reduced far field. It will be understood that the current loops can be other polygonal shapes such as squares, triangles, rectangles, etc. and also can be circular or elliptical. Moreover, the array need not be symmetrical, and all the individual loops need not be identical. The hexagonal-shaped, in-phase current loops of FIG. 6 may allow shorter wire lengths of the individual loops. The inner segments may cancel well due to equal and opposite currents flowing adjacent to one another. The peripheral segments do not cancel, and produce the virtual current loop as shown in FIG. 6. By adding more hexagonal-shaped, in-phase current loops, the virtual current loop may be made larger. Similar effects may be obtained with triangle-shaped current loops. Other polygonal shapes such as hexagons may not be nested as well to provide almost complete cancellation of inner segments, due to the configuration of other polygons.

The arrays of in-phase current loops as illustrated in FIGS. 1A, 3A–3C, 5 and 6 may still produce some far field radiation. However, according to the invention, this far field radiation may be further reduced by providing multiple arrays of in-phase current loops wherein each array of in-phase current loops defines a virtual current such that virtual currents of at least some adjacent arrays of in-phase current loops are of differing phase with respect to one another. Since the far field is measured at 30 meters, per FCC Regulations Part 15, multiple arrays of in-phase current loops can produce the opposite radiation at 30 meters and thus cancel at least some more of the far field. By separating identical arrays by small distances, relative to the 22 meter wavelength, the strength of the close-in near and mid fields may not be affected as much as the far field.

Figure 7A:
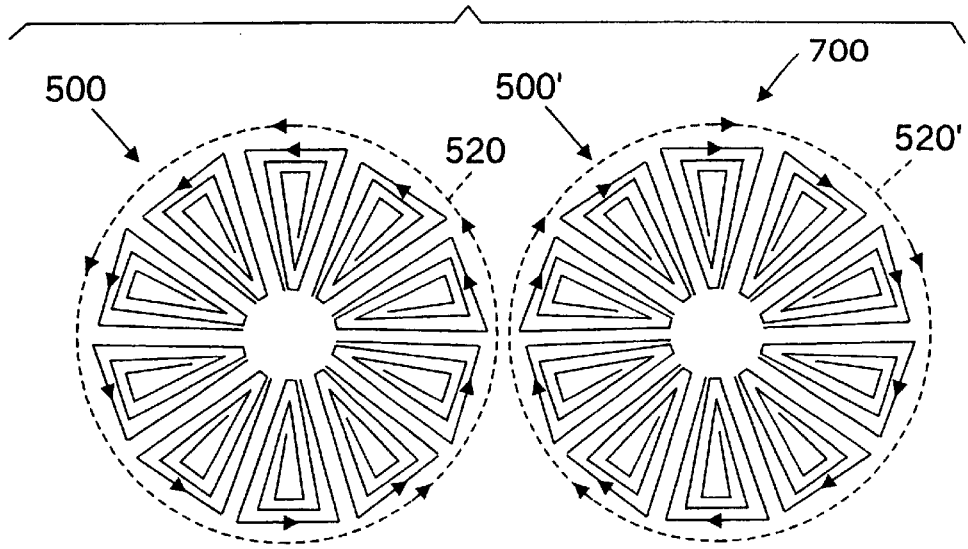
FIG. 7A illustrates two arrays of in-phase current loops according to the present invention.
Figure 7B:
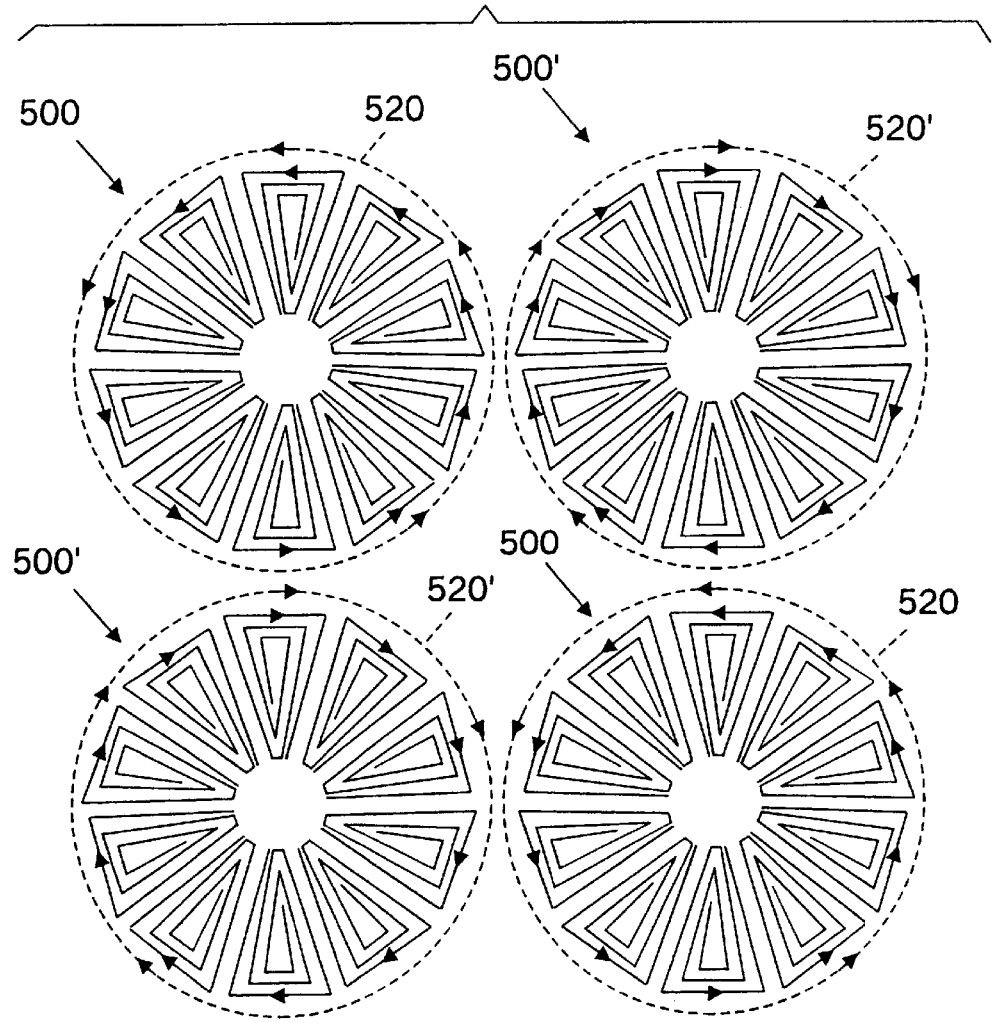
FIG. 7B illustrates two rows and two columns of arrays of in-phase current loops according to the present invention.

Thus, as shown in FIG. 7A, two arrays 500 and 500' of in-phase current loops are provided that define virtual currents 520 and 520' that are 180° out-of-phase with one another. Stated differently, they are of opposite phase. Although there may be some cancellation of the near field and mid field, there may be a larger amount of cancellation of the far field. FIG. 7B illustrates two rows and two columns of arrays of in-phase current loops with alternating clockwise and counter-clockwise virtual current flow. This arrangement may be able to cancel the far field in more directions better than the arrangement of FIG. 7A. It will be understood that the terms "row" and "column" are used herein to indicate two directions that are not necessarily horizontal and vertical.

FIG. 7C illustrates yet another arrangement wherein a plurality of arrays of in-phase current loops are arranged in a circle with the virtual currents of adjacent arrays being 180° out-of-phase with one another. In other alternative embodiment, the virtual currents of adjacent arrays are 180°/n or 360°/n out-of-phase with one another, where n is the number of arrays of in-phase current loops. These arrangements may be able to cancel the far field in still more directions.

In yet another embodiment, the virtual currents of a subset of the arrays are 180°/n or 360°/n out-of-phase where n is the number of arrays in a subset. Any integer number of subsets may be combined. Finally, in any of these embodiments, the individual arrays can be rotated to any angle with respect to one another, arranged in any order and/or placed in any pattern close together.

It also will be understood that one or more of the arrays may only include a single current loop. Thus, for example, an array of single current loops in any of the configurations and/or phase relationships described above may be used to project the mid field while reducing far field radiation. Using simple loops may allow less drive circuitry and may be acceptable in portable applications where projection into a relatively large volume may not be needed.

Figure 8:
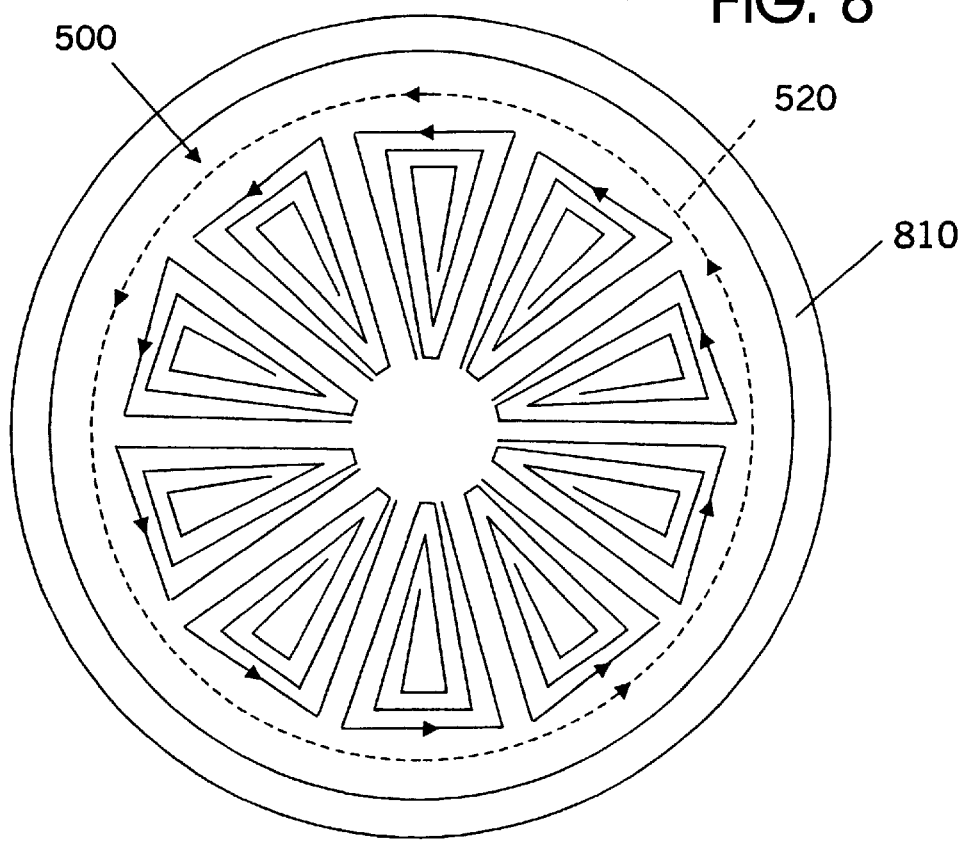
FIG. 8 illustrates a grounded shield surrounding an array of current loops according to the present invention.

The array also can use a shield around the outside edge to absorb spurious far field generated by the array. See FIG. 8 which shows a grounded metal shield 810 that can comprise steel or iron, surrounding the outside of an array to reduce spurious far field propagation. It will be understood that the shield may be placed around individual loops, individual arrays or a plurality of arrays.

The impedance of each spiral may be dependent on the configuration and current flowing in adjacent elements. By controlling the current to thereby match the different impedances of each current loop individually, the overall performance also can be improved.

Figure 9A:
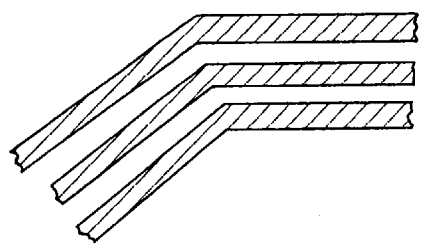
FIGS. 9A, 9B, 10 and 11 illustrate printed circuit board embodiments of the present invention.
Figure 9B:
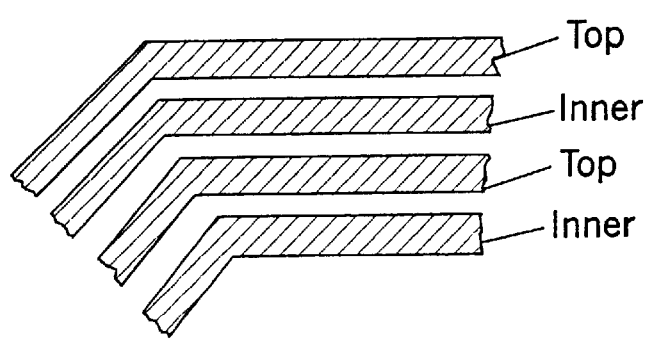
Figure 10:
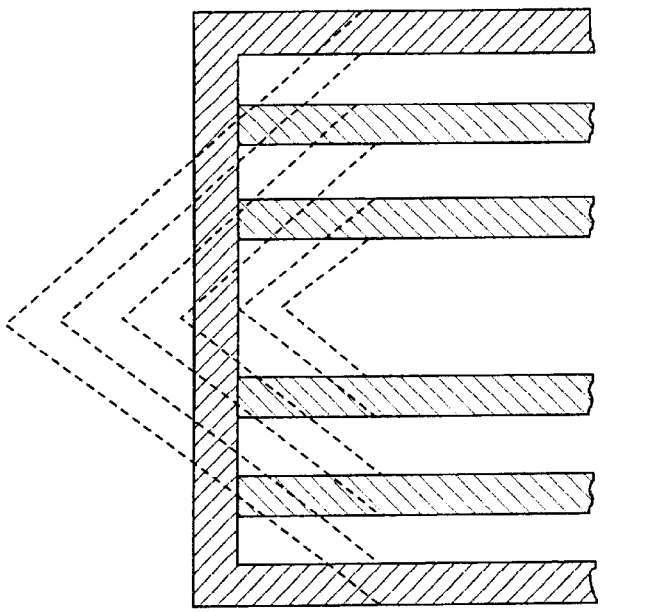
Figure 11:
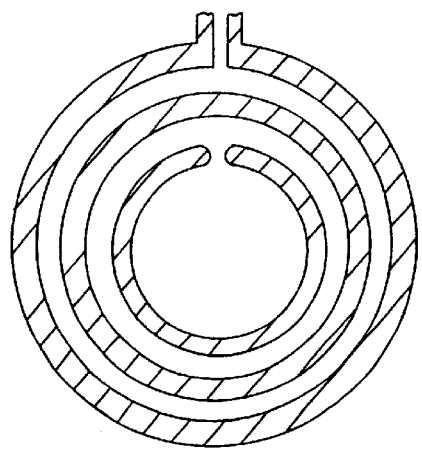

It will be understood that the current loops of the present invention may be freestanding wires. A supporting frame that supports the wires at various points also may be provided. Moreover, the current loops may be formed on a substrate that can support the entire plurality of arrays of current loops. The substrate may be one or more printed circuit boards. Multi-layer circuit boards may be utilized to run wires with currents behind or interdigitated with existing elements. See FIG. 9A which illustrates traces on a printed circuit board that may be stacked on different levels and FIG. 9B which illustrates interdigitated top level and interlevel traces. Moreover, as illustrated in FIG. 10, the edge of the outside spirals may be stacked to promote single line cancellation. Large currents or extreme phase control of the individual turns also may be implemented with concentric loops instead of spirals which may be implemented by multi-layer printed circuit boards. See FIG. 11.

Figure 12:
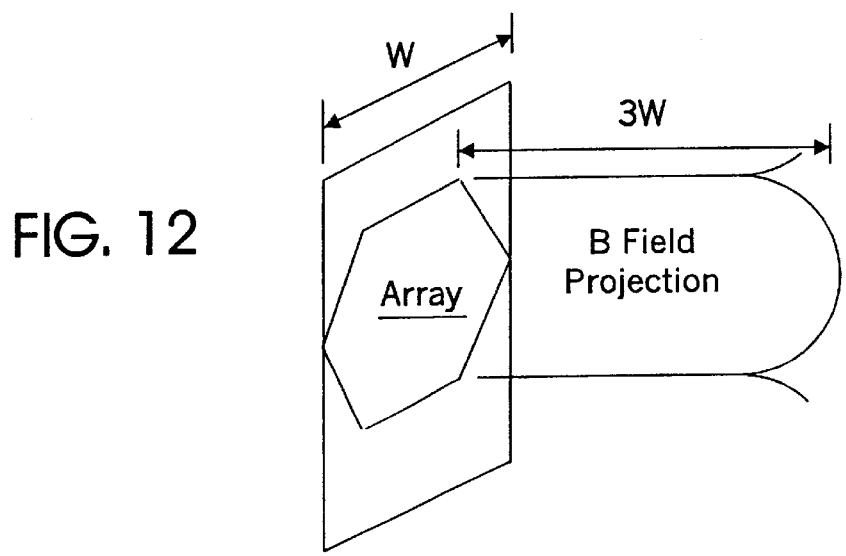
FIG. 12 schematically illustrates widening of an array of current loops according to the present invention.

Any number of elements can be used in the array to form any shape. Calculations and experimental results show that the magnetic field is projected to approximately three times the width of an array. Thus, to cover a larger volume, a wider array may be used. See FIG. 12.

For maximum power collection at the tag, the receiving device should be electrically matched to the transmitting array. In addition, the more of the mid field flux lines that go through the receiving loops, the more power that generally can be projected. Since the array projects a magnetic field that is initially normal to the plane of the array, tags oriented parallel to the array generally may receive a higher density of flux through them. In some cases, a tag's orientation may be such that so little flux is received that it remains undetected. However, orientation independence can be achieved with different methods.

Figure 13A:
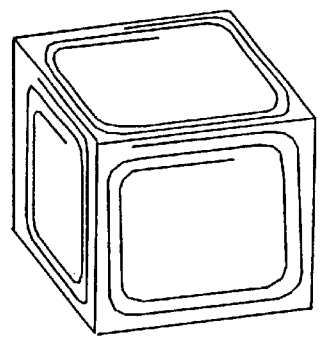
FIGS. 13A and 13B illustrate embodiments of receiving devices according to the present invention.
Figure 13B:
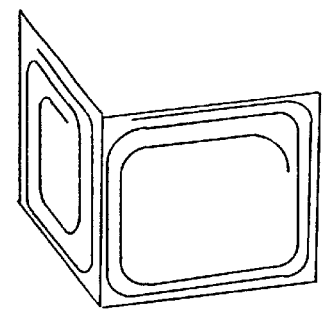

For example, a two- or three-dimensional series of loops at the receiving device can increase the likelihood that a certain amount of flux passes through one or more of the loops regardless of orientation. See FIG. 13A which illustrates three loops of wire at a tag, one in each orthogonal dimension to reduce orientation problems. FIG. 13B illustrates a two-dimensional version of a receiving device that can capture flux lines that are perpendicular to the planes defining the spirals.

In another embodiment, multiple projecting arrays may be provided. Moreover, rows and columns need not extend in the horizontal and vertical directions. Rather, oblique rows and columns may be provided as illustrated in FIG. 1B. Thus, an increased likelihood that a horizontally or vertically traveling RFID tag will receive enough flux to power the RFID tag may be provided.

Figure 14:
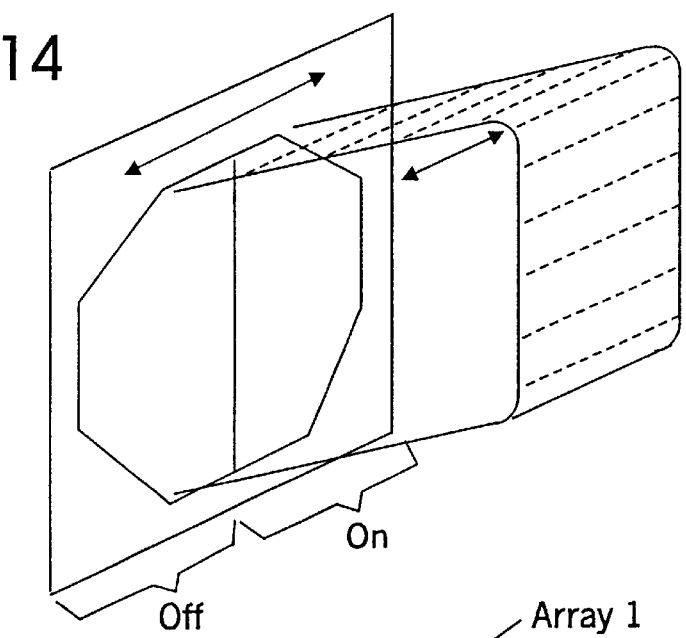
FIG. 14 illustrates sweeping the phase across an array according to the present invention.

In another alternative, changing the phase and/or magnitude of current through a portion of the projecting array can modify the shape and direction of the projected magnetic field. Moreover, by sweeping the phase across the array, a collimated beam of flux can be moved electronically. See FIG. 14. As schematically shown in FIG. 14, a beam can be moved by changing which part of the array is on or off or by slowly changing the relevant phase and/or magnitude of currents in each element. Thus, by changing the position of the magnetic field, all devices in a volume can receive enough flux to be powered.

In yet another alternative, the phase of the plurality of arrays may be changed over time to thereby produce a similar far field while moving nulls of the mid field in space over time. For example, in the plurality of arrays of FIGS. 7A–7C, the illustrated phase relationships may be maintained for a first time period, such as one second, and second phase relationships may be maintained for succeeding time periods. Thus, for example, in a second time period, a 60° phase leg may be introduced into each of the plurality of arrays. In a third time period an additional 60° phase leg may be introduced, etc. Although this may not impact the far field, it can spatially move the nulls in the mid field to increase the likelihood that all devices in a volume can receive enough flux to be powered.

Figure 15:
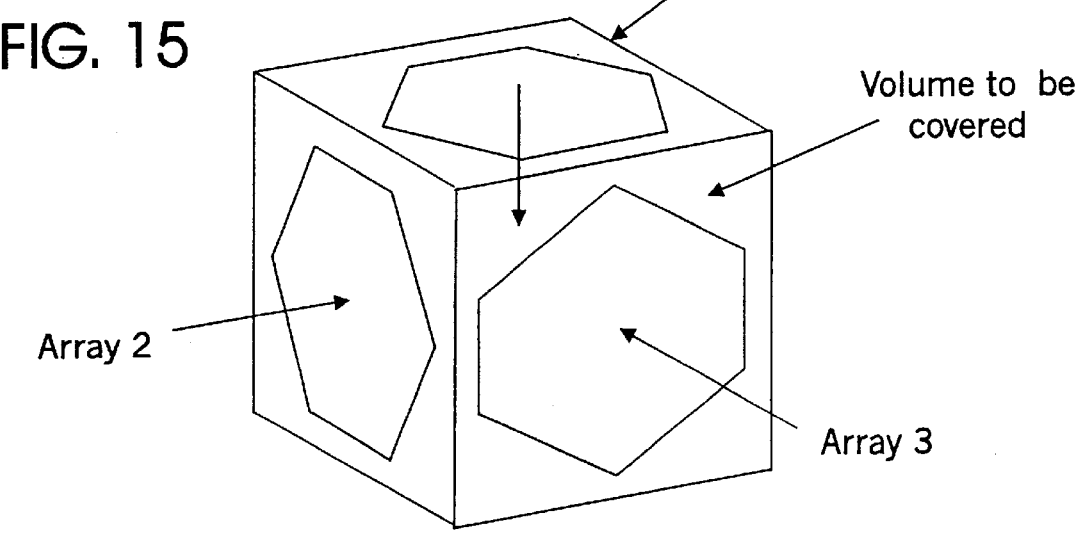
FIG. 15 illustrates three arrays that project into a volume according to the present invention.

Yet another approach may add one or more arrays that project into the volume. Since magnetic fields add as vectors, the field at any point in the volume is a vector sum of all the contributions of the individual current segments. Thus, changing the magnetic field from any or all of the individual arrays may be used to dynamically change the direction and strength of the field at any point. Finally, multiple arrays may be included, each covering a different dimension of the volume. See FIG. 15 in which three arrays are provided wherein Array 1 can project downward, Array 2 can project to the right and Array 3 can project back in the volume to be covered. Each dimension can then be activated independently. In order to extend the magnetic field even further, additional antennas may be placed directly across from the first with the same field polarity orientation. See FIG. 16. This can almost double the effective distance that can be obtained with a single antenna. Since the magnetic fields add, two arrays oriented in the same direction can effectively double the coverage space. It will be understood that the arrays can be activated independently or together.

Even though spirals or loops may be inefficient far field radiators, some component of the far field may be produced. In order to further reduce this component, additional antenna elements may be placed about the mid field to destructively interfere with the far field. See FIG. 17 which illustrates a pair of far field cancellation antennas about an array. The far field cancellation antennas may be made adaptive. Further reduction of undesired far field generation may be obtained by shielding the connections going to the array, for example, using coaxial cable or shielded twisted wire pair. The effects of current carrying wires from the matching networks to the antenna elements can be reduced by keeping them short, shielded and uniform.

It also will be understood that one or more sensing antennas may be provided to sense communications from the devices. The sensing antennas preferably are dipoles. Spatially separated, orthogonally oriented dipoles may be provided to increase the ability to detect communications while reducing the likelihood of destructive interference among the device communications to the antennas.

Accordingly, the present invention can create mid field magnetic energy that can be made wide and deep without excessive far field generation and without excessive field strength near the antenna structure. The magnetic field can be used to operate electronic devices remotely. These electronic devices may include RFID tags, remote sensors such as implanted temperature sensors, and/or remote actuators such as a relay inside a vacuum. Furthermore, other applications desiring a strong-shaped magnetic field for unlicensed operation may benefit from the present invention.

Simulations

In order to demonstrate how the present invention can increase the mid field while reducing the far field, a series of simulations were performed for various antenna configurations. In order to normalize the simulation results, each system was simulated so that at 30 meters, the magnetic field just passes FCC regulations, i.e., the magnetic field is just under 10,000 microvolts per meter. Then, a mid field measurement is simulated at 3 meters (118.1 inches). The amount of current in each loop is also indicated. Thus, the simulations indicate a maximum mid field that can be produced at 3 meters without violating FCC regulations at the far field. Table 1 summarizes the results of the simulations. Each of the simulations will now be described.

TABLE 1

| Configuration | FIG(s). | Current/loop, A | H(@ 3 meters, A/m |
|---|---|---|---|
| 10" diameter loop | 18, 19 | 0.81761 | 0.000421 |
| 20" diameter loop | 18, 20 | 0.205317 | 0.000417 |
| 40" diameter loop | 18, 21 | 0.0522617 | 0.000399 |
| 20" diameter bi-loop | 22, 23 | 0.607701 | 0.000932 |
| 20" diameter bi-loop | 24, 25 | 0.610333 | 0.000933 |
| 20" square loop | 26, 27 | 0.126952 | 0.000389 |
| 20" quad wedge | 28, 29 | 0.474899 | 0.000926 |
| 2 × 20" quad wedge | 30, 31 | 3.02641 | 0.001394 |
| 4 × 20" quad wedge | 32, 33 | 38.1075 | 0.002661 |
| 6 × 20" quad wedge | 34 | 3.02888 | 0.001199 |
| 6 × 20" quad wedge, 60° offset | 35, 36 | 17.6789 | 0.005598 |
| 6 × 20" quad wedge, spiral, 60° offset | 37, 38 | 9.87382 | 0.00559 |

Figure 19:
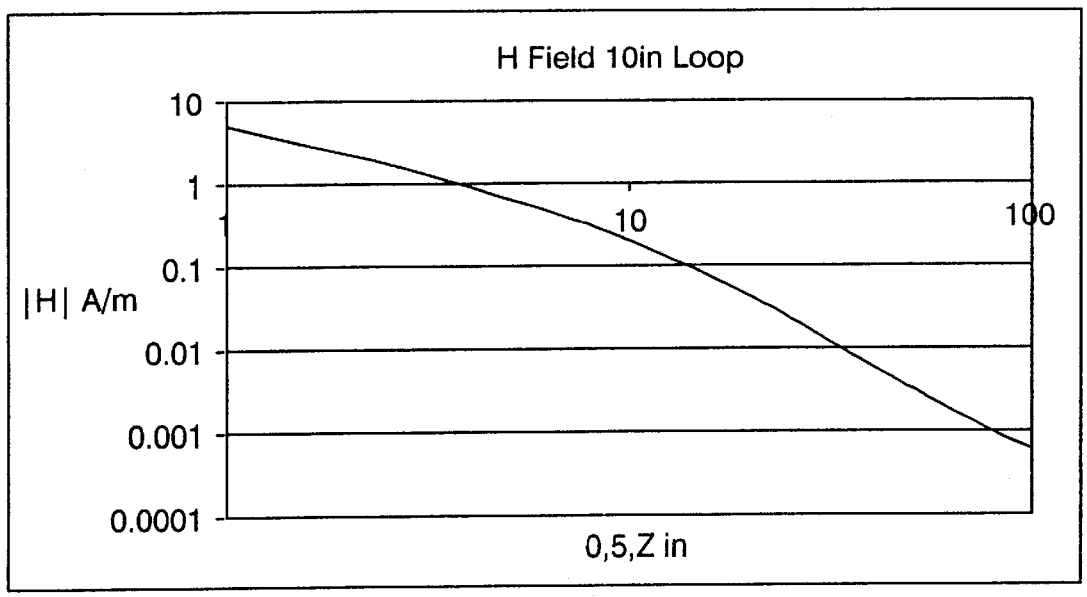
FIGS. 19, 20 and 21 graphically illustrate a simulated magnetic field as a function of distance, for a single current loop of FIG. 18.

FIG. 18 illustrates a single ten-inch diameter loop. The dot in FIG. 18 and in the remaining figures indicates the X-Y axis location for taking Z axis measurements at 3 meters and at 30 meters. For the configuration of FIG. 18, the magnetic field at three meters was 0.00421 A/m with a current of 0.81761 amps. FIG. 19 is a log/log plot of the H field as a function of distance along the Z axis from one to 100 inches. Accordingly, the close-in near field is indicated to the left of the ten-inch mark in FIG. 19 and the mid field is indicated to the right of the ten-inch mark in FIG. 19.

Figure 20:
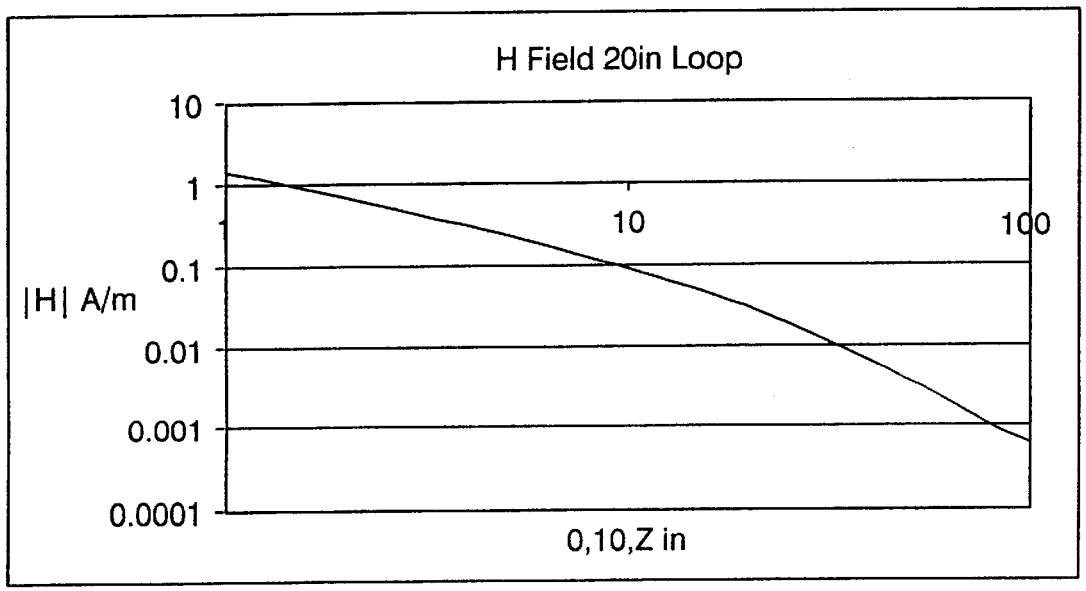

For a 20-inch diameter loop, the H field at three meters was simulated to be 0.00417 A/m at a current of 0.205317 A. A log/log plot of the H field versus distance on the Z axis for a 20-inch loop is shown in FIG. 20.

Figure 21:
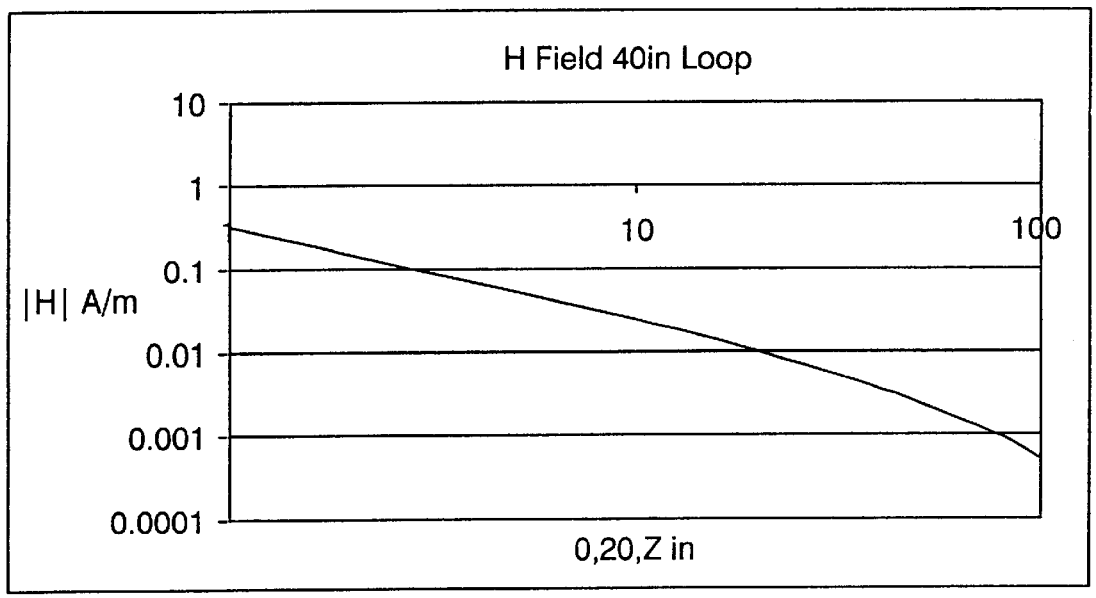

For a 40-inch diameter loop of FIG. 18, an H field at 3 meters of 0.000399 A/m at a current of 0.0522617 A was simulated. FIG. 21 is a log/log plot for the 40-inch diameter loop.

Comparing the ten-inch loop, 20-inch loop and 40-inch loop, it can be seen that the mid field produced can be about the same using less current.

Figure 23:
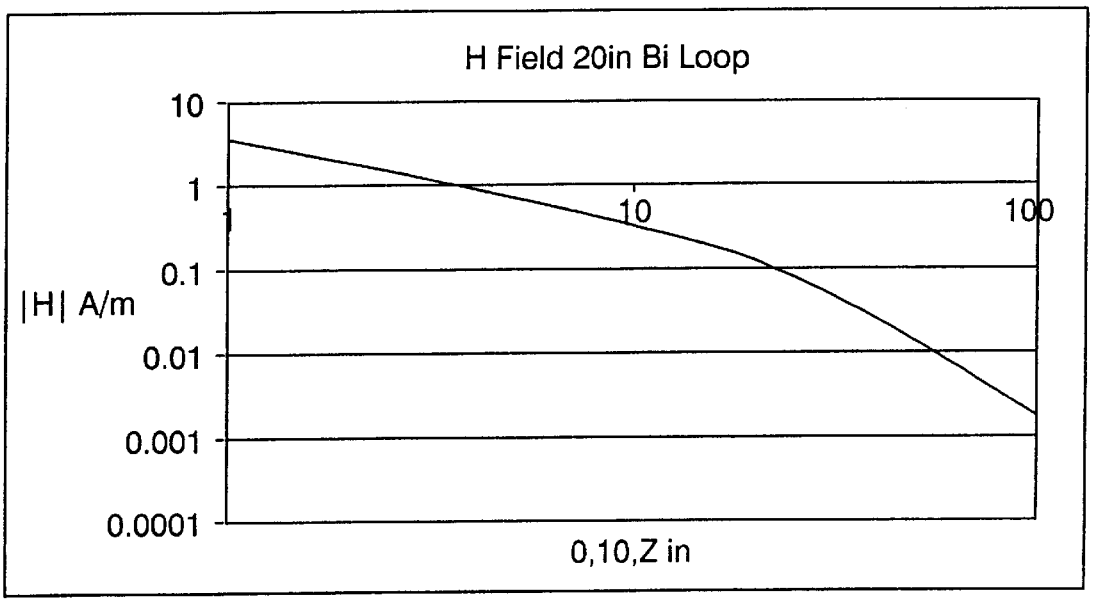
FIGS. 23, 25, 27, 29, 31, 33, 36 and 38 graphically illustrate a simulated magnetic field as a function of distance, according to the present invention.

FIG. 22 illustrates a 20-inch diameter bi-loop which may also be thought of as a pair of in-phase current loop wedges. A simulated mid field of 0.00932 A/m was produced at a current of 0.6077701 A. FIG. 23 is a log/log plot of the simulated near field and mid field. As shown by comparing FIGS. 20 and 23, the 20-inch diameter bi-loop can produce a larger mid field than a 20-inch diameter loop, without violating FCC regulations.

Figure 25:
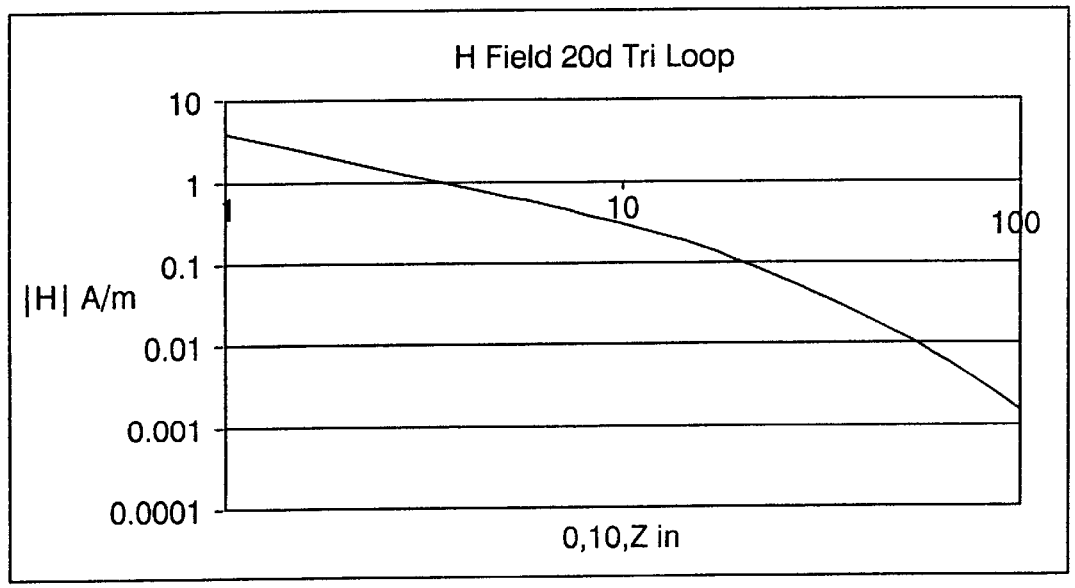

FIG. 24 illustrates a 20-inch diameter tri-loop. A mid field of 0.00933 A/m was simulated at a current of 0.610333 A. FIG. 25 graphically illustrates the close-in near field and mid field components.

Figure 27:
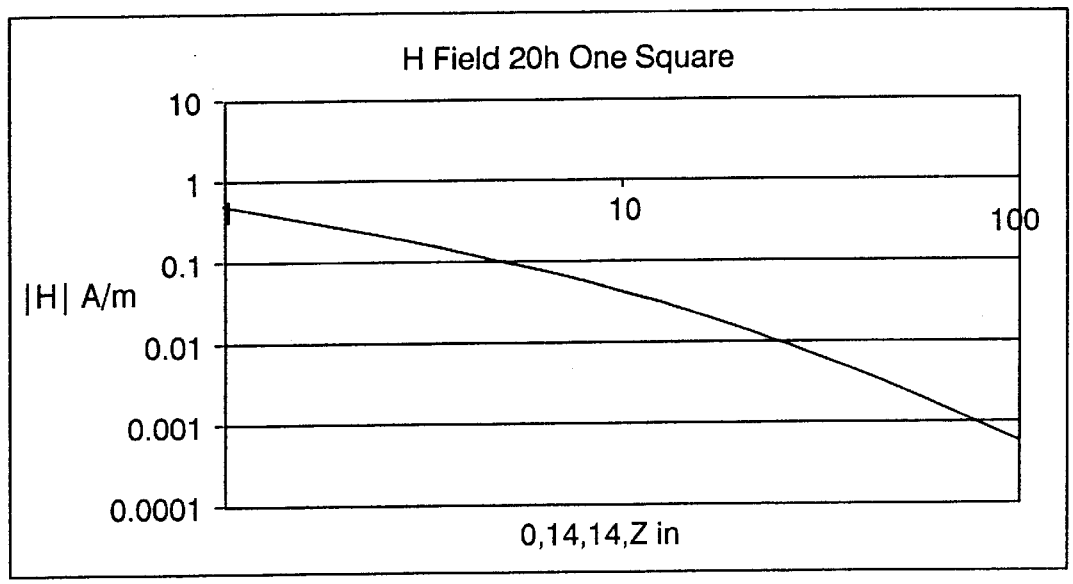
Figure 26:
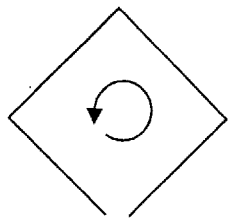

FIG. 26 illustrates a 20-inch square loop. A mid field of 0.00389 A/m was produced with a current of 0.126952 A. Accordingly, there may not be a large difference between square and circular loops, but the square loop may be easier to fabricate and support. FIG. 27 graphically illustrates the close-in near field and mid field for a 20-inch square loop.

Figure 28:
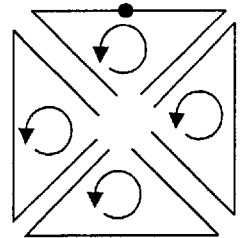
Figure 29:
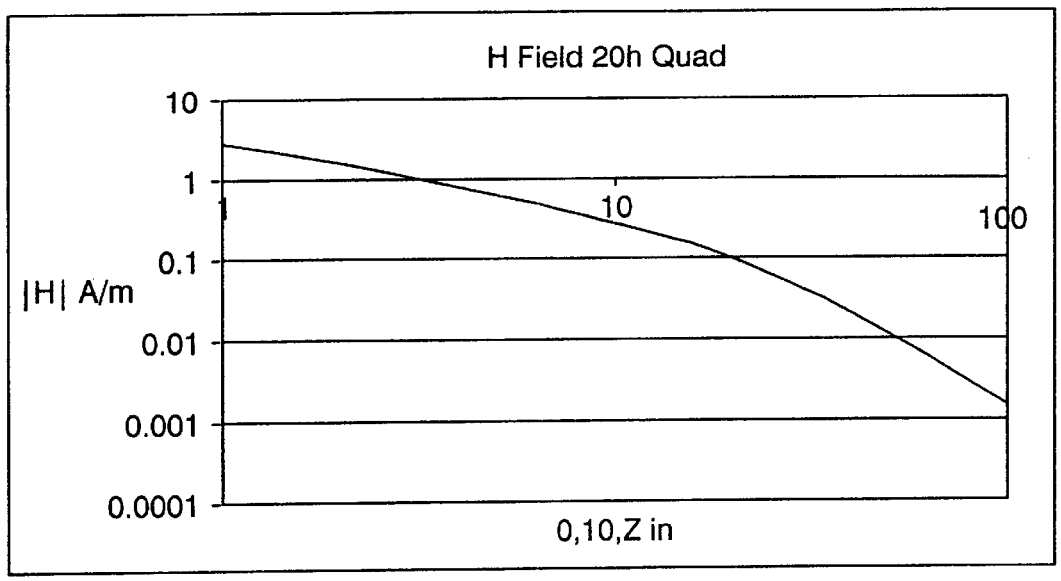

FIG. 28 illustrates a 20-inch quad wedge. Simulations show that a mid field of 0.000926 A/m may be produced at a current of 0.474899 A. Accordingly, a 20-inch quad wedge can provide a large improvement over a 20-inch diameter loop of FIG. 22. FIG. 29 graphically illustrates near field and mid field for the 20-inch quad wedge.

Figure 30:
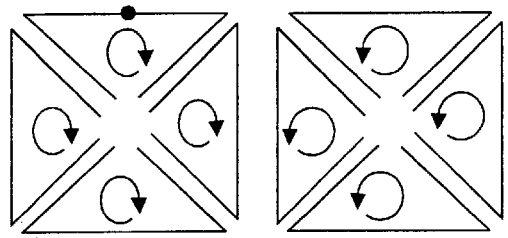
Figure 31:
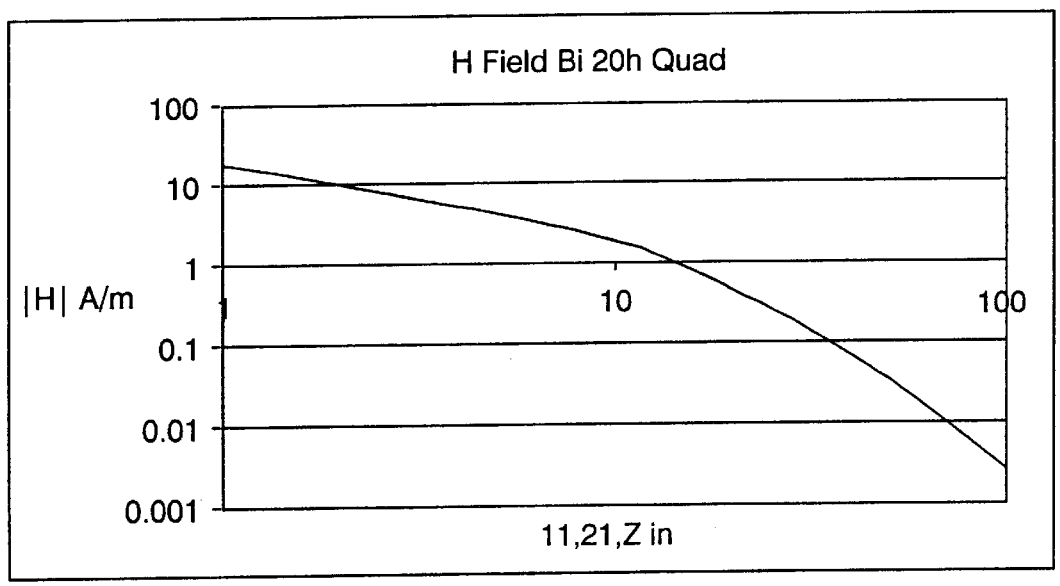

FIG. 30 illustrates two arrays of 20-inch quad wedges. Simulations indicate that a mid field of 0.001394 A/m is produced at a current of 3.02641 A. FIG. 31 graphically illustrates the close-in near field and mid field components.

Figure 32:
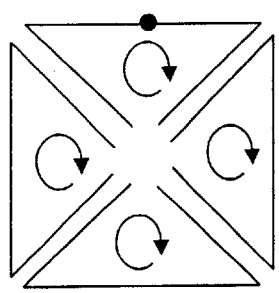
Figure 32:
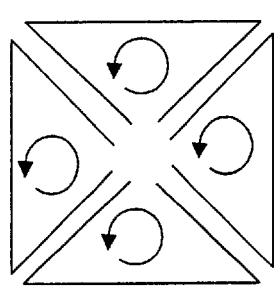
Figure 32:
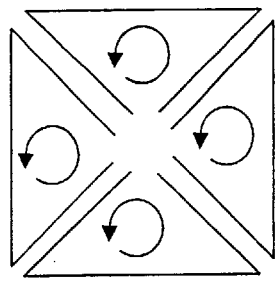
Figure 32:
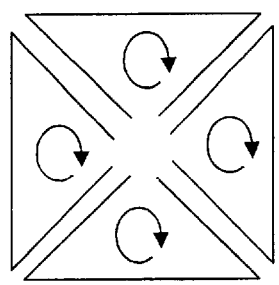
Figure 33:
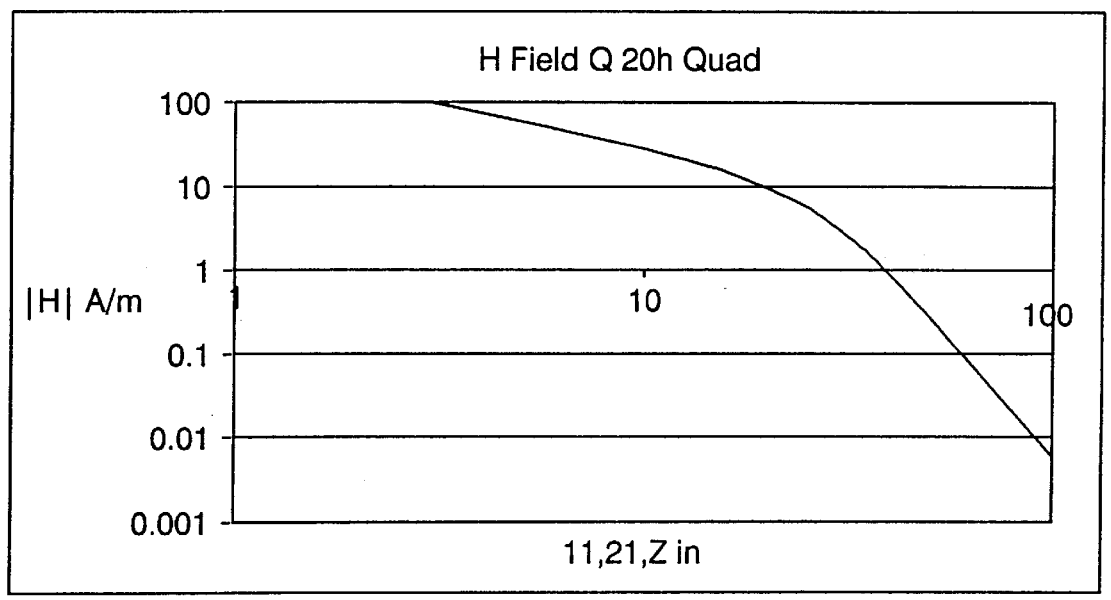

FIG. 32 illustrates four 20-inch quad wedge arrays. A very high mid field of 0.02661 A/m was simulated albeit at high current of 38.1075 A. FIG. 33 graphically illustrates the close-in near field and mid field of this configuration.

Figure 34:
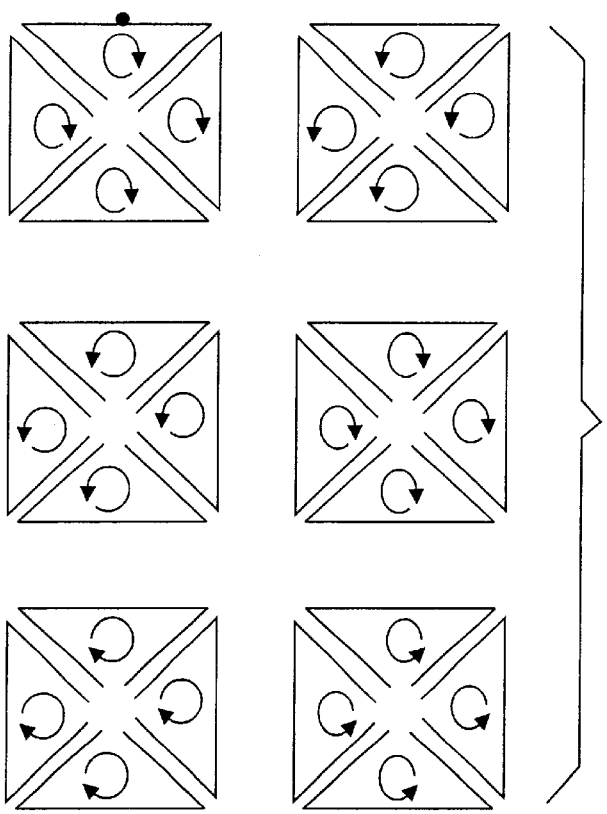

FIG. 34 illustrates six 20-inch quad wedge arrays. Simulations indicate a magnetic field of 0.00119 A/m at a current of 3.02888 A.

Figure 36:
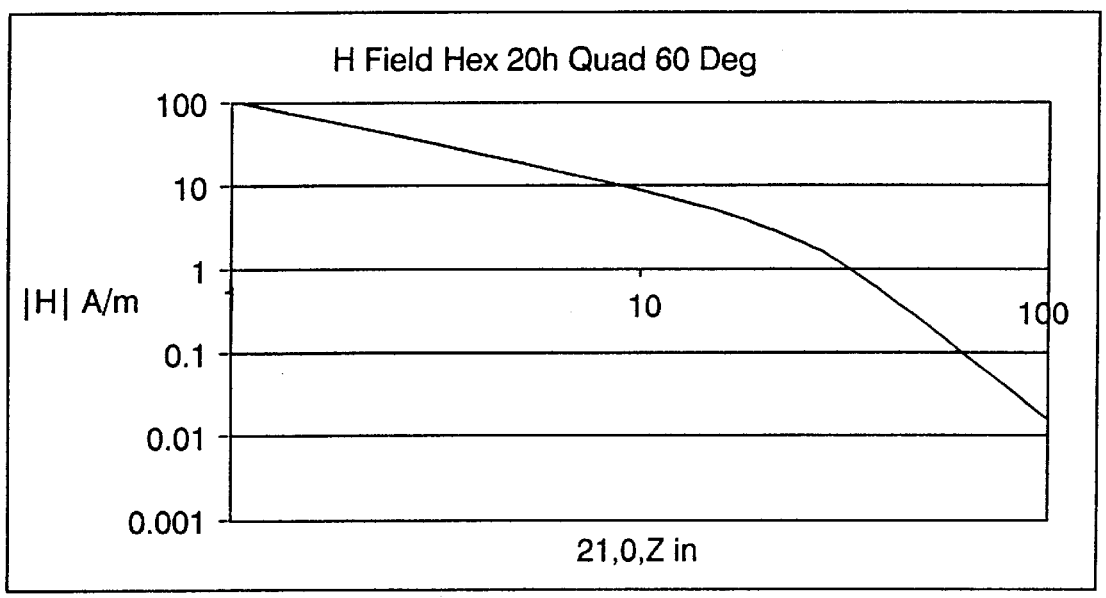
Figure 35:
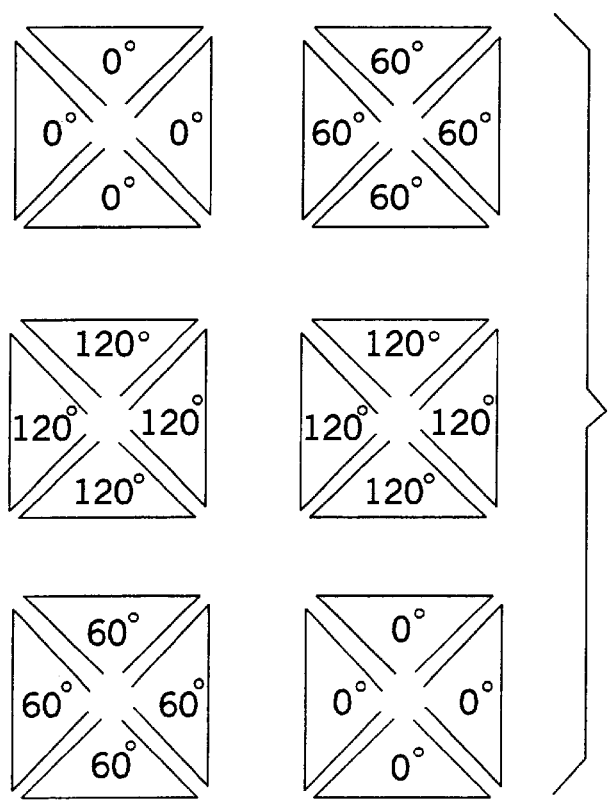

FIG. 35 illustrates six 20-inch quad wedge arrays wherein adjacent arrays are driven at 60° phase offsets from one another. Thus, in contrast with the embodiments of FIGS. 22, 24, 28, 30, 32 and 34, wherein adjacent arrays are driven in opposite phase, FIG. 35 illustrates phase offsets that are different from 180°. These phase offsets can provide a more spatially uniform near field relative to arrays that have 180° phase differences. Simulations indicate that the array of FIG. 35 can provide a mid field of 0.005598 A/m at a current of 17.6789 A. Accordingly, a very high mid field at more modest current can be provided. FIG. 36 graphically illustrates the close-in near field and mid field.

Figure 37:
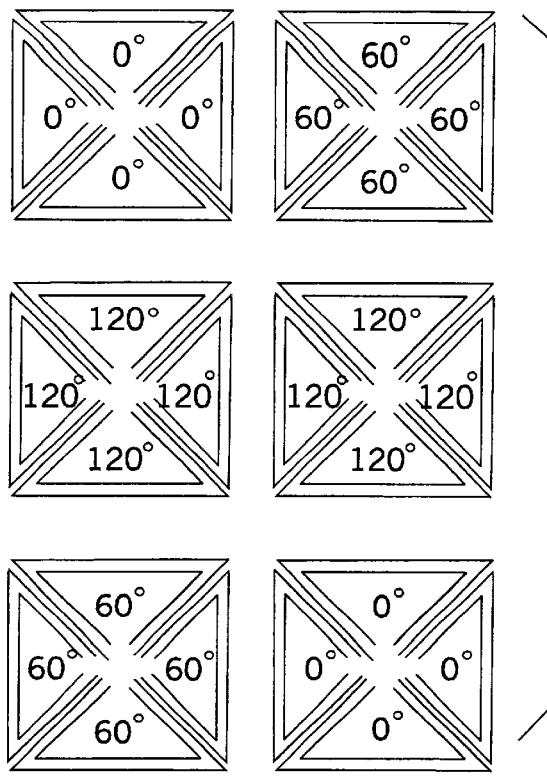
Figure 38:
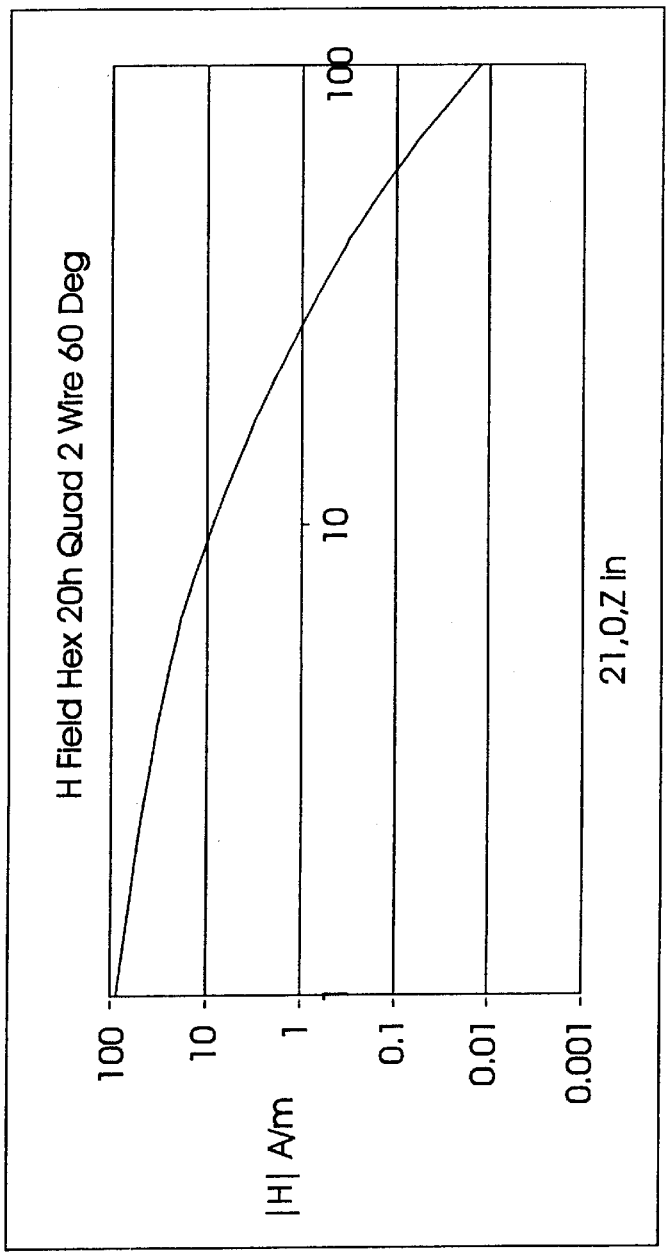

Finally, FIG. 37 illustrates six 20-inch quad wedge spirals at 60° offsets. FIG. 37 differs from FIG. 35 in that each current loop is a two loop spiral current loop. Simulation shows the same mid field as the embodiment of FIG. 35, i.e., 0.0559 A/m, at a reduced current of 9.87382 A. FIG. 38 graphically illustrates the close-in near field and mid field for this configuration. Accordingly, the configuration of FIG. 37 may be most preferred, based on simulations.

In summary, comparing the 20-inch diameter loop of FIG. 18 and the six arrays of 20-inch quad concentric wedges of FIG. 37, an order-of-magnitude more mid field may be produced at 3 meters without violating FCC regulations at 30 meters. This order-of-magnitude increase in mid field can provide wireless powering of microelectronic devices.

Tag Identification

Having described systems and methods for wirelessly projecting power to wirelessly power microelectronic devices, communication between a transmitting system and a plurality of RFID tags according to the present invention will now be described. The transmitting system can modulate the magnetic field in order to transmit information or commands while simultaneously delivering power. Conventional/modulation schemes such as Amplitude Shift Keying and/or Frequency Shift Keying may be used. In the case of an RF tag system, this feature can allow smaller power storage capacitors or let tags operate directly from the rectified RF signal in real time.

In the case of RF tags for medical instrumentation, communication bandwidth may be a major constraint. In particular, narrow bandwidth requirements may limit the rate of information exchange. Amplitude modulation may be simple and/or inexpensive to implement on the remote device but may not utilize a given bandwidth as effectively as other modulation schemes. Frequency or phase modulation techniques may need phase lock loops and tight process control.

Figure 39A:
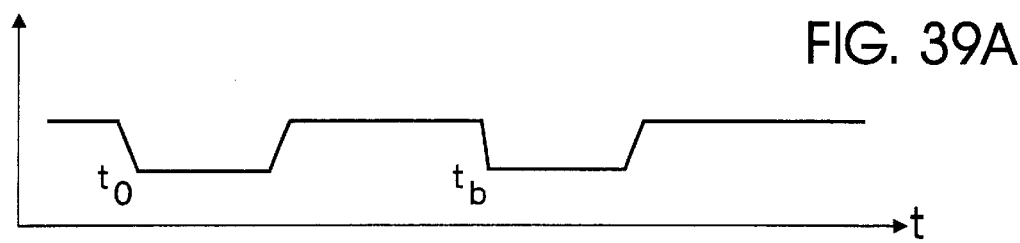
FIGS. 39A–39E graphically illustrate communication protocols according to the present invention.
Figure 39B:
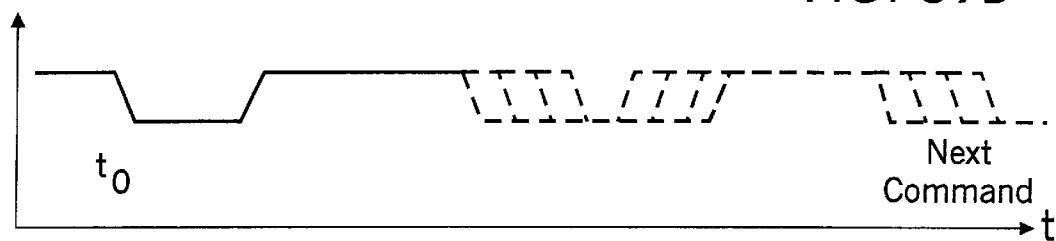

A communication protocol scheme according to the invention can vary the amplitude of the main carrier to allow simplified detecting at the remote device, but can utilize bandwidth more effectively than simple amplitude modulation. In general, the fastest frequency that can be amplitude modulated onto a carrier may be determined by the bandwidth specification. If a change in the modulated signal occurs at time $t_0$, the soonest it can change again and still fall in the same bandwidth may be expressed as $t_b$. See FIG. 39A. A change any time after $t_b$ also falls within the given bandwidth. If one could accurately time the interval after $t_b$ during which the change occurs, one could impart different command or data based on that interval. See FIG. 39B. In general, the more accurate the timing, the greater the amount of information that can be transmitted. As shown in FIG. 39A, the shorter the time $t_b$, the higher the bandwidth that may be needed to transmit the signal. As shown in FIG. 39B, different transition times can indicate different commands without requiring an increase in bandwidth requirements. The interval to the next change, again at a time greater than $t_b$, also may be encoded with a command or data.

Fortunately, an accurate clock generally accompanies the amplitude modulation in the form of the carrier. Thus, zero crossing and counter circuits may be robust and simple. By counting the number of high frequency carrier transitions that occur between amplitude changes (which may only occur at intervals longer than the bandwidth requirement allows) the transmitter and receiver can remain synchronized. The accuracy of the transition detection may determine how many different commands are feasible. Large amplitude transitions may be used for easier detection and improved noise immunity. Hence, with reduced bandwidth requirements and relatively inexpensive and robust circuits, a transmitter to remote device communication protocol can be established.

A communication protocol scheme according to the invention now will be described in detail. In the United States, devices which emit RF radiation are regulated by the FCC to prevent interference with other devices. The FCC can either provide a vendor of transmitting systems with a license to transmit at a given site using a specified frequency and a maximum transmission power level, or it can provide a certification that at a given frequency the power levels generated by a device are so low as to not pose a major interference threat. When products are regulated in the latter manner they are said to require no license and are certified under the FCC's Part 15 Rule for unlicensed certification. The present invention can be designed to operate in an unlicensed mode. For systems utilizing the 13.56 MHz band, the FCC has set the maximum permissible power level to be 10,000 uV/meter measured at a distance of 30 meters. The width of the band is 14 KHz, centered around the 13.56 MHz carrier frequency. Outside of the band, the power level radiated by the device must be reduced by 50 dB, placing a very tight bandwidth constraint on communication from the reader to the tag.

Figure 39C:
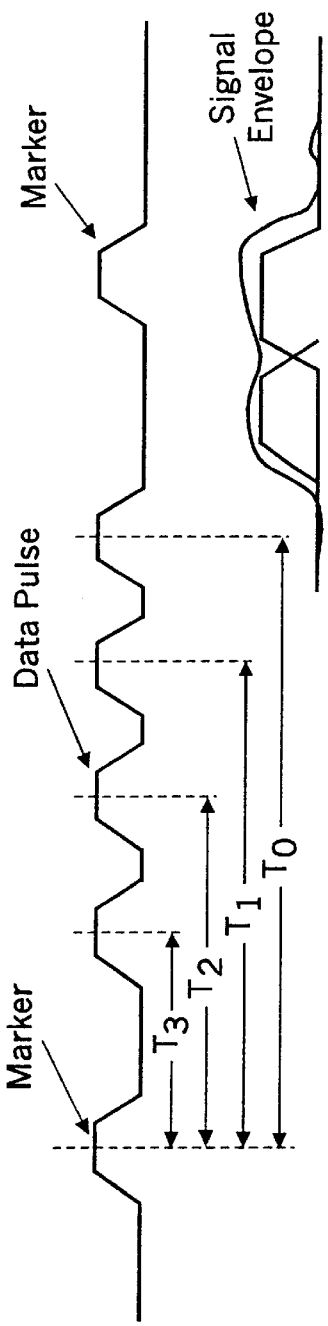

An amplitude modulation (AM) scheme can reduce the complexity of the decoding circuitry on the tag IC. An AM decoder can be constructed using a rectification circuit. The present invention may fall in a unique situation in that the channel capacity of the reader may be larger than the signal bandwidth allowed by the FCC. Using typical measured antenna characteristics and assuming that the operation of the reader's mixer and final stage amplifier are relatively broadband, the channel capacity (assuming a −3 dB cutoff) of the transmit antenna may exceed the 14 KHz bandwidth required by the FCC. To capitalize on the additional channel capacity available outside the 14 KHz band, while maintaining FCC compliance, a pulse-position scheme may be utilized by the present invention to encode data/commands being transmitted by the reader. In a pulse position encoding scheme, a pulse occurrence is delayed or advanced in accordance with the value to be sent by the reader. The detector is synchronized with the sending system and senses the change in the pulse position. The change is transformed by the detector into the appropriate output value. The information sent by the reader is encoded in the phase portion of the signal spectrum as opposed to a more conventional pulse amplitude or pulse code scheme which relies principally on the amplitude to convey information. FIG. 39C is a detailed timing diagram of a pulse position encoding scheme.

The marker pulses are sent by the transmitter at some periodic interval. The marker pulses are used by the decoder for synchronization. The time between the marker and a subsequent data pulse encodes the value being transmitted. In FIG. 39C, a pulse can arrive in one of four positions or slots ($T_0$, $T_1$, $T_2$ or $T_3$) enabling four values to be transmitted during each period. A series of $T_3$ pulses sets an upper bound on the maximum signal bandwidth utilized. Thus, with no extra signal bandwidth required, the $T_0$, $T_1$ and $T_2$ pulses can increase the throughput of the system by a factor of four. Ultimately, the noise and channel capacity may determine how closely data pulses can be spaced and consequently the upper limit on the transmission throughput. As the pulse spacing is decreased, a point is reached at which two distinct pulses may not be uniquely resolved by the detector. The limits of pulse position encoding are best expressed by the equation:

$$S_o/N_o = 0.5(t_0/\tau_r)^2 A_c/N_c$$

Where $S_o/N_o$ is the system's signal to noise ratio, $t_0$ is the spacing in time between adjacent pulses, $\tau_r$ is the achievable rise time of a data pulse, $A_c$ is the amplitude of the data pulse, and $N_c$ is the noise present in the system measured in units of watts. Ultimately, the bit error rate experienced by a communication channel may be directly dependant on the received signal to noise ratio. As shown in the above equation, a larger $t_0$ can improve the output signal to noise ratio. In addition, $\tau_r$ is a measure of the bandwidth of the communication channel. A smaller value of $\tau_r$ implies a larger channel capacity and consequently a better output signal to noise ratio.

Thus, a pulse position encoding scheme according to the present invention can exploit the additional channel capacity, outside of the 14 KHz FCC band enabling greater command/data throughput from the tag to reader. This may be summarized with Shannon's maximum capacity expression:

$$C = W \log 2 (1+S/N)$$

Where C is the maximum bit rate achievable by a communication system, W is the bandwidth of the channel and S/N is the received signal to noise ratio. If the 14 KHz signal bandwidth specified by the FCC is used, the maximum information throughput that can be achieved is $$C = 14 \text{ KHz} \log 2 (1+S/N)$$

By using a band limited signal and taking advantage of the phase portion of the spectrum, the bandwidth of the channel, W, can be more effectively utilized leading to an increase in overall throughput.

Figure 39D:
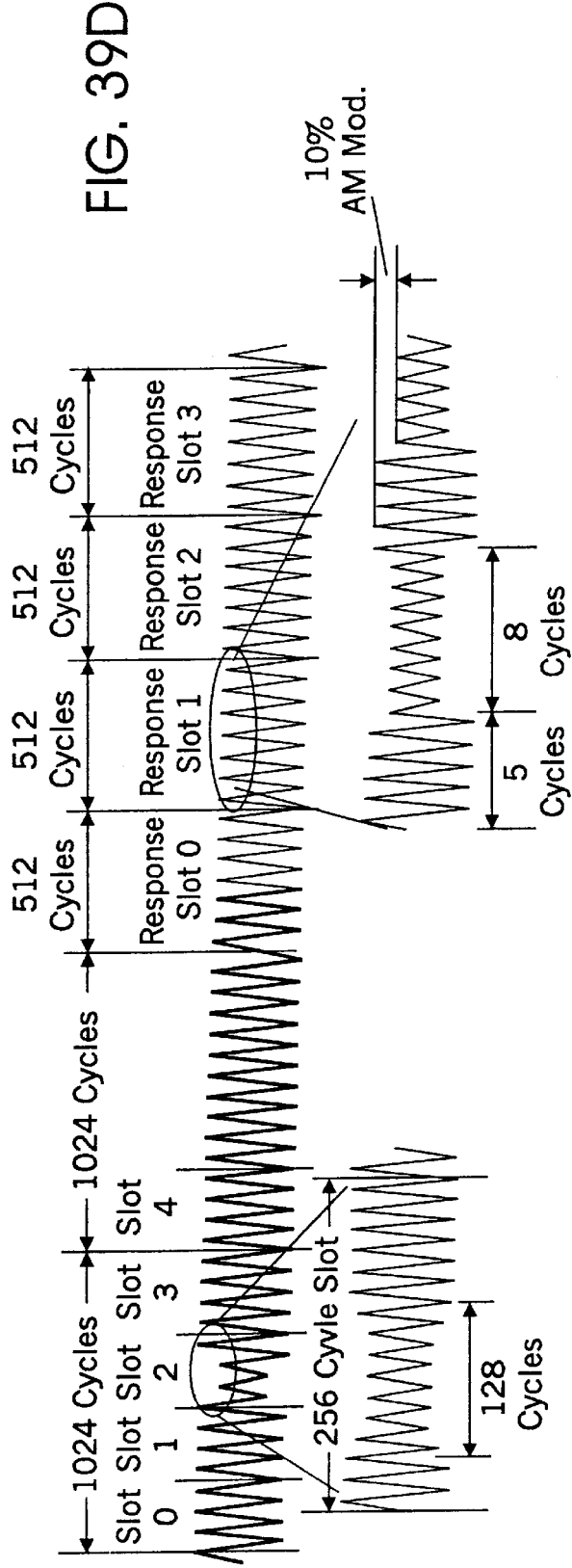

According to the present invention, data transmission from the reader to the tag may be divided into major cycles. Each major cycle comprises 4096 13.56 MHz carrier cycles. For most operations, a major cycle may be further divided into 5 receive "slots" and 4 response slots. See FIG. 39D.

Figure 39E:
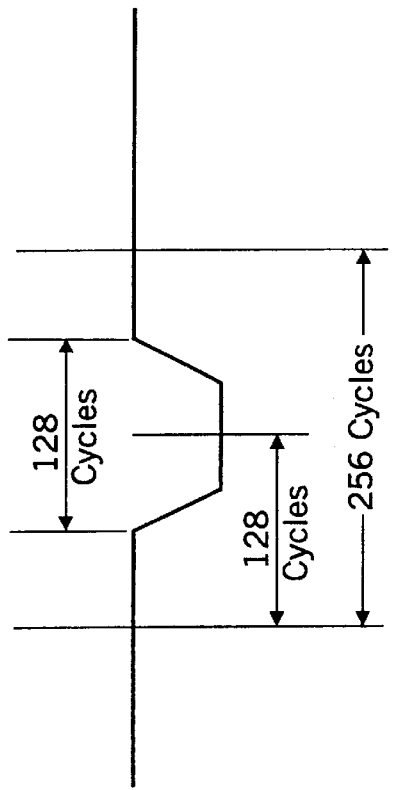

Each receive slot is 256 carrier cycles wide. To transmit commands or data to the tag, the reader must assert a low pulse in one of the five allocated receive slots. Using this approach, up to five unique values can be transmitted from the controller to a tag every cycle. The low-going pulse emitted by the controller is 128 cycles wide. Centering the pulse within a 256 cycle "slot" provides a buffer zone between neighboring slots, reducing inter-symbol interference due to mis-synchronization between the reader and tag. See FIG. 39E. The controller can also pre-filter/condition the modulation waveform to further reduce inter-symbol interference and improve the SNR of the received signal.

The pulse position encoding scheme may require synchronous operation between the reader and tag. Consequently, tags that enter the acquisition field should be able to "lock on" to the major cycle established by the reader. Fortunately, an accurate clock generally accompanies the amplitude modulation in the form of the carrier. A counter on the reader and the tag respectively can be used to accurately count carrier cycles. When a tag first powers up after entering the reader's acquisition field, it can remain in an idle state until the reader generates a synchronization event. A synchronization event may include at least three consecutive idle cycles followed by a single synchronization pulse. The three idle cycles can cause the reader and all tags in the field to reset their cycle counters to zero. Given that each major cycle is 4096 cycles, a 12 bit counter may be needed. The synchronization pulse resets the least significant 8 bits of the reader and tag counters to a value of 128. After the reader and tag both receive the synchronization pulse, each unit can maintain a count of the carrier cycles. When a counter's maximum content is reached it can wrap around to 0. When subsequent pulses are received they are interpreted as commands or data. The receive slot in which they arrive specifies the value transmitted. Table 2 describes the mapping:

TABLE 2

| Pulse arriving in cycle counter range | Value transmitted |
| --- | --- |
| 0–256 | 0 |
| 256–512 | 1 |
| 512–768 | 2 |
| 768–1024 | 3 |
| 1024–1280 | 4 |

Each data pulse can cause the reader and tag to each reset the least significant 8 bits of their respective counters to a value of 128. This can provide tight synchronization between the reader and tags, that can be maintained and updated during every major cycle, which can eliminate any source of relative counter drift.

Communication in the tag to reader direction may not be as limited by transmission power, but may have detectability issues, at least in part, due to the weakness of the signal. Again, implementing a Frequency Modulation (FM) or Phase Modulation (PM) circuit on the small remote device may create challenges with power, marginality and especially cost. Two techniques can be used individually or in combination to allow an increase in information transfer and allow reduced expense.

Figure 40:
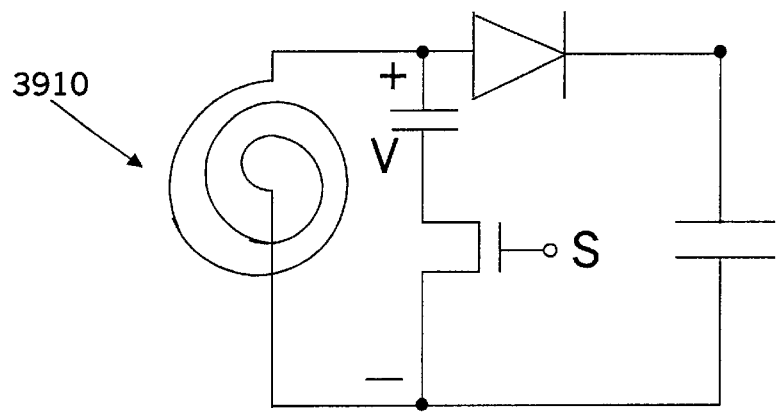
FIG. 40 is a simplified schematic diagram of a power gathering and transmitting system in a tag according to the present invention.
Figure 41:
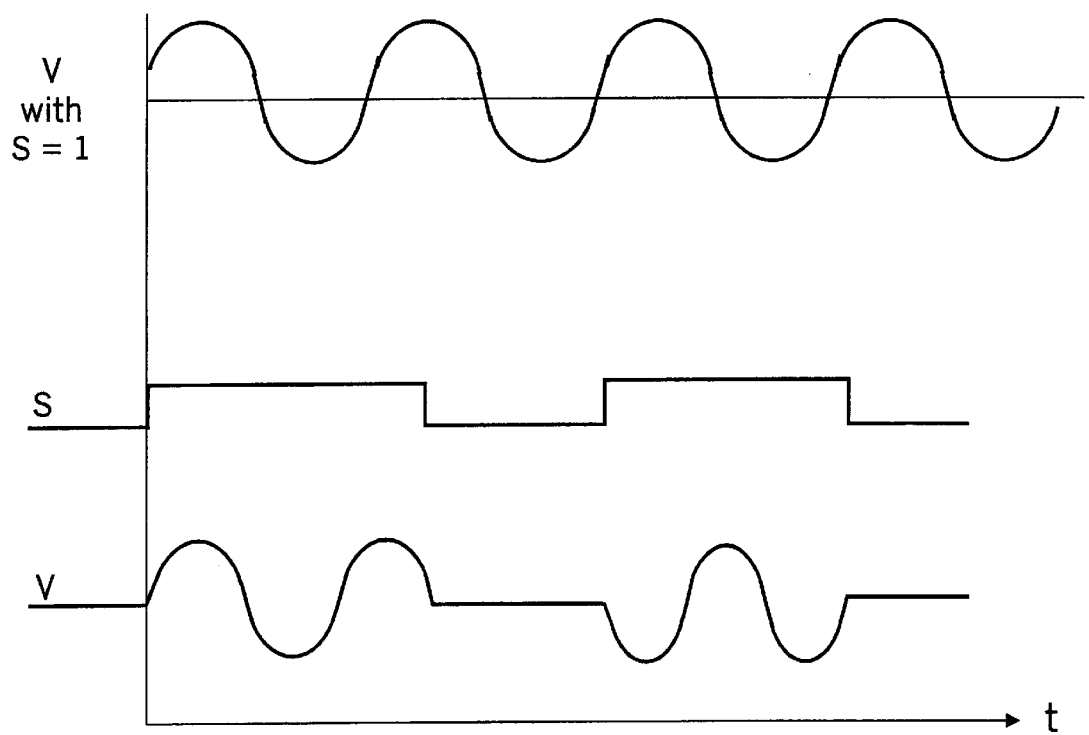
FIG. 41 illustrates generation of unique chromatic signatures for tags according to the present invention.

First, the individual devices can time when they respond to impart information. Each has access to the main carrier frequency, which also can serve as a synchronizing clock. Secondly, the remote device can use a flux gathering coil 3910 to reflect the reader energy in a controlled manner. See FIG. 40. By modifying specific peaks of the incoming signal, unique harmonic signatures may be created. See FIG. 41. A carefully designed reader can be tuned to listen for these harmonics. Information can be communicated with each different possible frequency. Since the pattern of modification can be made periodic and quite unnaturally occurring, highly reliable transmission is possible with very low power consumption and simple circuit techniques.

Figure 46:
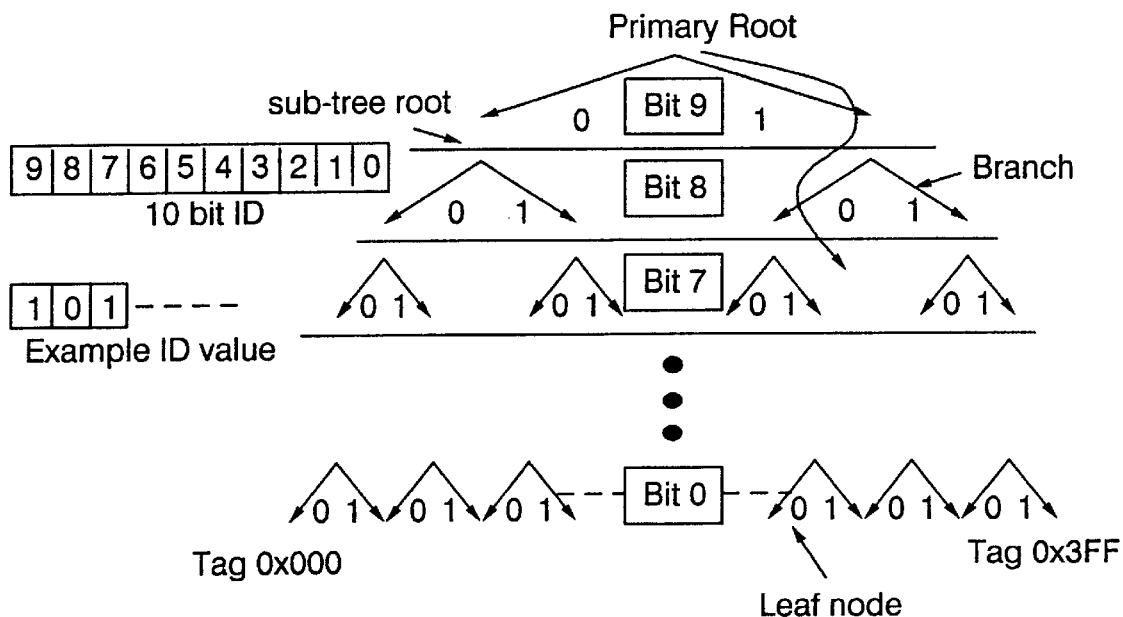
FIG. 46 schematically illustrates a binary tree representation of a ten bit ID.

With the capability to power many devices simultaneously, it is desirable to separate data from multiple sources transmitting at the same time. Many complex algorithms have been implemented to date for this purpose. However, each may have shortcomings. For example, some readers can discern minute power differences due to spatial separation. See for example U.S. Pat. No. 5,053,774. This approach may be complex and may break down when the devices get physically closer than a few centimeters. Another technique involves implementing a random time generator on each device to separate data transfers. See U.S. Pat. No. 5,519,381. This technique may become ineffective as the number of devices in the volume increases and as the time to convey a moderate amount of information increases. Binary tree approaches may be effective, but may be too slow and may be dependent on maintaining a high level of synchronization for extended periods. Furthermore, tags entering or leaving the volume during traversal may not be addressed. U.S. Pat. No. 5,856,788 describes a binary tree identification method and apparatus. FIG. 46 also illustrates a binary tree.

Figure 47:
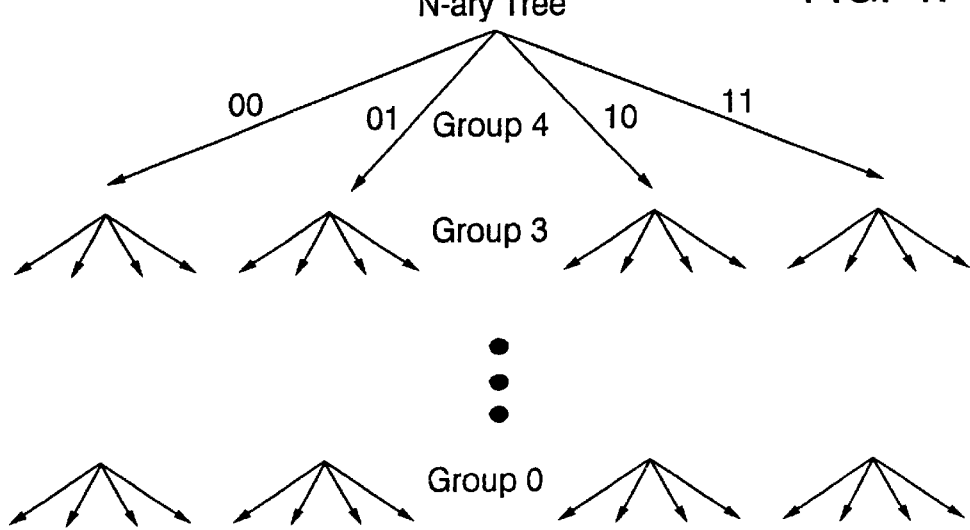
FIG. 47 schematically illustrates an N-ary tree according to the present invention.

According to the present invention, each identification tag comprises at least four identification bits. The bits of the ID can be partitioned into groups of $\beta$ bits where $\beta$ is at least two identification bits. The $\beta$ bits of a group are processed simultaneously and uniquely identify the group. The identification of a group can alternatively be represented as an N bit value, where $N=2^\beta$. The N bit group ID is a fully decoded representation comprising a field of 0's with a single "1" in a unique bit position determined by a group's $\beta$ bit value. Thus, the ID is processing as an N-ary tree rather than a binary tree, where N is three or more. An N-ary tree, as shown in FIG. 47, has a primary root. Extending from the root are N branches. Each of the N branches are in turn attached to a recursive sequence of sub-trees, each with its own root node. As one traverses branches of a tree to lower levels, the size of the sub-trees decrease until at the bottom of the tree exists a single leaf node. Each leaf node of the tree represents a unique tag. Its' ID is determined by the path needed to reach the leaf node from the primary root of the tree.

The groups comprising an ID are interrogated sequentially. Each interrogation of a tag returns the ID of the group currently being processed. The response takes the form of the group ID's fully decoded N-bit representation. A tag only responds to an interrogation if its associated leaf node is contained within the currently selected sub-tree.

By processing groups of bits instead of individual bits, higher tag ID acquisition speeds may be obtained compared to a binary tree approach. Stated differently, at least two identification bits in each of the identification tags are simultaneously interrogated to obtain a predetermined response from each of the identification tags having a predetermined bit value for each of the at least two identification bits.

Figure 42:
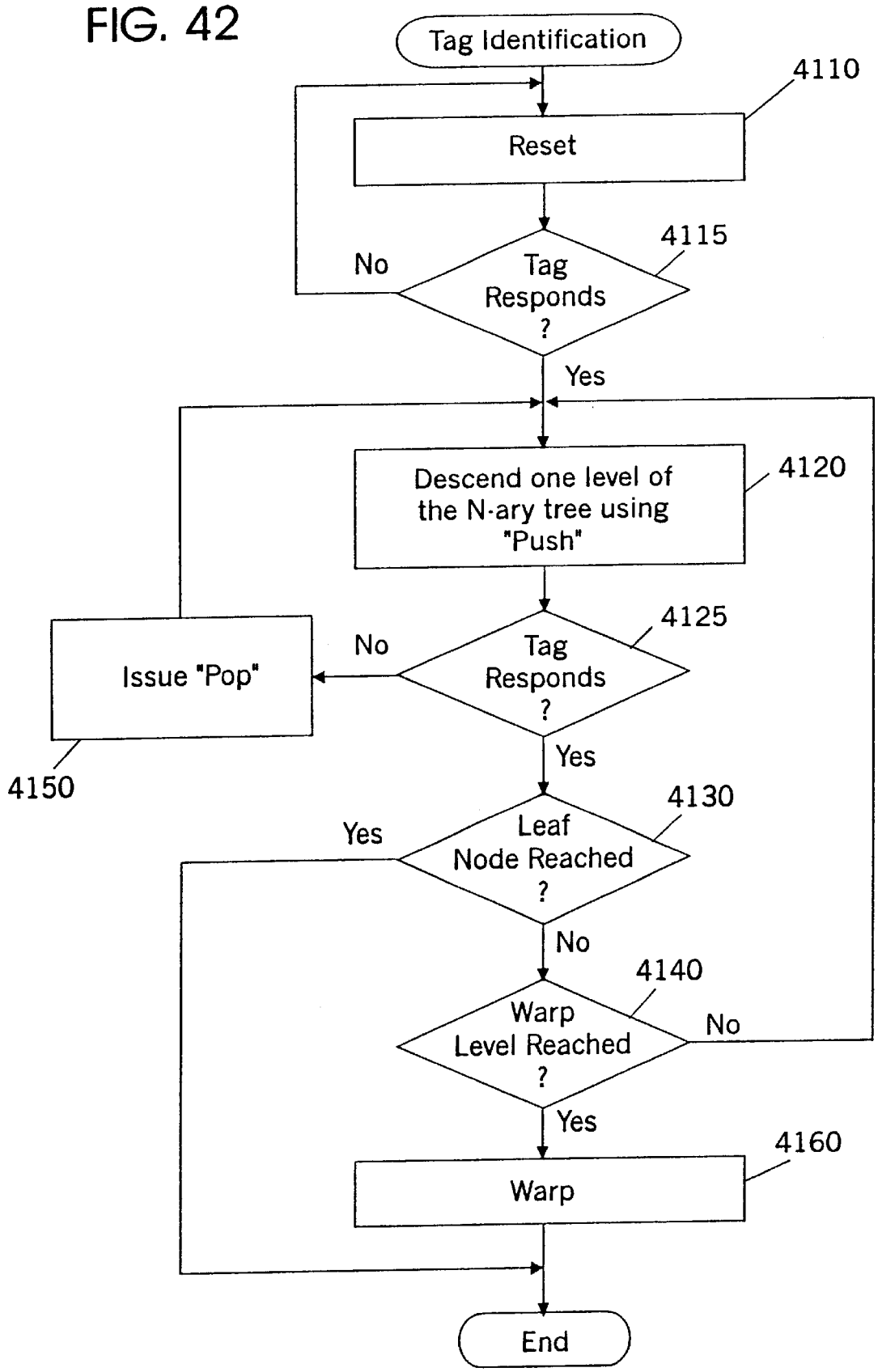
FIG. 42 is a flowchart generally illustrating tag identification according to the present invention.

FIG. 42 is a flowchart of tag identification according to the present invention. Upon initialization a reset command is issued that resets the tag and interrogates the first group of ID bits (Block 4110). Based on the response from the tag (Block 4115), a push command can be executed to descend a selected branch of the N-ary tree to the root of a new sub-tree (Block 4120). If a tag responds (Block 4125), and the bottom of the tree has not been reached (Block 4130), the process is repeated. When the bottom of the tree is reached at Block 4130, a unique tag in the field of the reader will be selected. Subsequent operations, as defined in the instruction set of the system, can be performed uniquely on the selected tag.

Returning again to FIG. 42, if a tag does not respond at Block 4125, presumably because it is no longer a member of the selected sub-tree, then at Block 4150, a pop may be used to ascend the tree one or more levels. Subsequent push commands can be used at Block 4120 to descend to lower levels of the tree through different branches. Thus, by using pop and push commands, the tree may be navigated efficiently and need not be repeatedly navigated from top to bottom.

Speed also may be further increased by eliminating the command/response iterative process of interrogating a tag after each descent. Rather, once a tag responds and a predetermined level in the tree is reached at Block 4140, a warp command may be executed at Block 4160. In a warp command, all tags in the field independently descend their respective branches in the N-ary tree responding with their corresponding N bit group IDs after each step in the descent. Each tag automatically continues the descent until the bottom of the tree is reached. Since no pruning of the tree is performed by the warp command, any tag considered part of the active sub-tree at the time the command was issued will still be active at the completion of the warp operation. Thus, each of the tags having predetermined bit value for at least two identification bits may be serially interrogated to obtain at least two additional identification bits from each of the identification tags having a predetermined bit value for the at least two identification bits. The N bit responses provided by the tags at each point in the descent allow the reader to determine if more than a single tag is active when a warp is issued.

It will be understood that each aspect of FIG. 42 may be used independently. In particular, an N-ary tree (Block 4120), a warp command (Block 4160), and pop (Block 4150) and push commands (Block 4120) may each be used independently to provide improved tag identification. Moreover, subcombinations of these aspects also may be used together. Most preferably, however, all three aspects are used together to provide efficient methods and systems for identifying tags.

An overview of the N-ary tree, the warp command and pop and push commands now will be provided. Then, a detailed embodiment will be described. It will be understood that the present invention can be used with different power transfer methods, protocols, and modulation techniques. The reader transmits commands that are seen by all the tags in the volume. The tags can then respond based upon their own identification numbers. A goal is for the reader to ascertain all of the data on all of the tags quickly and accurately.

Figure 43:
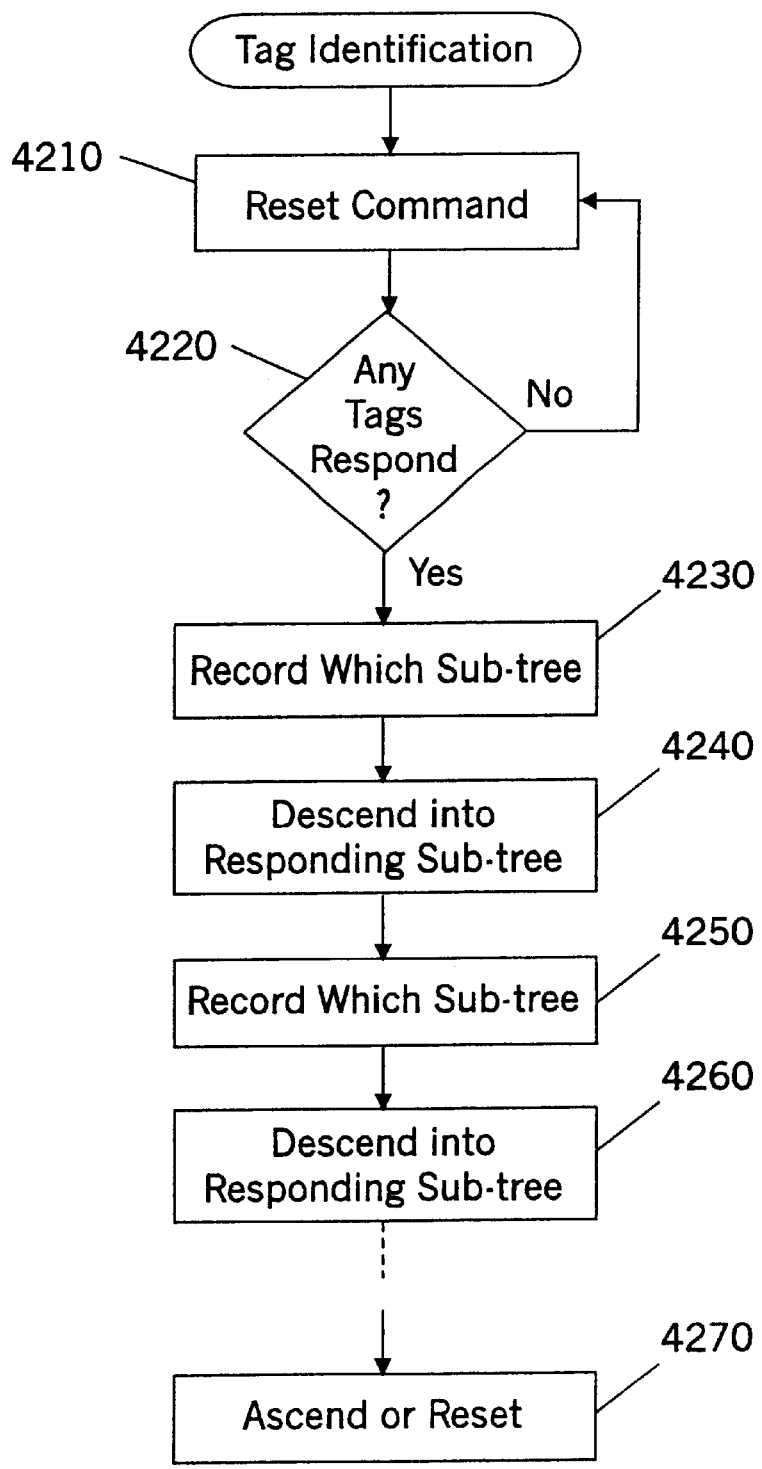
FIG. 43 is a more detailed flowchart of tag identification according to the present invention.

FIG. 43 is a more detailed flowchart of tag identification. The first command, and one that may be most frequently used, and hence may be assigned the shortest time between amplitude changes, is "reset" (Block 4210). The reader may poll the volume by repeatedly issuing the reset command. When a tag enters the magnetic field and obtains sufficient power to be activated, which preferably occurs with a short period due to the intensity of the projection, it will respond based on its ID. The form of the response is a fully decoded representation and may include signaling during a unique time slot or at a particular frequency, or a combination of these and other techniques. The number of reliable unique responses available generally determines the number of bits of the ID that may be returned to the reader in response to a reset command and any subsequent commands. For example, if 16 unique responses are provided for a command, then 4 bits of the tag ID may be obtained for each command executed. Regardless of how many tags respond (i.e., have the same most significant 4 bits) in each time slot (Block 4220), the reader can know that at least one tag exists in the volume with that ID or partial ID.

If the reader desires further information then another command may be executed based upon the data gathered in the previous command (Block 4230). If no tags respond at Block 4220, then another reset command may be issued at Block 4210. After powering up, a tag preferably does not respond to commands until it has received a reset command. In this manner, tags entering the target volume may not disrupt communications already in progress.

If multiple tags simultaneously respond to an interrogation with their N bit group IDs, it may be inevitable that different values will be returned. By responding with a fully decoded representation (single 1 in a field of 0's) of the group ID, the combined responses of the tags received by the reader may not be adversely corrupted and still can provide the information needed by the reader. For example, the combined response of two tags with the same group ID will be the original value. The reader can interpret the single "1" it receives as indicating that at least one tag is present in the indicated sub-tree and therefore the sub-tree is worthy of being searched. If two tags in the field have different group IDs, the reader will receive a combined response of a field of 0's with two "1"s. The position of the "1"s indicate the sub-trees in which the respective tags reside. The reader can interpret the response as indicating that there is at least one tag in each of two sub-trees and can mark them for further investigation at Block 4230. The combining of tag responses using the fully decoded representation can be extended for any number of tags present in the field of the reader.

If more information about the responding tags in each of the responding slots is desired, the next command issued will be "descend into branch X". See Block 4240. This command also may be referred to as a "push" command. The branch of the tree may be as small as a single bit but all tags in the volume will see the command. Those that are not under branch X may not respond further until the reader comes back and descends into their branch. Those that have an ID (or data) that matches up to the current branch, now respond based on the next group of bits in their ID. That is, they will upload another group of bits in their ID to the reader with a simple timed "on" response. These bits are recorded at Block 4250. If this number of bits uniquely defines the tags then the reader will issue an "ascend" command at Block 4270 after recording the value of all responding tags (hence their complete ID) at the current level (Block 4250). The "ascend" command also may be referred to as a "pop" command. With the execution of the ascend command, all the tags with a matching ID up to that level will once again respond with the group IDs. The reader will then issue a "descend into branch Y" command to obtain those IDs (Block 4260). These operations can be performed repeatedly, corresponding to any number of bits of data or ID. Thus, the reader can quickly and reliably obtain all of the data from each of the tags in a parallel fashion. Unlike serial protocols, this procedure may be most advantageous when there are many tags to be identified at once.

Tags can be programmed to not respond further when their ID has been obtained and verified. The ID may contain a checksum or even error bit detection/correction for validation. In particular, a "sleep" command also may be imposed at any level to turn off known tags so that the reader can focus on weak or intermittent signal tags. By slightly changing the magnetic field and issuing "try again" commands, outlying tags may be pulled in. With this protocol, idling may be obtained by not changing the amplitude, allowing remote tags to fully charge between commands if necessary. At any point, the reader may issue a reset or "go to level X" command in Block 4270 in order to repeat the acquisition of suspect data. Highly robust sub-algorithms may be adaptive, to provide robust information transfer in an efficient manner. Reliable performance may be obtained.

Figure 44:
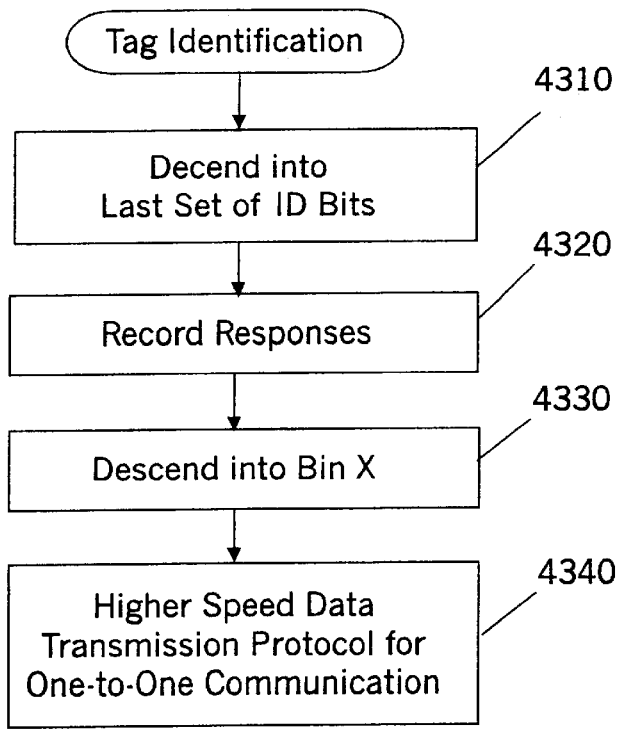
FIG. 44 is a more detailed flowchart of tag communication according to the present invention.

Once a reader has obtained the unique part of a tag, descending into it can ensure one-to-one communication. At this point data can be transferred to and from the tag at a much higher rate—even with a different protocol. See FIG. 44. The last set of ID bits is descended into at Block 4310. The entire unique ID for any tags at this level as recorded at Block 4320. The descend command at Block 4330 indicates to all other tags that are still communicating at this level, to idle. Then at Block 4340, high speed one-to-one communication may take place. The issuance of an ascend command can signal the other tags that the normal protocol has resumed. By using a nonvolatile memory in the tag, information may be written and stored in the tag. Temporary buffers, read back commands, and execute write commands can be implemented to provide accurate, reliable writing.

Figure 45:
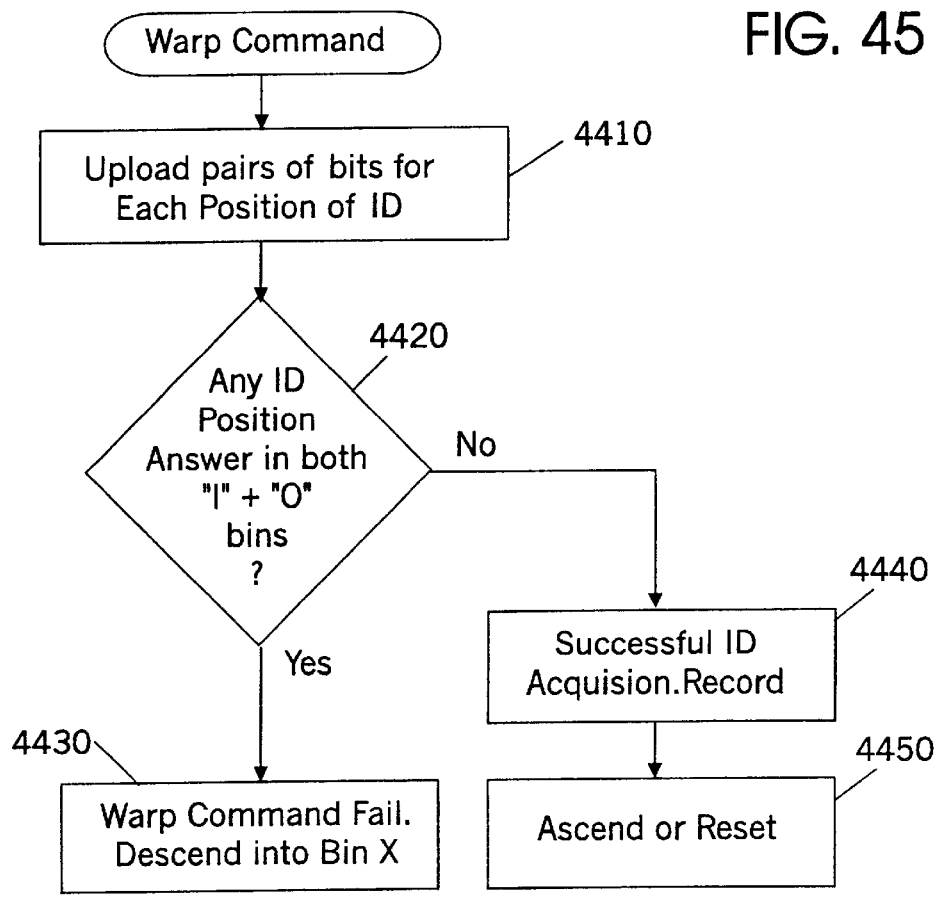
FIG. 45 is a more detailed flowchart of warp operations according to the present invention.

Another method for obtaining higher speed upload even when the traversal is at a point at which uniqueness is not 100% assured is with the "warp" command. See FIG. 45. The reader may issue this command when few responses are arriving or if it is known that uniqueness is likely. The tag or tags that receive this command immediately stream out their data exhaustively. See Block 4410. The reader can gather the data to complete the read and maintain the level at which the warp was started. Each bit however, may take two time slots (or frequency harmonics), one for a "one" and one for a "zero." If there are two or more tags present (with conflicting codes), the reader may see both a "one" and a "zero" present for a given bit position. See Block 4420. This may nullify the warp (Block 4430) and the reader may need to proceed as normal, having wasted just one command time.

If only one tag responds at Block 4420, successful ID acquisition has taken place at Block 4440, and the information is recorded. An ascend or reset command is then issued at Block 4450. For tags with large ID lengths or when single tags are entering the volume, the warp command can speed up data acquisition tremendously. In general, the odds of getting two tags in the same volume with even the first 12 bits the same generally are remote. Moreover, it is extremely likely that most IDs will be many times that length.

At any level of traversal, group select bits may be set or reset for later mass operations. Any or all of the data on a tag, including the ID may be password protected. That is, tags can be turned off so that they will not respond, or respond intentionally deceptive until a specific series of commands, arbitrarily long, has been executed. Write once or read once bits also may be implemented. An encryption algorithm may be used on the data to allow for secure communication or sensitive information storage. Improper access may trigger data erasing.

Tune commands may be implemented to tweak circuits (analog) sensitive to environmental factors. Self-test and debug information also may be exchanged with the reader.

A detailed embodiment of the present invention now will be described. As is well known to those having skill in the art, an RFID system includes a reader and a potentially large number of tags. Each tag preferably includes a low cost antenna connected to a small, integrated circuit (IC). The IC preferably contains a unique binary ID, a small amount of onboard nonvolatile read/writeable storage, and control logic to handle the reception and transmission of data. The reader serves as a "base station" generating a field to communicate with a nearby tag. Being a passive system, the field generated by the reader also is used to provide the operational power for the tag IC, as was already described.

When a tag enters the field, it extracts enough power from the field to wake up. Commands issued by the reader are then processed by the tag and in some cases responses are returned. The field generated by the reader is directional and loses its strength as the distance to the tag increases. The portion of the reader's field capable of powering and communicating with a tag is referred to as the reader's acquisition field or field of view. If a tag moves into the reader's field of view its onboard ID and any user configured data can be "acquired". A tag may also move out of the acquisition field at which point the tag will lose its source of power and cease operation.

Systems and methods of the invention are capable of acquiring multiple tags that may be in the reader's field of view at the same time. The protocol and instruction set can allow one or more tags to be selected out of a larger group of tags. Operations also can be performed only on a selected set. A tag can be selected based on its unique 44 bit ID or any subset of the bits in the user defined storage. As an example, a grocery store may want to attach a tag to each of its canned good items. A field in the user-defined storage may be designated by the grocery store manager to hold a product identification code along with other information such as sales price. The grocery store manager may place multiple canned goods in the reader's acquisition field and simultaneously select all the cans of peas and update their sales price.

Features may be included in the protocol to promote reliable data communication between the tag and reader. The protocol also may be adapted so that tags entering the field during processing may have a low likelihood of disrupting any ongoing processing/communication. Similarly, steps may be taken to ensure that tags entering the field may not themselves start processing a reader initiated command sequence intended for other devices already in the acquisition field.

Each tag has a unique ID, N bits in length. The N bits of ID can be re-organized as a tree. In a simple case, one bit of the ID is assigned to each level in the tree as shown in FIG. 46. Since one bit is used this is commonly referred to as a binary tree representation.

In the case shown in FIG. 46, a 10 bit ID was specified. With 10 bits, 1024 ($2^{10}$) different numbers or IDs can be represented. The 10 bit ID also can be converted into a binary tree representation as shown on the right of FIG. 46. At the top of the tree is the "root". The tree has 10 levels of branches, one for each bit in the ID. At the bottom of the tree are 1024 leaf nodes. Each leaf corresponds to a tag and represents its unique ID out of the $2^{10}$ possible values. One can traverse the tree, starting at the root, and reach any of the leaf nodes/tags. In fact, there generally is only one path from the root to each of the leaf nodes, that is uniquely determined by the values of the bits in its ID.

The present invention can enable faster, more efficient traversal of the tree structure using an N-ary tree representation of the ID. In the N-ary tree approach, the ID is mapped into a tree with N branches at each level as shown in FIG. 47, where N preferably is a power of 2. In the example below N is 4, establishing a "quad tree." Using this approach, the ID can be traversed in a factor of $\log_2(N)$ fewer steps than the binary tree case of FIG. 46.

With a large number of bits in the ID, only a miniscule fraction of the possible tag IDs generally are present in the acquisition field at any one time. To rapidly identify any tag that may be in the field, the present invention can enable the reader to efficiently search the tree structure for tag IDs that are present.

An instruction set can be defined that is well suited for the case of the binary tree using "push" and "pop" commands. In particular, a "push left" command causes each of the tags to move from its current location in the tree to the next lower level along the left ("0") sub-branch. A "push right" command causes each of the tags to move from its current location in the tree to the next lower level following the right ("1") sub-branch. Finally, a "reset" command causes the reader and tags to return to the top of the ID tree. A reset may be automatically executed when a tag first powers up.

After completing a "push" descent, each tag determines if its associated leaf node is a member of the sub-tree rooted at the new location. A tag whose leaf node is a member of the current sub-tree is said to be "active". Each tag then returns a binary response to the reader, indicating if it is "active". For example, a "1" response can indicate the tag is still "active," and no response can indicate it is no longer a member of the active set. Since all the tags in the field execute the same push command, the aggregation of the responses will indicate if any tags reside in the current sub-tree. By monitoring the combined response of the tags, the reader can quickly "prune" the branches of the tree that do not contain an active leaf node/tag. Successive push operations can reduce the size of the active set, narrowing the tag search space. When a final push is performed into the last level, a unique tag will have been selected. Its ID is specified by the series of push operations that were executed to uniquely select it.

Thus, a tag enters the "active set" if it is powered up or receives a RESET sequence. A tag leaves the "active set" if it has sufficient power to continue operation. It is placed in the SLEEP state by receiving a sleep command from the reader, or if the tag's ID tree leaf node is not a member of the current sub-tree.

Table 3 describes a typical sequence of operations. A single tag with a 10 bit ID of 0x003 is assumed present in the field of the reader.

TABLE 3

| Reader Command | Tag Response | Comments |
|---|---|---|
| RESET | | Tag initialized to the root of the tree |
| PUSH LEFT | "Tag Active" | Bit 9 of the ID is processed |
| PUSH LEFT | "Tag Active" | Bit 8 of the ID is processed |
| PUSH LEFT | "Tag Active" | Bit 7 of the ID is processed |
| PUSH LEFT | "Tag Active" | Bit 6 of the ID is processed |
| PUSH LEFT | "Tag Active" | Bit 5 of the ID is processed |
| PUSH LEFT | "Tag Active" | Bit 4 of the ID is processed |
| PUSH LEFT | "Tag Active" | Bit 3 of the ID is processed |
| PUSH LEFT | "Tag Active" | Bit 2 of the ID is processed |
| PUSH LEFT | <none> | Reader pushes into an empty sub-tree. |
| RESET | | Return to the top of the tree and try again |
| PUSH LEFT | "Tag Active" | Bit 9 of the ID is processed |
| PUSH LEFT | "Tag Active" | Bit 8 of the ID is processed |
| PUSH LEFT | "Tag Active" | Bit 7 of the ID is processed |
| PUSH LEFT | "Tag Active" | Bit 6 of the ID is processed |
| PUSH LEFT | "Tag Active" | Bit 5 of the ID is processed |
| PUSH LEFT | "Tag Active" | Bit 4 of the ID is processed |
| PUSH LEFT | "Tag Active" | Bit 3 of the ID is processed |
| PUSH LEFT | "Tag Active" | Bit 2 of the ID is processed |
| PUSH RIGHT | "Tag Active" | Bit 1 of the ID is processed |
| PUSH RIGHT | "Tag Active" | Bit 0 of the ID is processed. The tree traversal is completed. |

Note that once a wrong step is made, the process must be reset and restarted from the top of the tree again. Using the above defined instruction set, on average 50% of the time the reader will descend into a sub-tree with no active tags. A sub tree is defined as the tree that is rooted at the system's current location in the ID tree. In this case, all the tags are reset and processed again from the root back to the point in the tree where the mis-step was taken. Depending on the length of ID and the amount of time needed to process an instruction, it may be advantageous to include an instruction to move upward through the ID tree. The "pop" operation performs this function, causing all the tags in the field to move up one level in the tree. No response is returned by a tag. If the reader descends into a sub-tree that does not contain a tag, it can issue a pop instruction and effectively "undo" the previous push command.

Once again using the example of a single tag with a 10 bit ID with the value 0x003, the reader may follow a sequence of operations like that depicted in Table 4.

TABLE 4

| Reader Command | Tag Response | Comments |
|---|---|---|
| RESET | | Tag initialized to the root of the tree |
| PUSH LEFT | "Tag Active" | Bit 9 of the ID is processed |
| PUSH LEFT | "Tag Active" | Bit 8 of the ID is processed |
| PUSH LEFT | "Tag Active" | Bit 7 of the ID is processed |
| PUSH LEFT | "Tag Active" | Bit 6 of the ID is processed |
| PUSH LEFT | "Tag Active" | Bit 5 of the ID is processed |
| PUSH LEFT | "Tag Active" | Bit 4 of the ID is processed |
| PUSH LEFT | "Tag Active" | Bit 3 of the ID is processed |
| PUSH LEFT | "Tag Active" | Bit 2 of the ID is processed |
| PUSH LEFT | <none> | Reader pushes into an empty sub-tree. |
| POP | <none> | Undo the previous operation |
| PUSH RIGHT | "Tag Active" | Bit 1 of the ID is processed |
| PUSH LEFT | <none> | Reader pushes into an empty sub-tree. |
| POP | <none> | Undo the previous operation |
| PUSH RIGHT | "Tag Active" | Bit 0 of the ID is processed. The tree traversal is completed. |

As shown in Table 4, the pop command can increase the efficiency of tag identification.

This approach can be extended to an N-ary tree such as a quad tree, by defining an extended set of push instructions to replace the "push left" and "push right" operations. Four push operations (PUSH 00, PUSH 01, PUSH 10, and PUSH 11) may be used to cover each of the quad tree's four sub-branches.

To make the tree traversal process more generalized a PUSH* command also can be defined. The PUSH* command functions similar to a PUSH operation described above, but no tags are deselected. The PUSH* command issued by the reader does not specify a branch in which to descend. Instead, each tag descends into its own sub-tree. All tags which were "active" prior to the PUSH* command remain "active". This enables groups of bits in the ID to be skipped in the deactivation process. This can make it possible to select tags based on different sub-fields of an ID for later processing.

The operations described above can be very effective in cases where a single tag is in the acquisition field at a time. Unfortunately, if multiple tags are present, and there is no mechanism to prevent a processed tag from participating in subsequent tree traversals by the reader, the reader may waste a great deal of time mistakenly traversing parts of the ID tree it covered in earlier passes. To improve the efficiency of the tree traversal process for the case of multiple tags, a "sleep" command preferably is included. After a tag has been acquired and processed, a sleep command is preferably issued by the reader. Any active tag that receives a sleep command enters a state in which it will not respond to subsequent commands unless it is removed from the acquisition field and re-introduced later.

Figure 51:
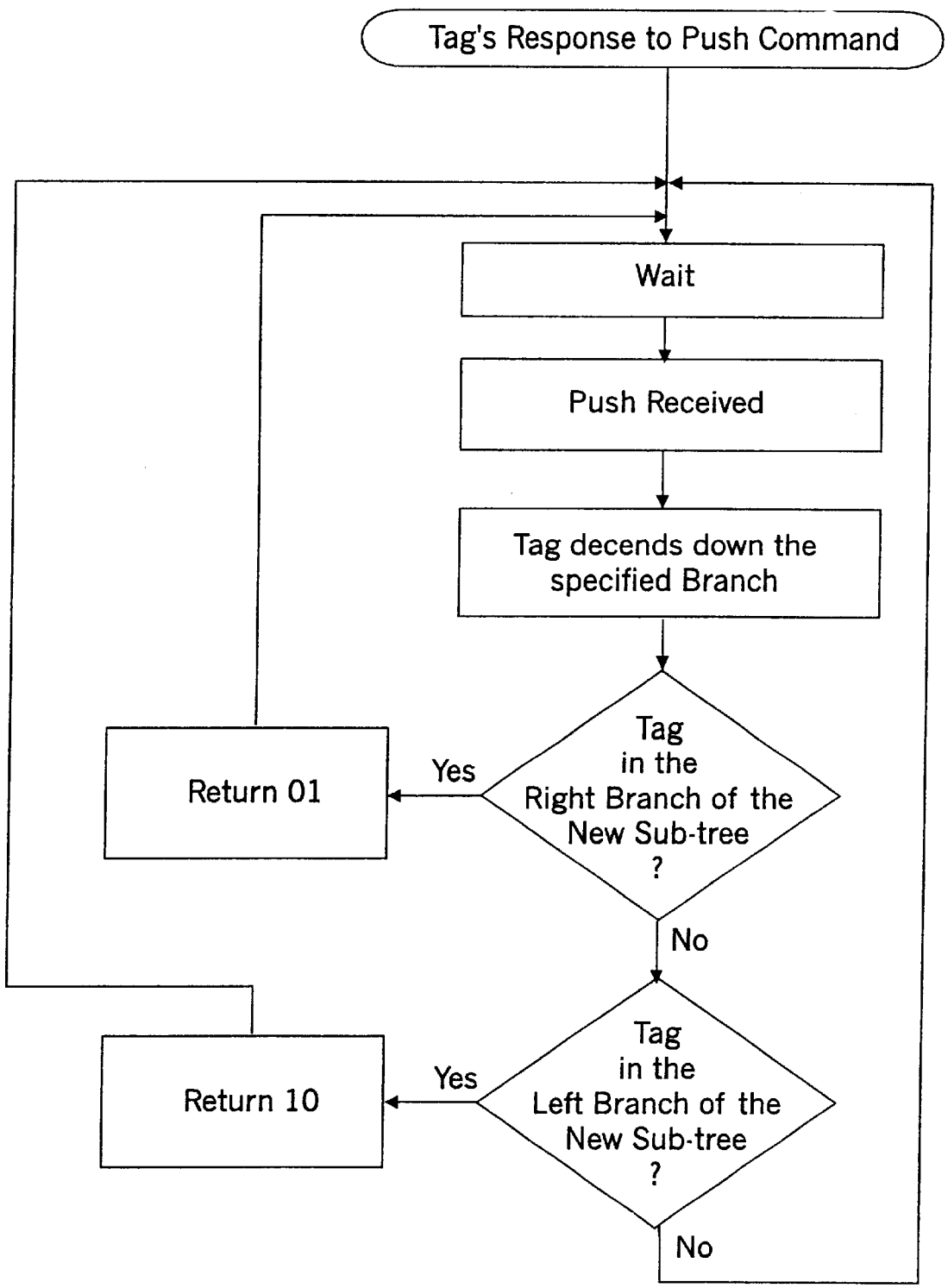
FIG. 51 illustrates operations that may be executed by a tag utilizing a binary tree in response to a push command.

Other enhancements may be provided to further improve the efficiency of the tree traversal process. Using a single-bit, binary tag response ("1" is active, no response indicates not active), the reader statistically will descend into an empty sub-tree 50% of the time. Adding a pop instruction can allow the reader to more quickly "back out" of such situations, helping to offset some of the performance loss. To reduce and preferably eliminate the descent into empty sub-trees, the push command's binary response can be extended to provide additional information about a tag's location in the tree. In the case of a binary tree, the single bit response to a push command can be replaced by a three-valued response, encoded in two bits as shown in Table 5. FIG. 51 describes operations that may be executed by a tag in response to a push command.

TABLE 5

| Tag Response | Meaning |
|---|---|
| 00 | The tag is not active. |
| 01 | The tag is in the left half of the current sub-tree. |
| 10 | The tag is in the right half of the current sub-tree. |

The two-bit value may be returned bit-serially to the reader. The original binary response only tells the reader if a tag is present in either sub-branch of the new sub-tree. The two-bit response provided by an enhanced tag can enable the reader to determine which branches of the new sub-tree contain tags. This can eliminate the need to descend into branches that do not contain active tags. The recoded, two-bit response returned by each tag can be combined with the responses from other tags without corrupting the information content of the message. When multiple tags are present in the acquisition field, the aggregate response received by the reader can take on four possible values as shown in Table 6.

TABLE 6

| Aggregate Response | Reader Interpretation |
|---|---|
| 00 | No tags in the current sub-tree. |
| 01 | At least one tag is in the left half of the current sub-tree. |
| 10 | At least one tag is in the right half of the current sub-tree. |
| 11 | At least one tag resides in each of the halves of the current sub-tree. |

The two bit response for the binary tree case can be extended to a four-bit response for the Quad tree. See Table 7 below. Ultimately, the preferred approach (binary tree, quad tree) may be dependant on factors such as the rate at which the reader can issue commands; the rate at which responses can be reliably generated and detected, the length of the ID field itself; and/or the distribution of tag IDs simultaneously in the acquisition field.

TABLE 7

| Tag Response | Meaning |
|---|---|
| 0000 | No tags in the current sub-tree. |
| 0001 | The tag is in the 00 branch of the current sub-tree. |
| 0010 | The tag is in the 01 branch of the current sub-tree. |
| 0100 | The tag is in the 10 branch of the current sub-tree. |
| 1000 | The tag is in the 11 branch of the current sub-tree. |

The quad approach may have at least two advantages over other approaches. First, very little command bandwidth may be available from the reader to the tags, as decreed by the FCC. The quad tree can allow the ID tree to be traversed with a fewer number of total commands, which can allow the system to more rapidly process tags. Morever, the four-bit response may have an advantage over a single-bit or two-bit approach in the amount of power that is expended by the tag in generating a response. If the power expended to transmit a single "1" is denoted by P (watts), the single-bit approach may statistically use an average of P/2 watts/ID bit assuming a "1" and a "0" are each transmitted 50% of the time. The two bit approach may statistically use P/2 watts/ID bit while the four-bit approach may statistically use only P/4 watts/ID bit. Keeping the power drain on the tag to a minimum may be of paramount importance in light of the passive operation of the tags.

To save additional command execution time, a warp function also may be provided. A warp operation can be issued by the reader at any point in the tree traversal process to all the active tags. When a tag receives a warp command, it automatically descends the ID tree from its current position to its leaf node. After each step in the descent, the tag returns its four-bit branch identification to the reader. To ensure that only one tag is processed, the reader can successively analyze the responses returned by the tags after each step. At some point in the tree descent, a response may contain more than one "1". This indicates that two or more tags were active at the time the warp command was issued. To re-acquire a single tag, the tree traversal process may be restarted from the top of the tree without the use of the warp command. Alternatively, the tree traversal process can be restarted from the top of the tree and extended to a point later in the descent process where the warp instruction has a higher probability of not encountering more than a single tag. The responses returned from the earlier warp can be used to accurately pick a more suitable point at which the warp can be initiated.

The warp function can descend the ID tree faster since the reader does not have to issue push commands after each response by the tags. The warp function can provide a benefit in applications where there is a high likelihood, after some small number of tree descent steps, that there is only one active tag in the field. This may occur, for example, where only one tag is in the acquisition field at a time or after a significant fraction of a tree descent has been performed and the probability of more than one tag still being active is low.

User-configurable storage may be provided on the tag IC. For example, 128 bits of user-configurable memory may be provided, organized into two 64 bit pages. A configuration "page" contains a device's unique 44 bit ID along with other tag-specific, configuration data. See FIG. 48.

Figure 48:
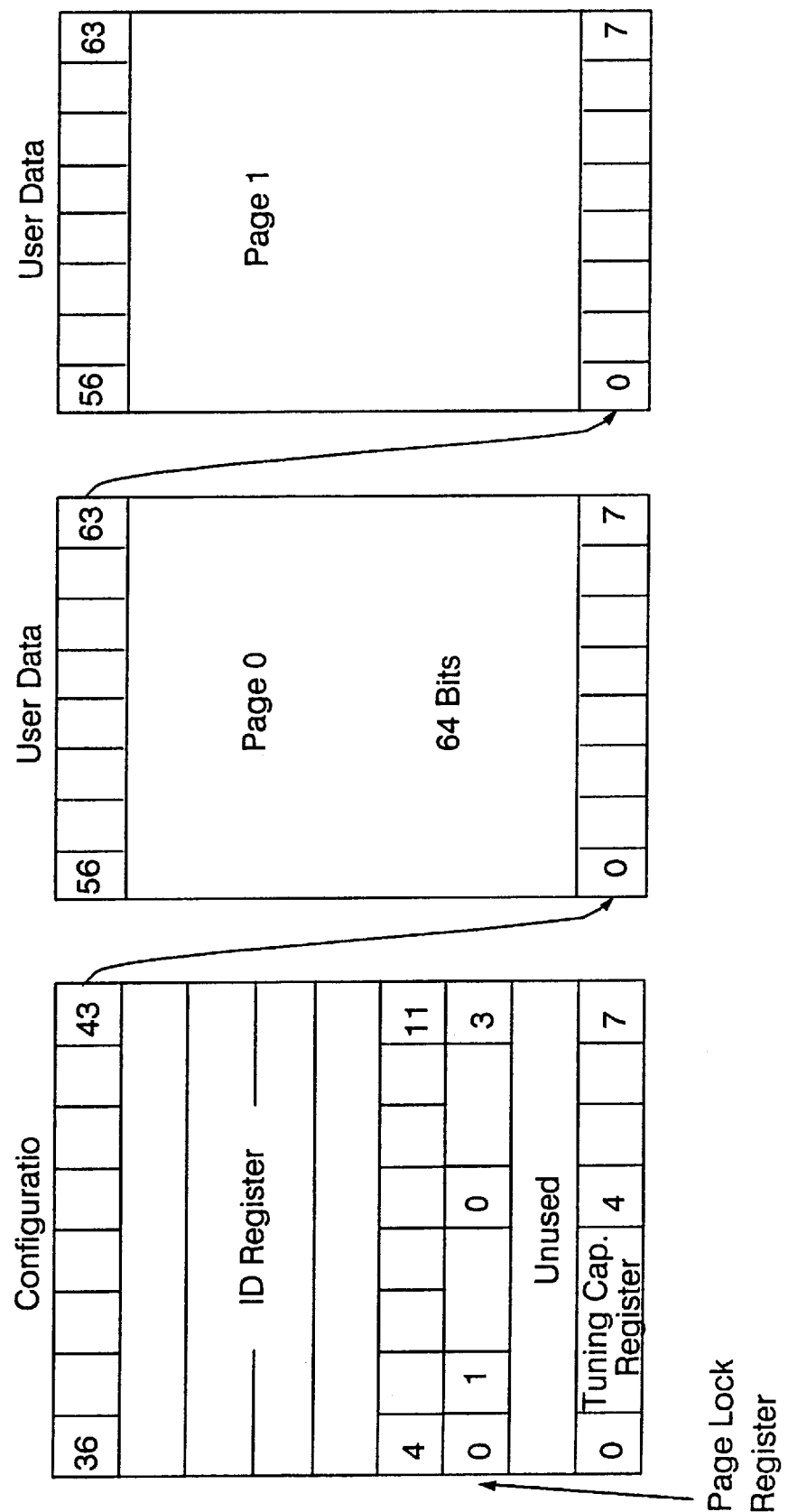
FIG. 48 schematically illustrates a memory organization of an ID tag according to the present invention.

Referring to FIG. 48, when a tag is first powered up, the first 20 bits of the Configuration Page may be automatically read and used to initialize critical registers within the device. A next page command may be provided so that individual memory pages can be bypassed. Repeated execution of the next page command can eventually cause the system to wrap around to the Configuration Page.

A command set is summarized in Table 8 below.

TABLE 8

| Command Mnemonic | Argument/ Tag Return Val | Function |
|---|---|---|
| Acquisition Mode | | |
| PUSH 00 | Branch ID | Push into branch 00 from the current position in the quad tree*. |
| PUSH 01 | Branch ID | Push into branch 01 from the current position in the quad tree*. |

TABLE 8-continued

| Command Mnemonic | Argument/ Tag Return Val | Function |
|---|---|---|
| PUSH 10 | Branch ID | Push into branch 10 from the current position in the quad tree*. |
| PUSH 11 | Branch ID | Push into branch 11 from the current position in the quad tree*. |
| PUSH* | Branch ID | Push into the tag's current branch. No tags are deactivated*☐. |
| WARP | Branch IDs for each level left in the tree | Read the selected EEPROM page of all "active" devices and transmit the result back to the reader in encoded form*☐. |
| Power On Mode | | |
| START | | Go to the Execute State. |
| Execute Mode (User Pages only) | | |
| WRITE_PG | <data> | Write page to the Data EEPROM of all "active" devices. |
| READ_PG | Page Data | Read EEPROM page of all "active" devices in unencoded form. |
| NEXT_PG | | Advance to the next page. |
| ACQUIRE | Branch ID | Go to Acquisition Mode and acquire the contents of the current page. |
| Execute Mode (Configuration Page only) | | |
| PROTECTU | <key> | Write special 64 bit value to the "active" devices to enter User Protected Mode. |
| PROTECTS | <key> | Write special 64 bit value to the "active" devices to enter System Protected Mode. |
| SLEEP | | Put the "active" devices to sleep. |
| Execute Mode (System Protected) | | |
| WRITE_ID | <data> | Write 44 bit tag ID to the Configuration Page of all "active" devices. |
| SELF_TST | | Run internal self test. |
| TUNE | | Execute a single step of the tuning process. |
| Execute Mode (User Protected) | | |
| LOCK | <data> | Set/Unset User Page Lock bits of all "active" devices. Instruction only available when the Configuration Page is selected. |
| Implicit Commands | | |
| SRESET | 3 consecutive idle cycles | Tag is returned to the Power On State |
| | Unspecified operations | Tag is returned to the Power On State |

*At the end of the page return to the Execute state.
WARP and PUSH* are mutually exclusive operations. WARP is only available when the Configuration Page is selected. PUSH* is only available when a User Memory page is selected.

Figures 52, 52A:
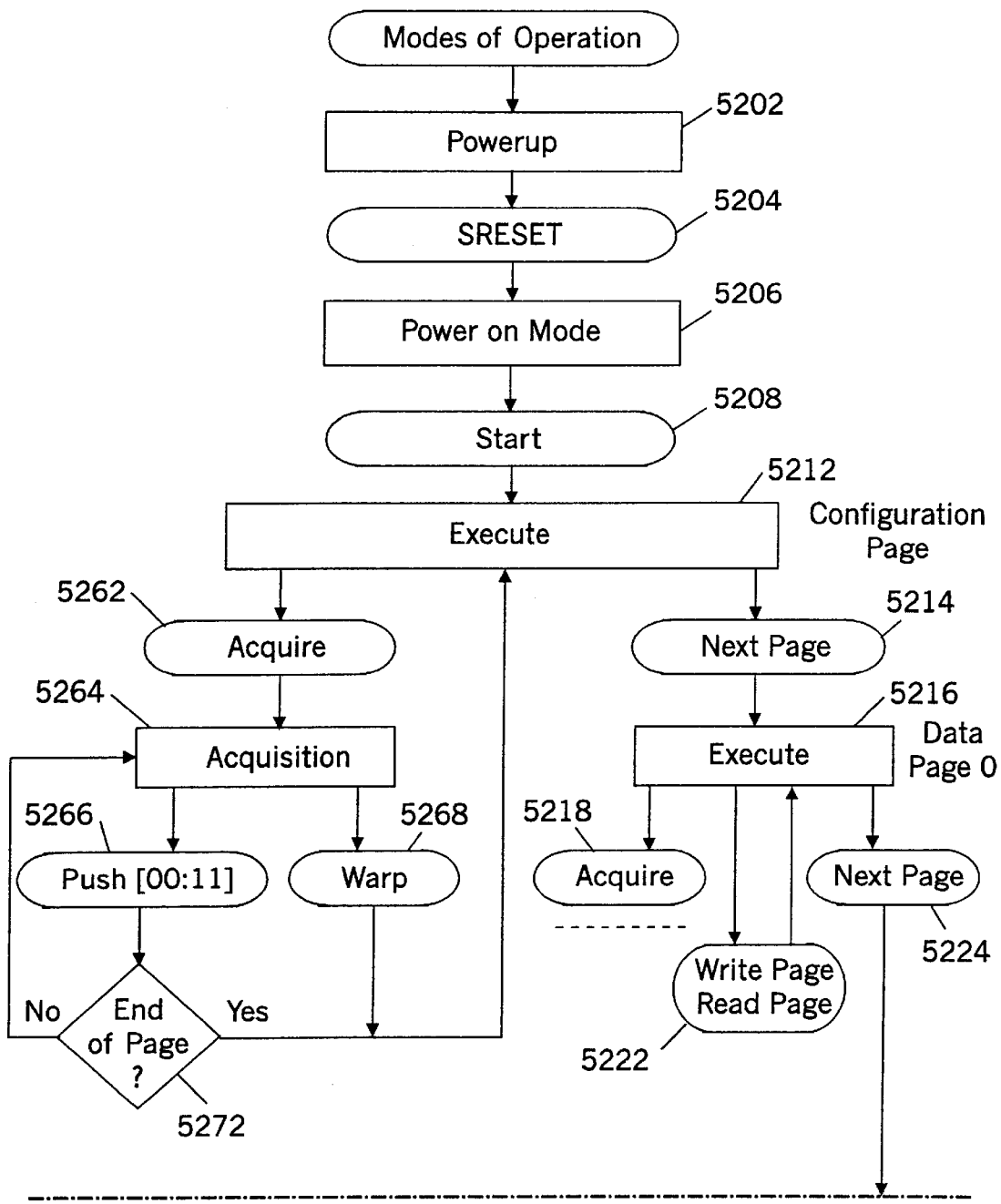
FIGS. 52A and 52B, which when placed together as shown form
FIG. 52, illustrate various modes of operation according to the present invention.
Figure 52B:
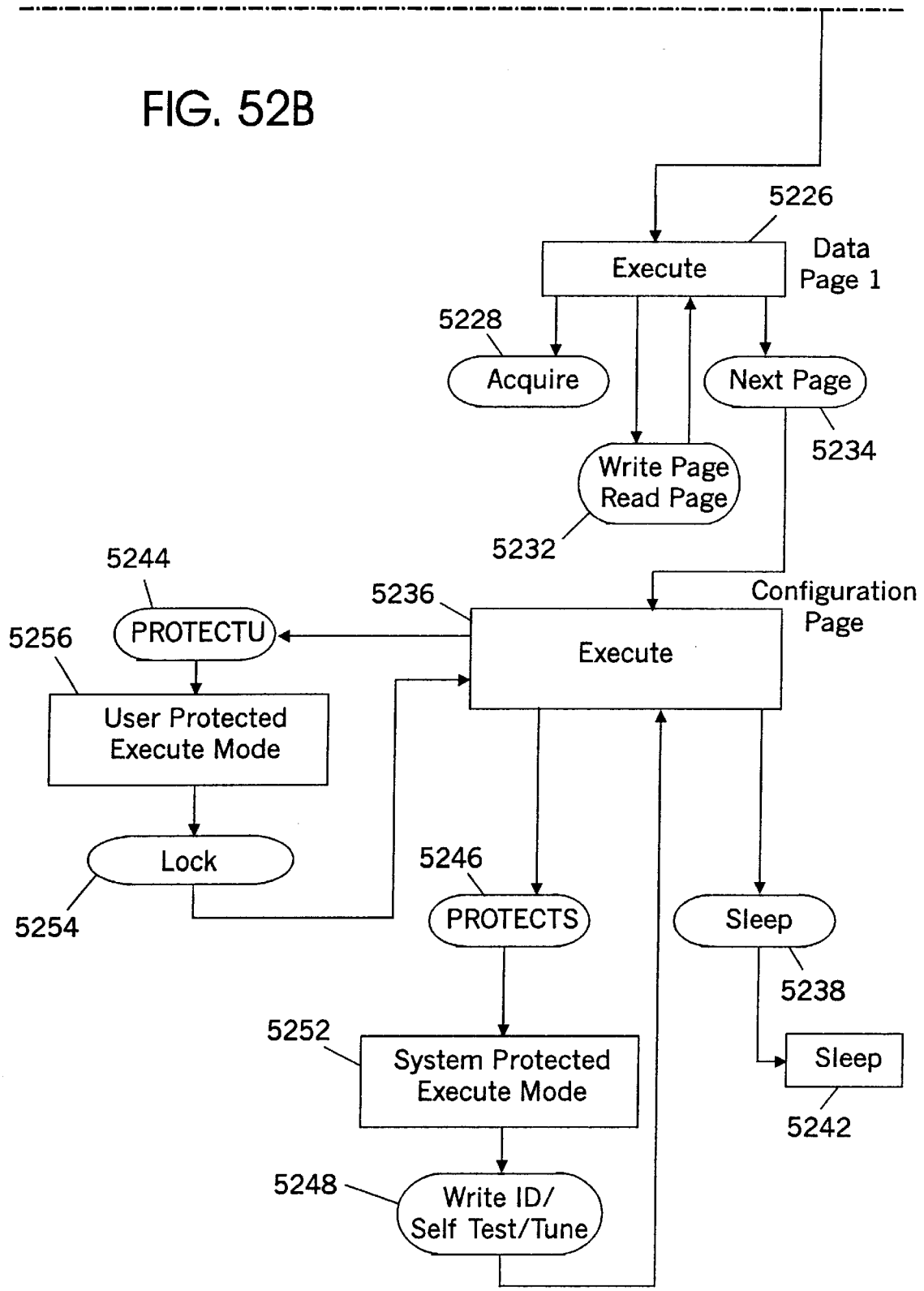

To minimize the number of bits needed to encode reader commands, several modes of operation may be defined. In each mode of operation, the limited set of instruction encodings are redefined/reused to implement additional system capabilities. FIG. 52 illustrates various modes of operation according to the invention.

Referring to FIG. 52, when a tag first powers up (Block 5202), it is put into the Power On Mode (Blocks 5204–5206). Preferably, a tag only can advance to an operational state when it receives a start command from the reader (Block 5208). This command preferably has a unique encoding to ensure that tags entering the field during the processing of a tag will not inadvertently begin to participate and corrupt the ongoing process.

After receiving a START command, a tag enters Execute Mode (Block 5212) from which a number of alternate commands can be issued (Blocks 5214–5272). In Execute Mode, the contents of the tag memory can be processed as raw data. Commands are provided that allow for the reading and writing of a 64-bit page (READ_PG and WRITE_PG)

(Block 5222). The NEXT_PG command (Block 5224) may be used to rapidly move between memory pages.

An assortment of commands also is provided to perform seldom used, specialized functions. As described earlier, the SLEEP command (Block 5238) is provided to completely disable the operation of one or more tags after they have been fully processed by the reader. Putting a device to sleep may not be reversible unless it is powered down by removing it from the field and re-introduced. The PROTECTU and PROTECTS instructions (Blocks 5244 and 5246) may be used to enter the User Protected and System Protected Execution Modes of operation respectively, and may only be available when the Configuration Page is addressed.

In the User Protected Execution Mode (Block 5256), the reader can update the User Page Lock bits (Block 5254) contained in the Configuration Page, allowing the user to selectively lock and unlock each of the pages, protecting them from further modification.

In the System Protected Execution Mode (Block 5252), the reader can execute an internal self-test sequence using the SELF_TST instruction (Block 5248). This instruction may be used in the factory to test each device prior to shipment. It also can be used to re-test devices in the field to ensure that they have not undergone an internal catastrophic failure. The TUNE command may be used in the factory to customize the tuning of the tag antenna for 13.56 MHz operation. Finally, the tag ID can be written in System Protected Mode using the WRITE_ID command, so that each device's unique identification number can be set in the factory.

The ACQUIRE command (Block 5262) may be used to instruct the tag to enter Acquisition Mode (Block 5264). Like a PUSH command, ACQUIRE returns the branch identification for each tag. Once in the acquisition mode of operation, a new sub-set of the instruction set is provided (PUSH00, PUSH01, PUSH10, PUSH11, and WARP) (Blocks 5266 and 5268) allowing the data contained in the selected page to be treated as an ID. In fact, the processing of the factory set 44 bit ID may be treated as a special case only in that the tag automatically processes the first 20 bits of the Configuration Page on power up before ceding control of the tag to the reader.

A PUSH* command also may be provided when a User Memory page is selected. The PUSH* command functions very similar to a PUSH operation described above, but no tags are deselected. Each tag descends into its own sub-tree as opposed to the sub-tree specified by the reader. This enables groups of bits in the User Memory, that are being processed as an ID, to be skipped in the deselection process. This can make it possible to select tags based on different sub-fields of the user-defined data. When the tag reaches the end of the selected page, the device returns to Execute Mode.

Figure 49:
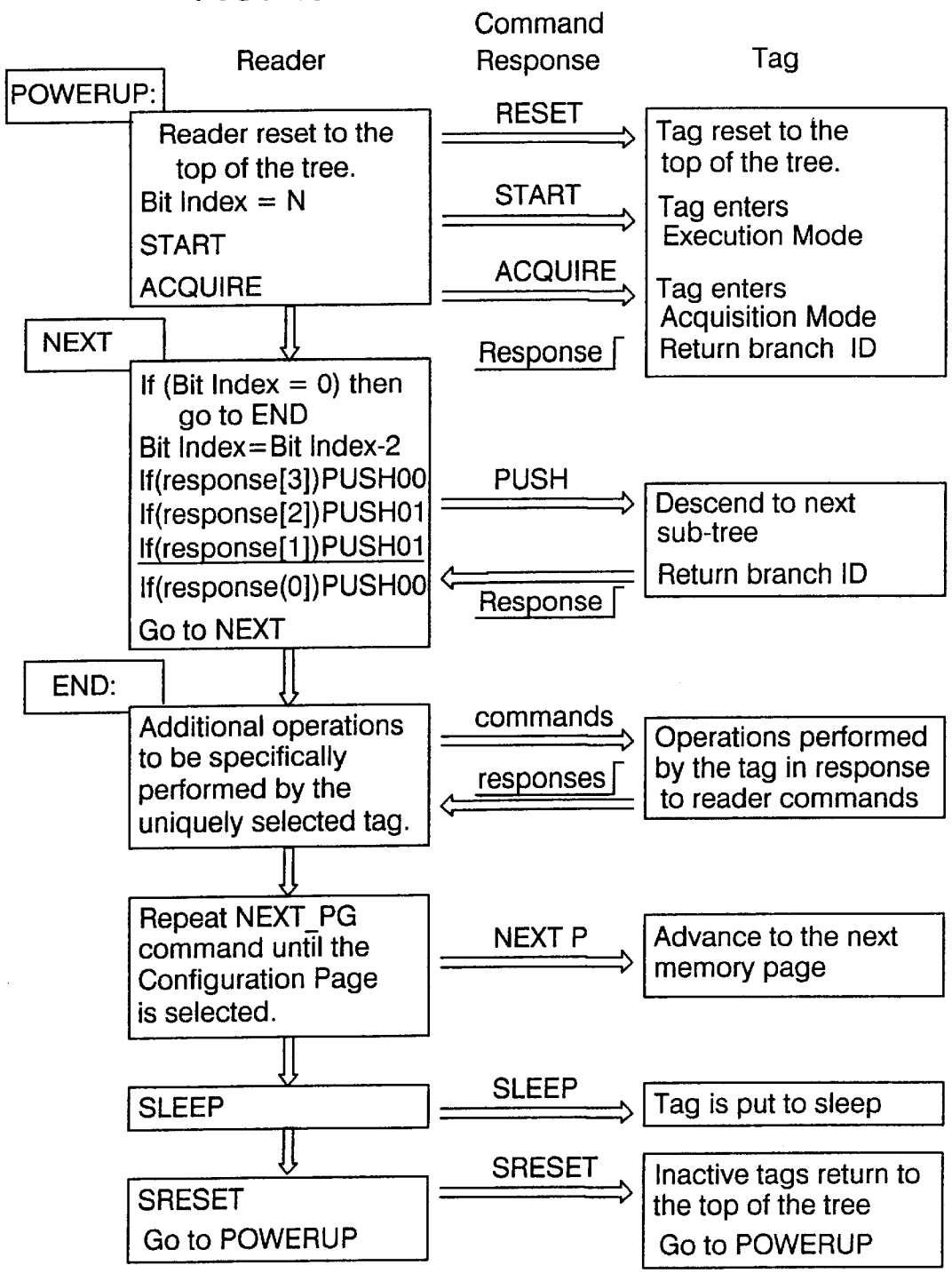
FIG. 49 is a flowchart illustrating detailed quad tree traversal according to the present invention.

A detailed tree traversal flowchart is shown in FIG. 49. It should be noted that bold characters are used to highlight actual instructions. Names in bold, italic font are labels used in the flowchart to help depict the flow. The variable "Bit Index" is used to track which level in the tree is being processed. Finally, the variable "N" represents the number of bits in the ID. When a User page is traversed, N is set to 64.

Figure 50A:
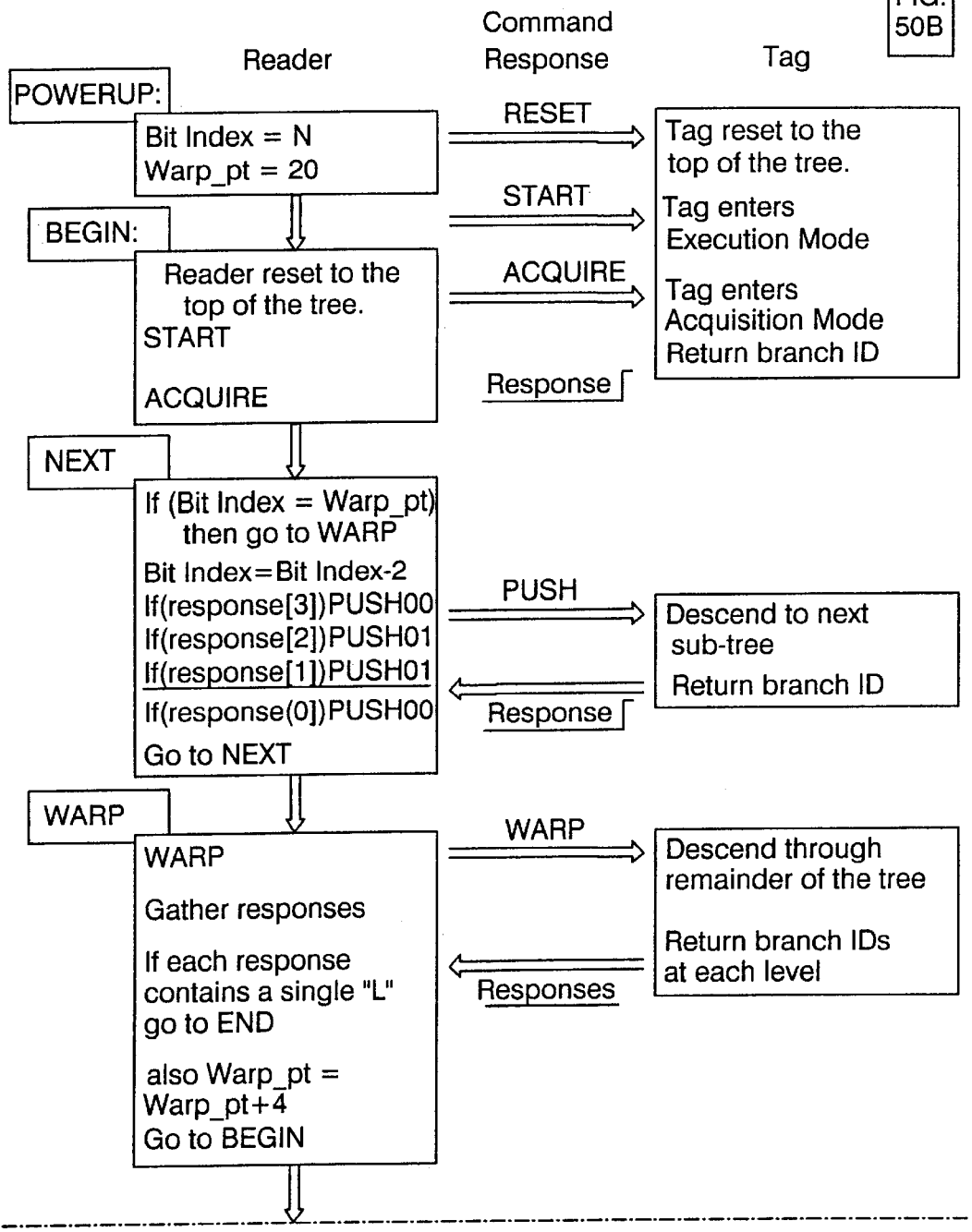
FIG. 50 illustrates detailed operations of quad tree traversal utilizing a warp operation according to the present invention.
Figure 50B:
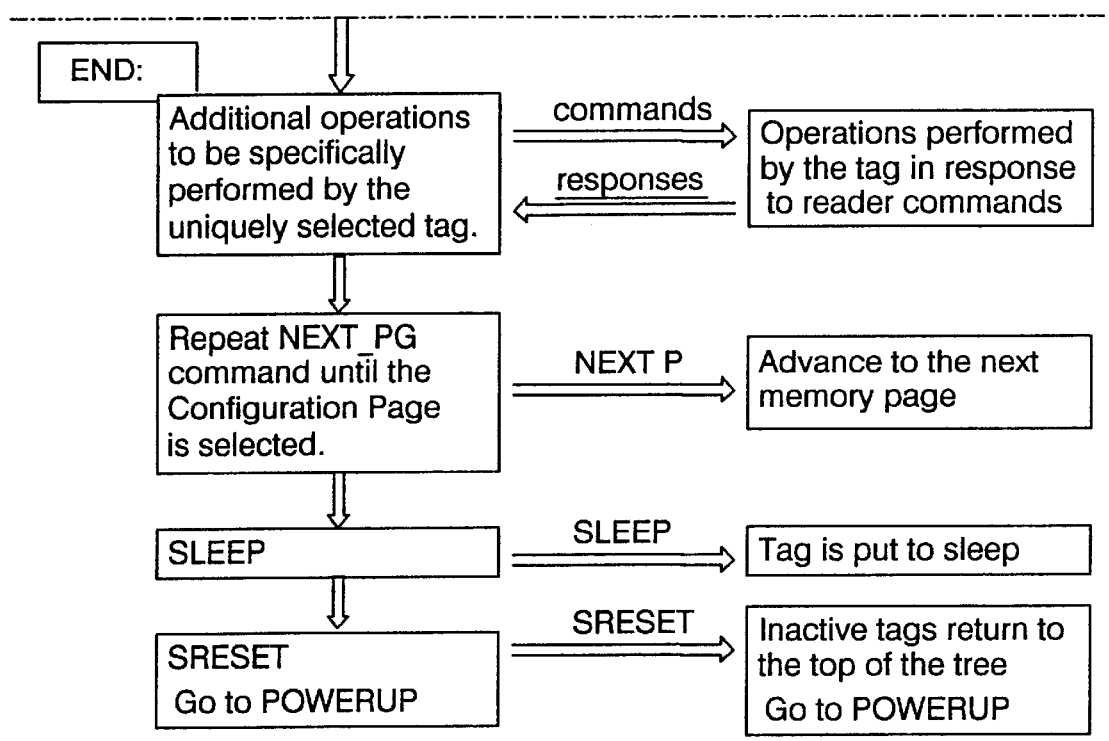

FIG. 50 is a flowchart including a warp operation. The variable WARP_PT (warp point) indicates at which level in the tree the warp should be initiated. In the example given, the warp point is initially set at bit 20 of the ID or the $10^{th}$ level in the ID tree. In FIG. 50, the warp point is moved two levels lower in the tree if the warp fails to select a unique ID.

A more sophisticated reader algorithm may analyze the responses provided and determine an improved location.

Various aspects of the present invention were illustrated in detail in the figures, including block diagrams and flowchart illustrations. It will be understood that individual blocks of the figures, and combinations of blocks in the figures, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the block or blocks.

Accordingly, blocks of the figures support combinations of means for performing the specified functions, combinations of steps for performing the specified functions and program instruction means for performing the specified functions. It will also be understood that individual blocks of the figures, and combinations of blocks in the figures, can be implemented by special purpose hardware-based computer systems which perform the specified functions or steps, or by combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claim.

What is claimed is:

1. A system for wirelessly projecting power to wirelessly power microelectronic devices, the system comprising:

an array of current loops that are disposed adjacent to one another to define a surface and to define an in-phase virtual current loop at a periphery of the surface that produces a same direction, in-phase virtual current while current in adjacent portions of adjacent current loops flows in opposite directions, to wirelessly project power orthogonal to the surface to power microelectronic devices that are spaced apart from, and orthogonal to, the surface;

wherein the array of current loops comprises an array of at least ten wedge-shaped current loops each having an outer portion and a pair of sides. the at least ten wedge-shaped current loops being disposed adjacent to one another to define a surface such that currents in the outer portions are in-phase and current in adjacent sides of adjacent current loops are out-of-phase.

2. A system for wirelessly projecting power to wirelessly power microelectronic devices, the system comprising:

a plurality of arrays of current loops, the arrays of current loops being disposed adjacent to one another to define a surface, each array of current loops defining an in-phase virtual current such that in-phase virtual currents of at least some adjacent arrays of current loops are not in-phase with one another, each array of current loops comprising a plurality of current loops that are disposed adjacent to one another in the surface, such that current in adjacent portions of adjacent current loops in an array flows in opposite directions, to wirelessly project power orthogonal to the surface to power microelectronic devices that are spaced apart from, and orthogonal to, the surface.

3. A system according to claim 2 wherein the virtual currents of adjacent arrays of current loops are of opposite phase from one another.

4. A system according to claim 2 wherein the plurality of arrays of current loops comprises four arrays of current loops that are arranged in two rows and two columns, such that the virtual currents in the arrays in each row and each column are of opposite phase.

5. A system according to claim 2 wherein the plurality of arrays of current loops comprises four arrays of current loops that are arranged in two rows and two columns, such that the virtual currents in the arrays in each row and each column are ninety degrees out-of-phase from one another.

6. A system according to claim 4 wherein the two rows and two columns are two oblique rows and two oblique columns.

7. A system according to claim 5 wherein the two rows and two columns are two oblique rows and two oblique columns.

8. A system according to claim 2 wherein the plurality of arrays of current loops comprises a plurality of arrays of current loops that are arranged in a circle, such that the virtual currents in adjacent arrays in the circle are of opposite phase.

9. A system according to claim 2 wherein each array of loops is arranged to provide at least some reinforcement of an electromagnetic near field that is produced by the current loops orthogonal to the surface in an array while producing at least some cancellation of a far field electromagnetic wave orthogonal to the surface that is produced by the current loops in the array.

10. A system according to claim 9 wherein the plurality of arrays of current loops arc arranged provide at least some further reinforcement of the electromagnetic near fields that are produced by the arrays of current loops orthogonal to the surface and at least some further cancellation of the far field electromagnetic waves orthogonal to the surface that are produced by the arrays of in-phase current loops.

11. A system according to claim 2 wherein each array of current loops comprises an array of at least ten wedge-shaped current loops, each having an outer portion and a pair of sides, the at least ten wedge-shaped current loops being disposed adjacent to one another to define a surface such that currents in the outer portions are in-phase and current in adjacent sides of adjacent current loops are out-of-phase.

12. A system according to claim 2 wherein each array of current loops comprises an array of at least ten polygonal current loops, each having a plurality of sides, the at least ten polygonal current loops being disposed adjacent to one another to define a surface having an outer boundary, such that currents in the sides of the at least ten polygonal loops that are adjacent the outer boundary are in-phase and current in adjacent sides of adjacent current loops are out-of-phase.

13. A system according to claim 2 wherein each array of current loops comprises an array of spiral current loops.

14. A system according to claim 2 wherein each of the current loops is less than a quarter wavelength long.

15. A system according to claim 2 wherein each array of current loops comprises an array of concentric current loops.

16. A system according to claim 2 wherein each array of current loops comprises an array of stacked current loops.

17. A system according to claim 2 further comprising a driver that drives each array of current loops at 13.56 MHz to thereby wirelessly project power.

18. A method for wirelessly projecting power to wirelessly power microelectronic devices, the method comprising the step of:

applying current to a plurality of arrays of current loops, the arrays of current loops being disposed adjacent to one another to define a surface, each array of current loops defining an in-phase virtual current such that in-phase virtual currents of at least some adjacent arrays of current loops are out-of-phase with one another, each array of current loops comprising a plurality of current loops that are disposed adjacent to one another in the surface, such that current in adjacent portions of adjacent current loops in an array flows in opposite directions, to wirelessly project power orthogonal to the surface to power microelectronic devices that are spaced apart from, and orthogonal to, the surface.

* * * * *